US008415829B2

(12) United States Patent
Di Cristofaro

(10) Patent No.: US 8,415,829 B2
(45) Date of Patent: Apr. 9, 2013

(54) TRANSPORTABLE MODULAR MULTI-APPLIANCE DEVICE

(75) Inventor: Vincenzo E. Di Cristofaro, Burlington (CA)

(73) Assignee: VDC Manufacturing Inc. (CA)

( * ) Notice: Subject to any disclaimer, the term of this patent is extended or adjusted under 35 U.S.C. 154(b) by 298 days.

(21) Appl. No.: 12/784,898

(22) Filed: May 21, 2010

(65) Prior Publication Data

US 2010/0301672 A1 Dec. 2, 2010

Related U.S. Application Data

(60) Provisional application No. 61/183,433, filed on Jun. 2, 2009, provisional application No. 61/185,474, filed on Jun. 9, 2009, provisional application No. 61/185,514, filed on Jun. 9, 2009.

(51) Int. Cl.
*H02J 3/14* (2006.01)

(52) U.S. Cl.
USPC .......................................................... 307/39

(58) Field of Classification Search ........................ None
See application file for complete search history.

(56) References Cited

U.S. PATENT DOCUMENTS

| 3,717,805 | A | 2/1973 | Gnaedinger |
| 2002/0018922 | A1* | 2/2002 | Fuglevand et al. ............... 429/22 |
| 2002/0167174 | A1 | 11/2002 | Haass et al. |
| 2003/0178515 | A1 | 9/2003 | Boerhout et al. |
| 2004/0131902 | A1* | 7/2004 | Frank et al. ...................... 429/21 |
| 2007/0252435 | A1* | 11/2007 | Coe et al. ...................... 307/10.1 |
| 2007/0273211 | A1* | 11/2007 | Wang et al. ...................... 307/45 |
| 2008/0264922 | A1 | 10/2008 | Fosbinder |
| 2009/0250091 | A1* | 10/2009 | Huang et al. .................. 136/205 |

FOREIGN PATENT DOCUMENTS

JP 2006-194226 7/2006

* cited by examiner

*Primary Examiner* — Hal Kaplan
(74) *Attorney, Agent, or Firm* — Harness, Dickey & Pierce, P.L.C.

(57) ABSTRACT

A transportable modular multi-appliance device comprises a container, a primary power source for producing AC power, a plurality of AC-powered functional modules, AC outlets, sensors, and a controller. The primary power source is inside the container, and the functional modules are removably mounted inside the container and removably electrically coupled to the primary power source to receive AC power therefrom. The AC outlets are also electrically coupled to the primary power source. The sensors detect conditions inside the container and associated with the functional modules, and the controller is coupled to the primary power source and to the sensors and configured to automatically control the primary power source and allocate the AC power among the functional modules and the AC outlets in response to inputs from the sensors.

20 Claims, 48 Drawing Sheets

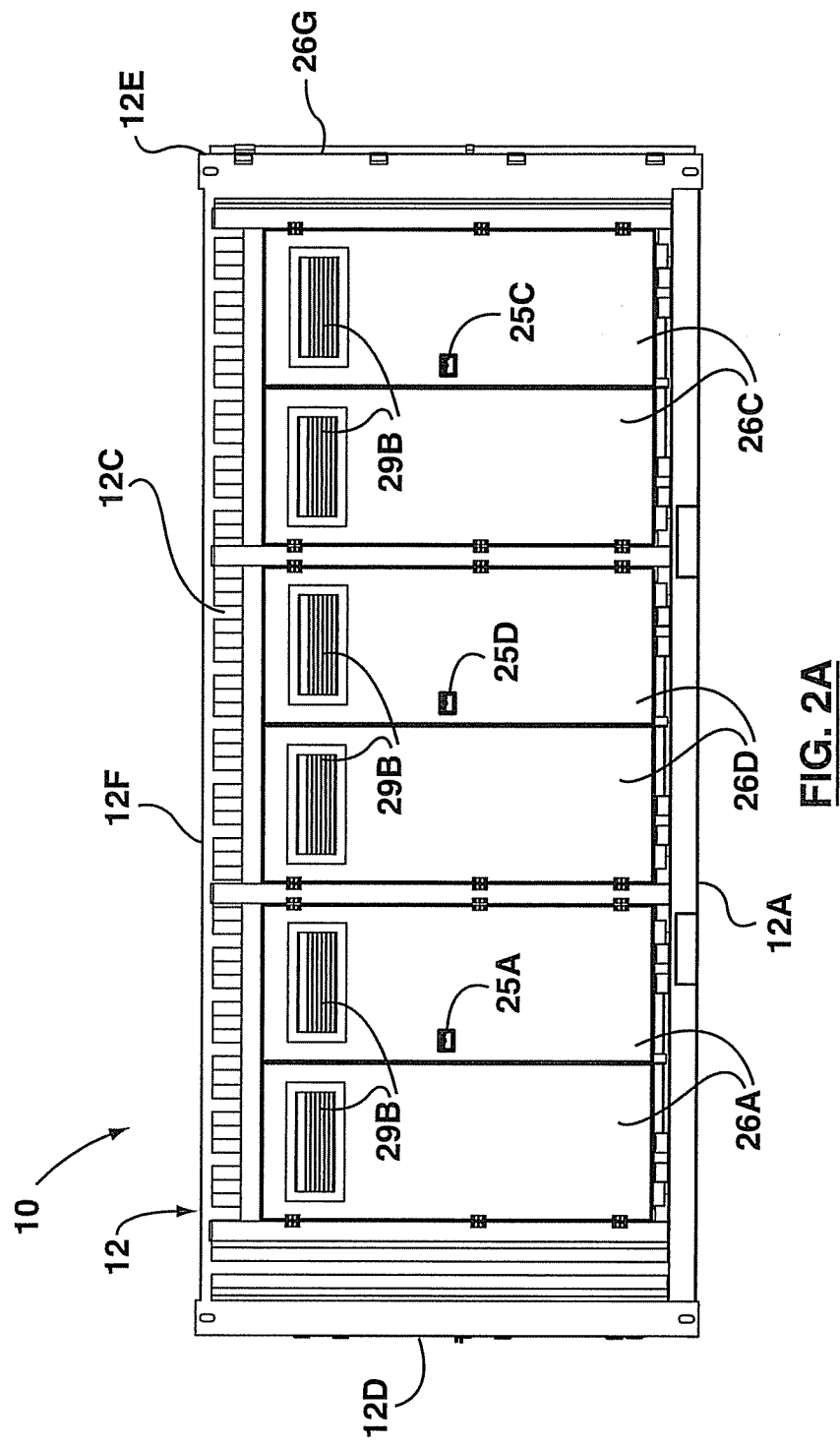

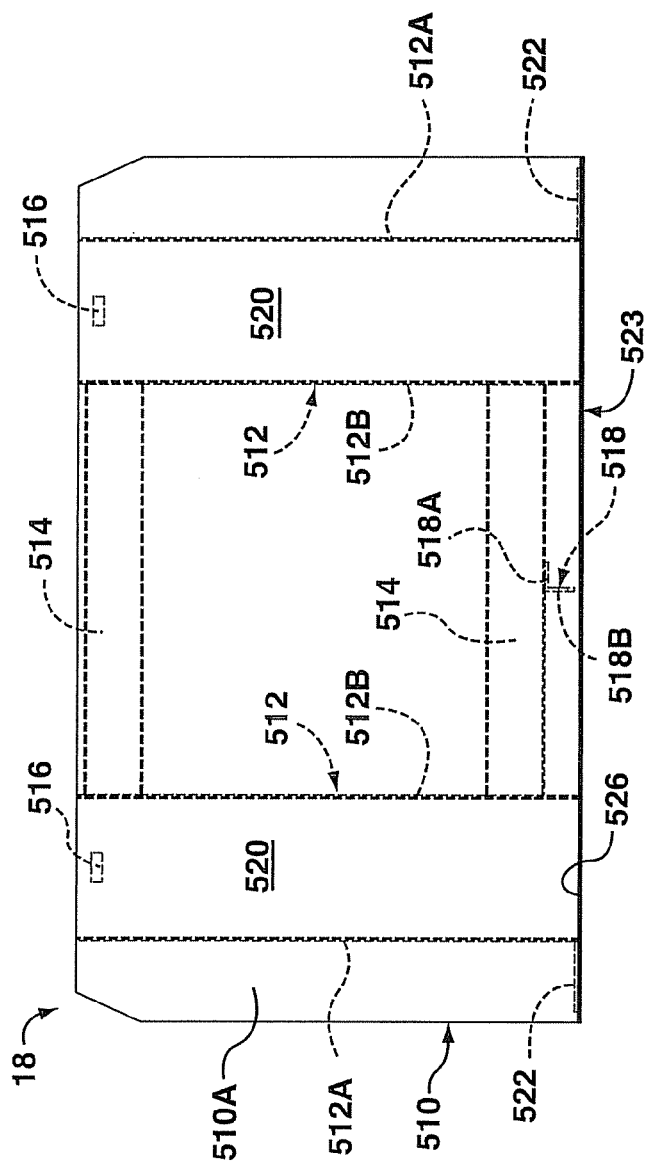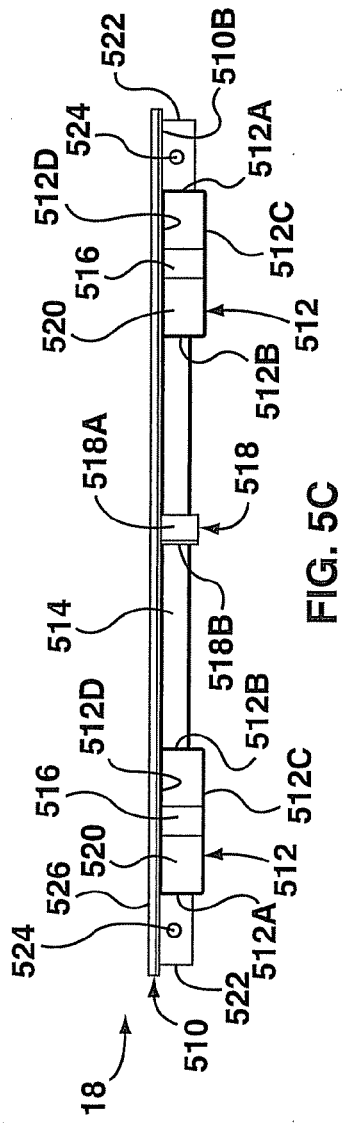

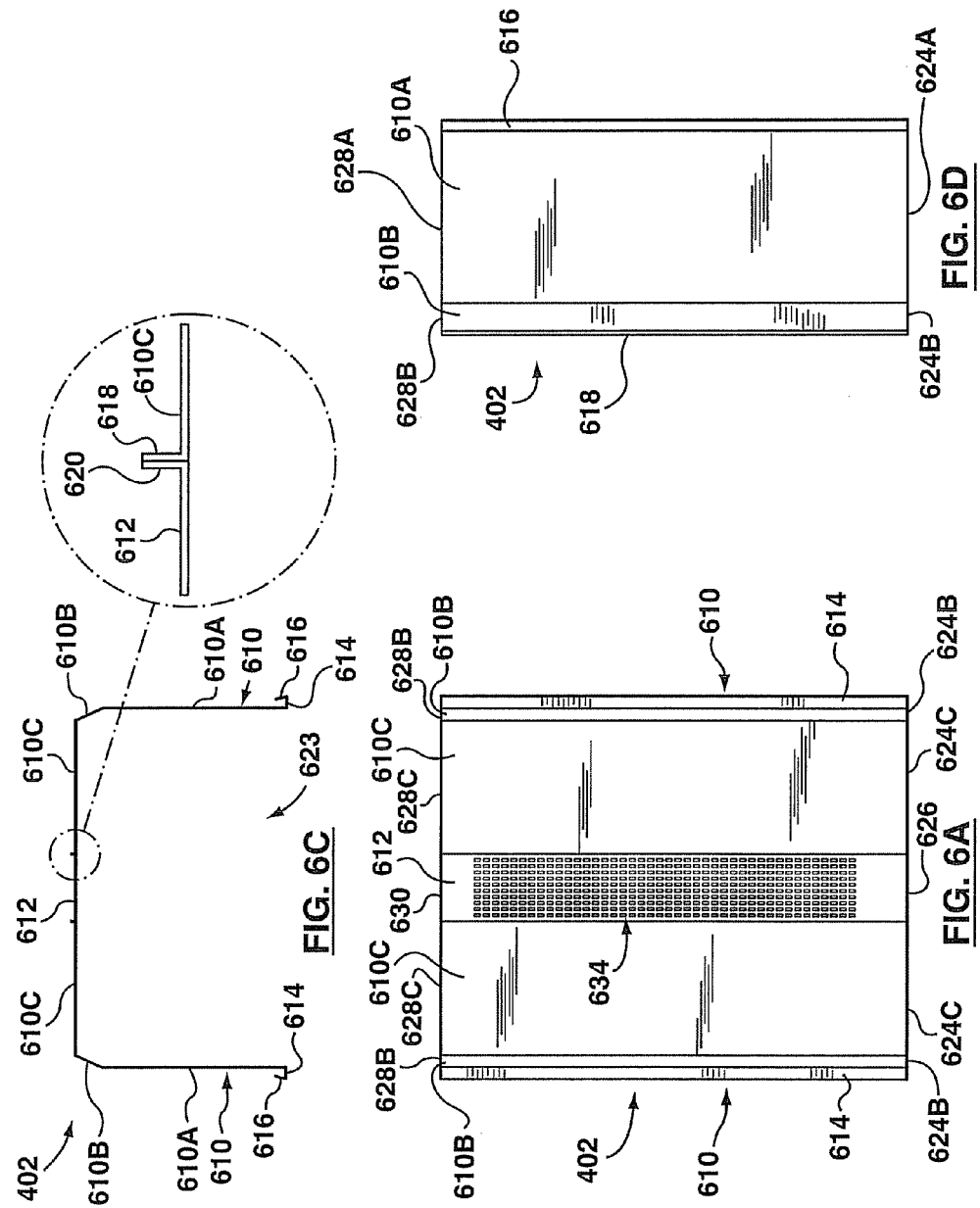

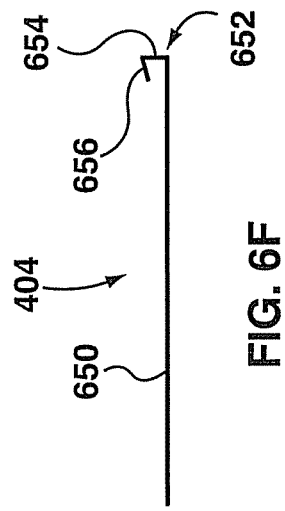
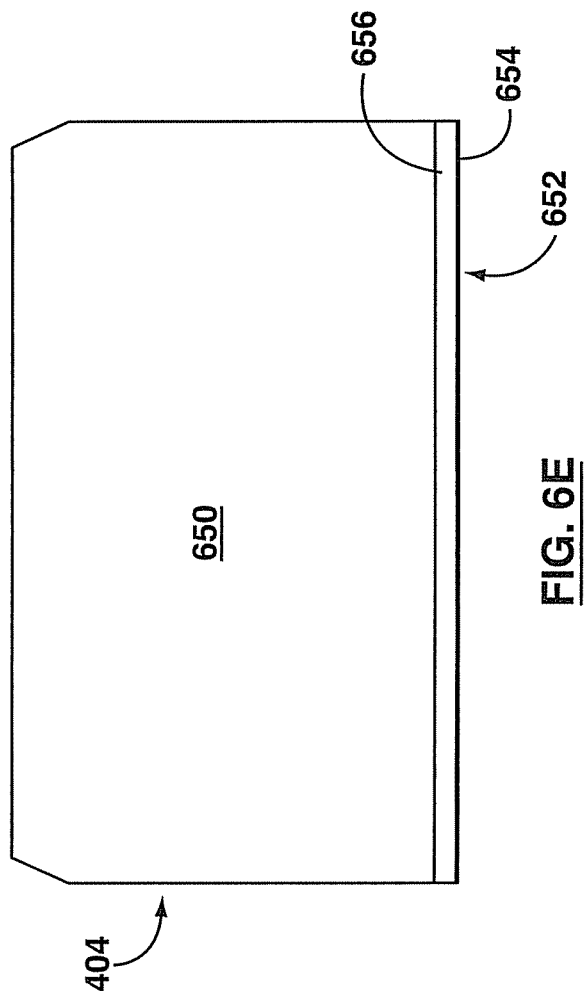
FIG. 6F
FIG. 6E

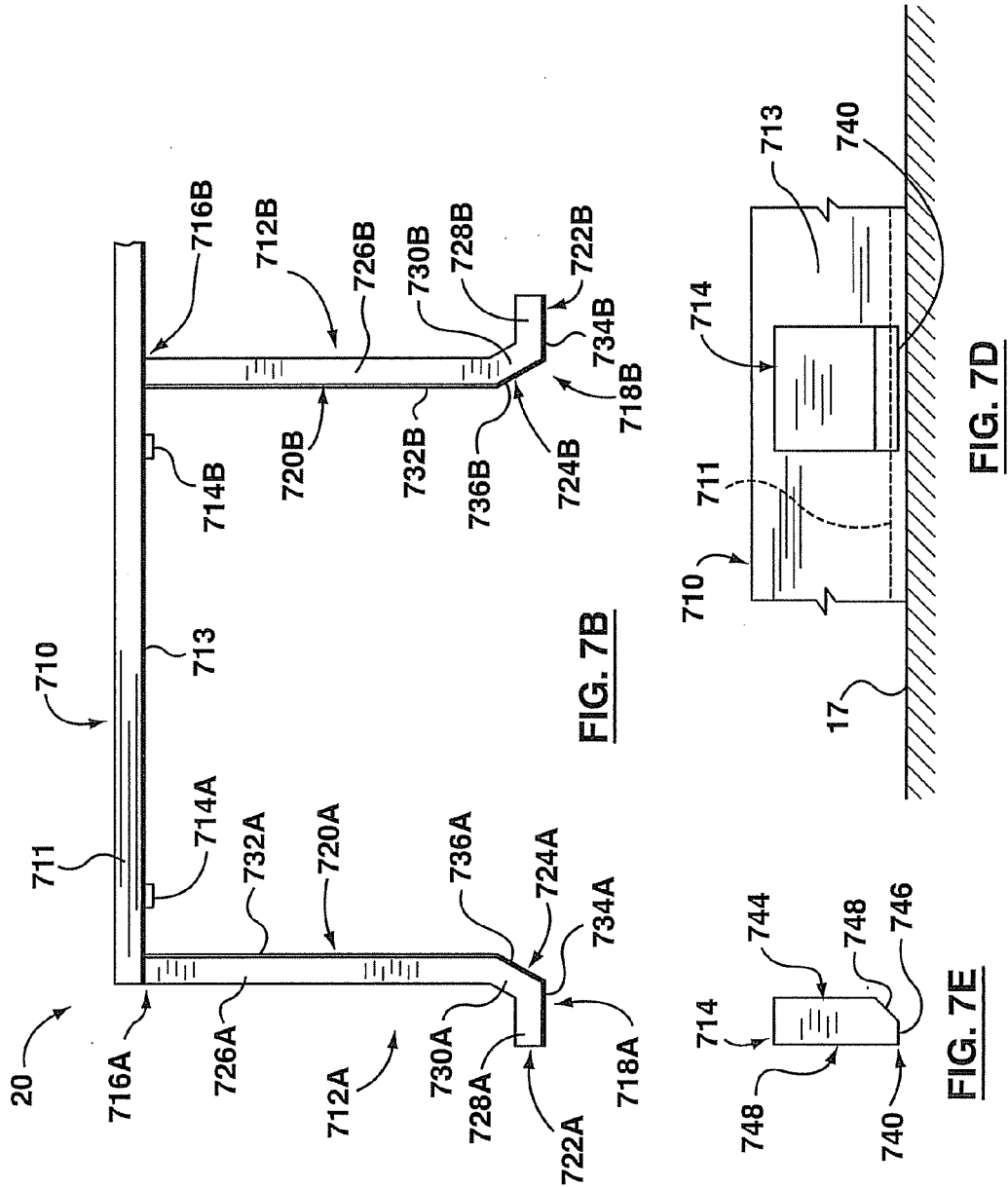

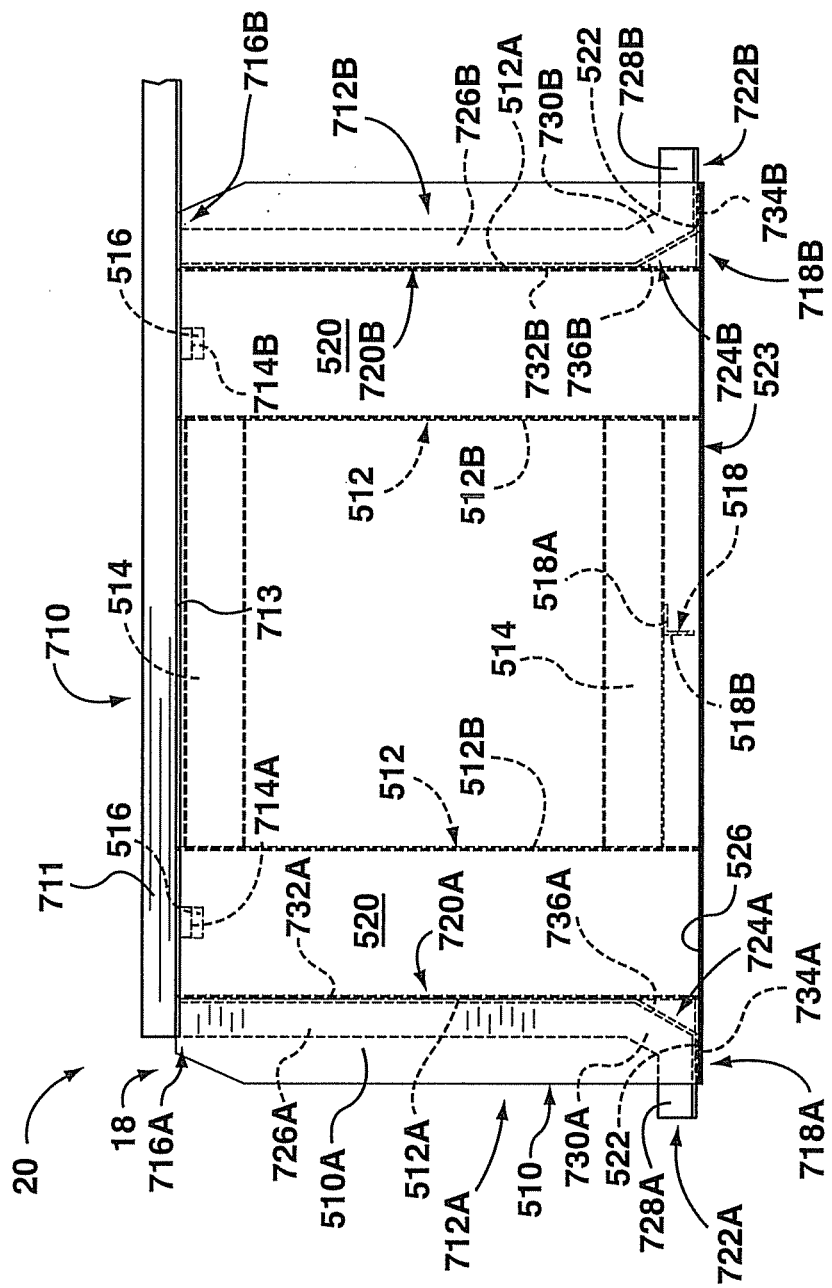

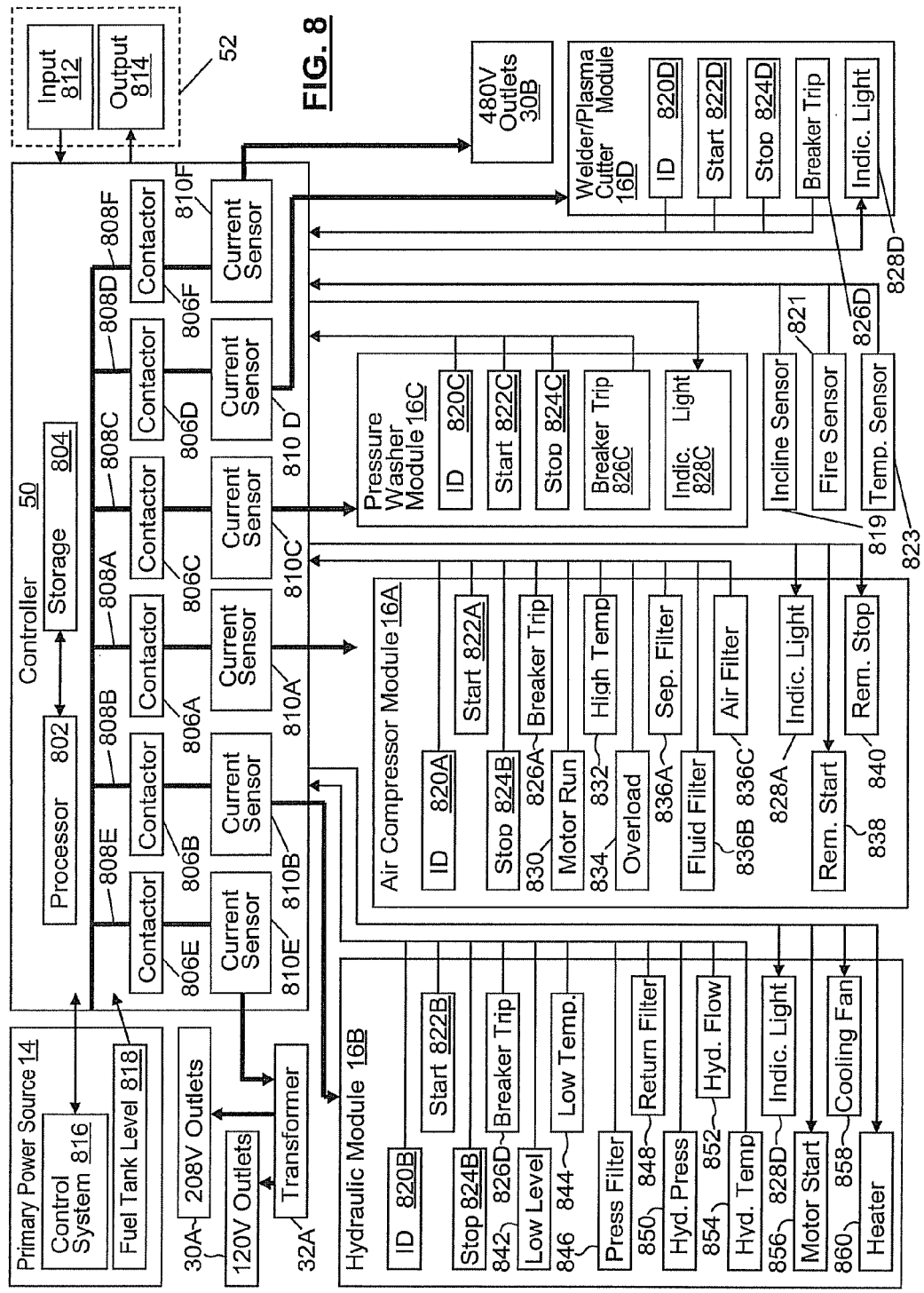

| Alarm Log | | 11/05/2009 7:50:02 AM |
|---|---|---|
| Alarm Time | Message | |
| 11/05/2009 7:50:00 AM | Cassette 1-15A Contactor Failed To Close Alarm | |
| 11/05/2009 7:50:00 AM | Engine Room High Temperature Alarm | |
| 11/05/2009 7:49:56 AM | Engine Room Low Temperture Alarm | |
| 11/05/2009 7:49:00 AM | Low Engine Oil Level Alarm | |
| 11/05/2009 7:49:00 AM | Fuel Tank Low Level Alarm | |
| 11/05/2009 7:49:00 AM | Engine Door Open Alarm | |
| 11/05/2009 7:49:00 AM | Main Door Open Alarm | |
| 11/05/2009 7:49:00 AM | Carbom Monoxide Alarm | |
| 11/05/2009 7:49:00 AM | Fier Alarm Triggered | |
| 11/05/2009 7:49:00 AM | Emergency Stop Pressed | |
| 11/05/2009 7:49:00 AM | Cassette 1-15A Contactor Failed To Open Alarm | |
| 11/05/2009 7:49:00 AM | Cassette 1-15A Contactor Failed To Close Alarm | |
| 11/05/2009 7:49:00 AM | Engine Room High Temperature Alarm | |
| 11/05/2009 7:49:00 AM | Engine Room Low Temperature Alarm | |
| 11/05/2009 7:49:00 AM | Low Engine Oil Level Alarm | |
| 11/05/2009 7:48:00 AM | Fuel Tank Low Level Alarm | |
| 11/05/2009 7:48:00 AM | Engine Door Open Alarm | |
| 11/05/2009 7:48:00 AM | Main Door Open Alarm | |
| Clear History | ◀ ◀◀ ▶▶ ▶ | Close |

FIG. 14A

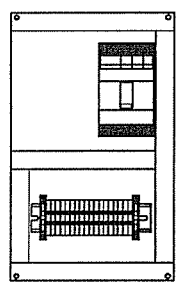 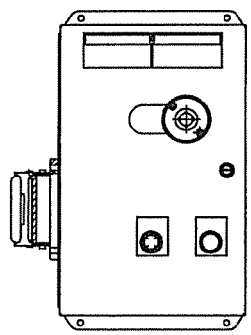 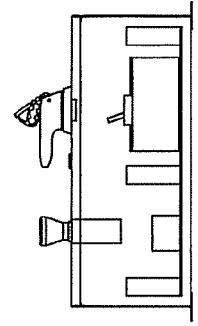
Air Compressor
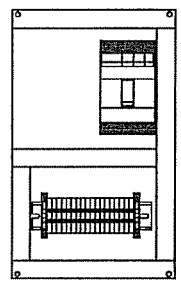 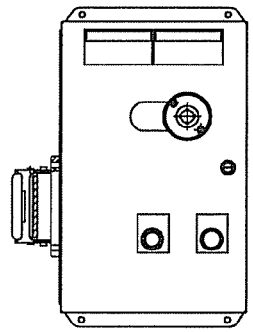 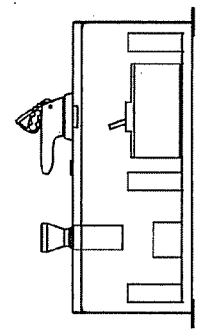
Pressure Washer
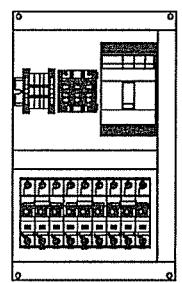 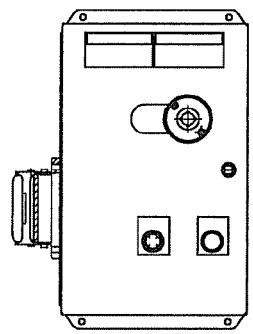 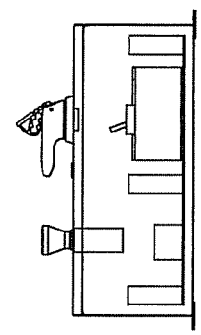
Welder
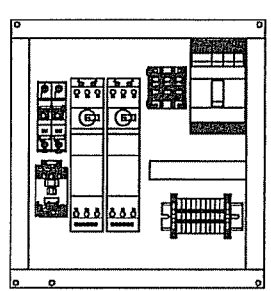 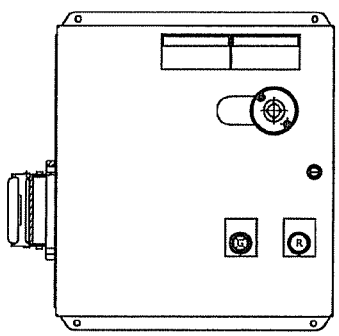 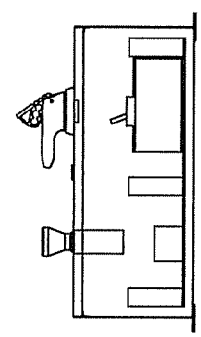
Hydraulic
FIG. 15B

TRANSPORTABLE MODULAR MULTI-APPLIANCE DEVICE

FIELD OF INVENTION

The present invention relates to appliances for performing functions at an operation site, and more particularly to a transportable modular multi-appliance device.

BACKGROUND OF THE INVENTION

A wide variety of relatively stationary appliances, such as welders and plasma cutters, pressure washers, air compressors, hydraulic and pneumatic power packs, and the like, are often used in construction projects and similar operations. In addition, other types of appliances, such as water filtration systems, air filtration systems, food preparation systems, water heaters, computer systems, visual display systems and communication systems may be required at an operation site. Such appliances must be transported to the operation site, and must also be provided with electrical power once at the operation site, each of which presents logistical difficulties. In addition, depending on the type of work to be performed, different combinations of appliances may be required, inhibiting standardization.

One approach, exemplified by a line of products offered under the trademark MultiPower Systems by Mobile Hydraulic Equipment Co., LLC of 1544 Howell, Kansas City, Mo., U.S.A. 64116, is to provide a permanent assembly of various pieces of equipment. A significant disadvantage of this arrangement is that in certain circumstances one or more pieces of equipment within the assembly may sit idle at a given site, and more than one unit may be required where multiple units of a particular piece of equipment in the assembly are needed.

SUMMARY OF THE INVENTION

In one aspect, the present invention is directed to a transportable modular multi-appliance device. The transportable modular multi-appliance device comprises a container and a primary power source disposed inside the container for producing AC power. A plurality of AC-powered functional modules is removably mounted inside the container, with each AC-powered functional module being removably electrically coupled to the primary power source so as to receive the AC power therefrom. A plurality of sensors is provided for monitoring the AC-powered functional modules, and the transportable modular multi-appliance device further comprises a controller. The controller is coupled to the primary power source and to the sensors, and is configured to automatically control the primary power source and allocate the AC power supplied by the primary power source among the AC-powered functional modules in response to inputs from the plurality of sensors.

In one embodiment, the transportable modular multi-appliance device further comprises a plurality of AC outlets electrically coupled to the primary power source so as to receive AC power from the primary power source. In this embodiment, the AC outlets are accessible from outside the container, and the controller is configured to automatically control the primary power source and allocate the AC power supplied by the primary power source among the AC-powered functional modules and the AC outlets in response to inputs from the plurality of sensors.

In one embodiment, the primary power source is a diesel generator. In another embodiment, the primary power source is a gasoline generator.

In one embodiment, the plurality of AC-powered functional modules includes at least one secondary power source, and each such secondary power source is operable to convert the AC power into a respective secondary form of power. The secondary forms of power may be selected from the group consisting of pneumatic power, DC power, hydraulic power and mechanical power, and the secondary power sources may be selected from the group consisting of welding power supplies, plasma cutters, air compressors, hydraulic power units, and pressure washers.

In one embodiment, the sensors include at least one diagnostic sensor positioned to monitor an operational parameter of at least one of the AC-powered functional modules, and the controller is configured to cause the primary power source to cease supplying AC power to a corresponding one of the AC-powered functional modules in response to an input from an associated diagnostic sensor indicating a critical fault in that AC-powered functional module.

At least one fire sensor may be positioned to detect a fire inside the container, and the controller may be configured to deactivate the primary power source in response to a signal from the at least one fire sensor indicating a fire. The controller may be further configured to provide an alarm signal in response to a signal from the at least one fire sensor indicating a fire.

In one embodiment, the sensors include usage sensors for each of the AC-powered functional modules indicating whether the associated AC-powered functional module is in use. In such an embodiment, the controller is configured to cause the primary power source to cease supplying the AC power to a corresponding one of the AC-powered functional modules in response to an input from an associated one of the usage sensors indicating that the corresponding one of the AC-powered functional modules has been idle for a predetermined period of time.

In one embodiment, the container is ISO 668 compliant.

BRIEF DESCRIPTION OF THE DRAWINGS

These and other features of the invention will become more apparent from the following description in which reference is made to the appended drawings wherein:

FIG. 2A is a first side view of the transportable modular multi-appliance device of FIG. 1A;

FIG. 5A is a plan view of a base of the module enclosure of FIG. 4A;

FIG. 5C is a front view of the base of FIG. 5A;

FIG. 6A is a front view of a wall assembly of the module enclosure of FIG. 4A;

FIG. 6C is a plan view of the wall assembly of FIG. 6A;

FIG. 6D is a side view of the wall assembly of FIG. 6A;

FIG. 6E is a top view of a roof of the module enclosure of FIG. 4A;

FIG. 6F is a side view of the roof of FIG. 6E;

FIG. 7B is a plan view of a single exemplary module receptacle;

FIG. 7D is a front view of an exemplary hold-down block;

FIG. 7E is a side view of the hold-down block of FIG. 7D;

FIG. 7F is a plan view showing the module enclosure base of FIG. 5A received by the module receptacle of FIG. 7B;

FIG. 8 is a schematic representation of the controller and the primary power source, functional modules and other components of the transportable modular multi-appliance device of FIG. 1A, showing the sensor arrangements and electrical connections therebetween;

FIG. 14A shows an exemplary screen presentation of an exemplary log to a user; according to an aspect of the present invention;

FIG. 15B shows various views of functional module control panels; according to an aspect of the present invention;

DETAILED DESCRIPTION

Reference is now made to FIGS. 1A to 1E, where an exemplary transportable modular multi-appliance device according to an aspect of the present invention is shown generally at 10. The transportable modular multi-appliance device 10 comprises a container 12, which may be, for example, an ISO 668 compliant container. The contents of the ISO 668 standards, published by the International Organization for Standardization, are hereby incorporated by reference in their entirety. The container 12 is generally rectangular, and comprises a base 12A, two opposed side walls 12B and 12C, two opposed end walls 12D and 12E, and a roof 12F (See FIGS. 1E and 2A to 2F).

In the illustrated embodiment, the container 12 is a 1 CC container, and therefore has a length of approximately 19 feet, 10½ inches (approximately 6058 millimeters) a width of approximately 8 feet (approximately 2438 millimeters) and a height of approximately 8 feet, 6 inches (approximately 2591 millimeters). In other embodiments, other sizes of container, such as a 2 CC container having a length of 39 feet, 9 inches (approximately 12116 millimeters), a width of 8 feet (approximately 2438 millimeters) and a height of 8 feet, 6 inches (approximately 2591 millimeters), may also be used. Where ISO 668 compliant containers are used, as in the illustrated embodiment, the container 12 is well-suited to travel by ship, rail and truck, or by any combination thereof. Other types and sizes of container may also be used.

In FIGS. 1A to 1D, the roof of the container 12 has been omitted in order to permit illustration of the interior of the container 12 and the components of the transportable modular multi-appliance device 10.

Figure 1A:
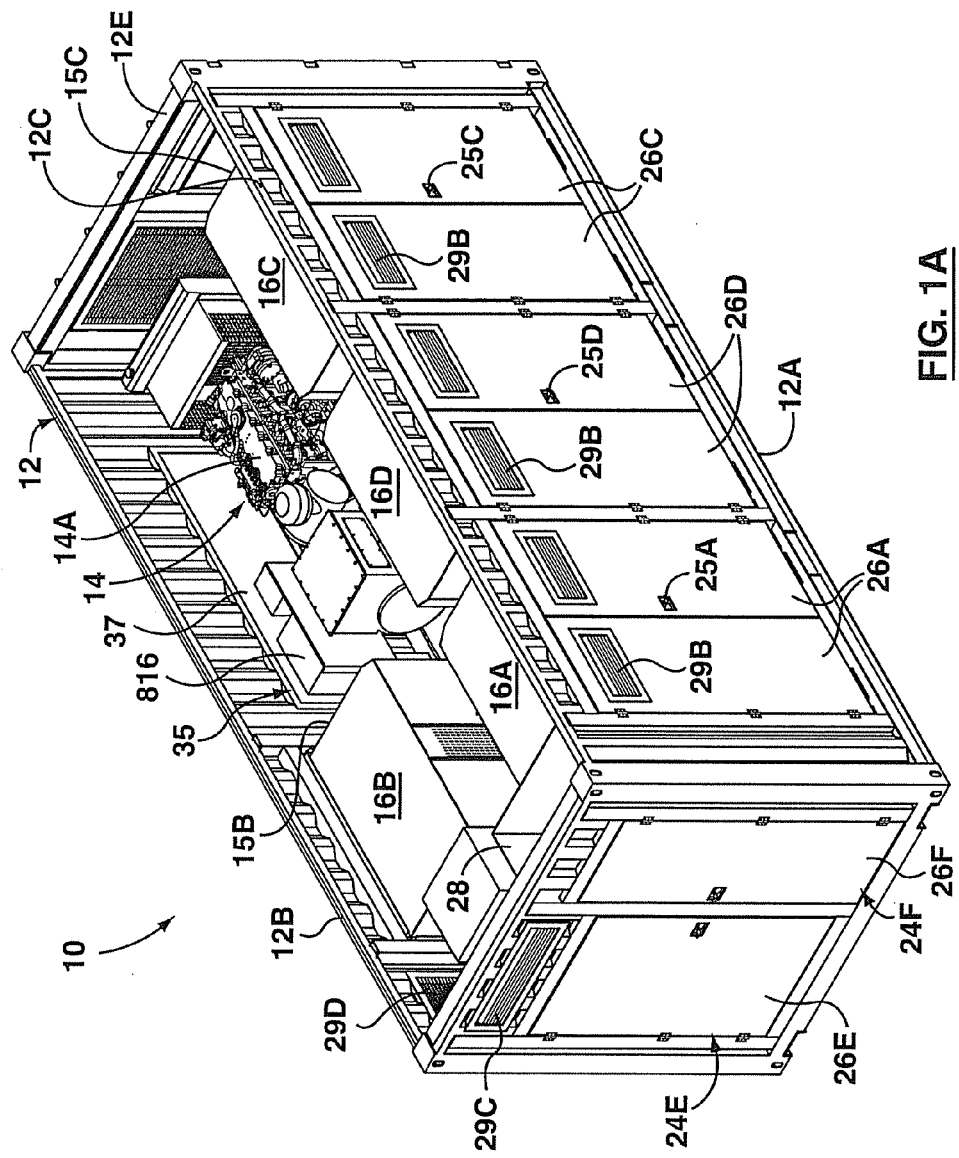
FIG. 1A is a first isometric view of an exemplary transportable modular multi-appliance device according to an aspect of the present invention, with its roof omitted to show the interior thereof.
Figure 1B:
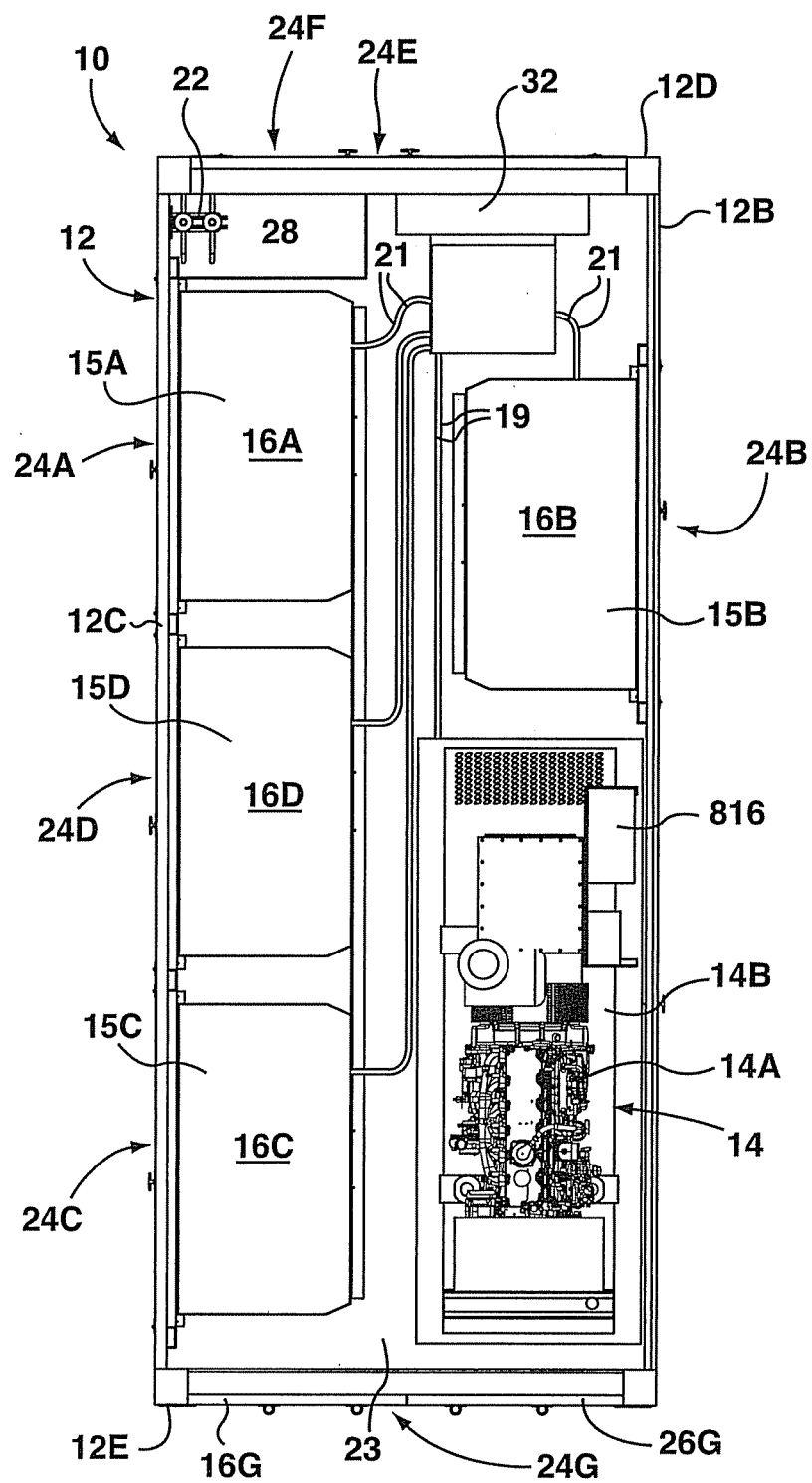
FIG. 1B is a plan view of the transportable modular multi-appliance device of FIG. 1A, with its roof omitted to show the interior thereof.
Figure 1C:
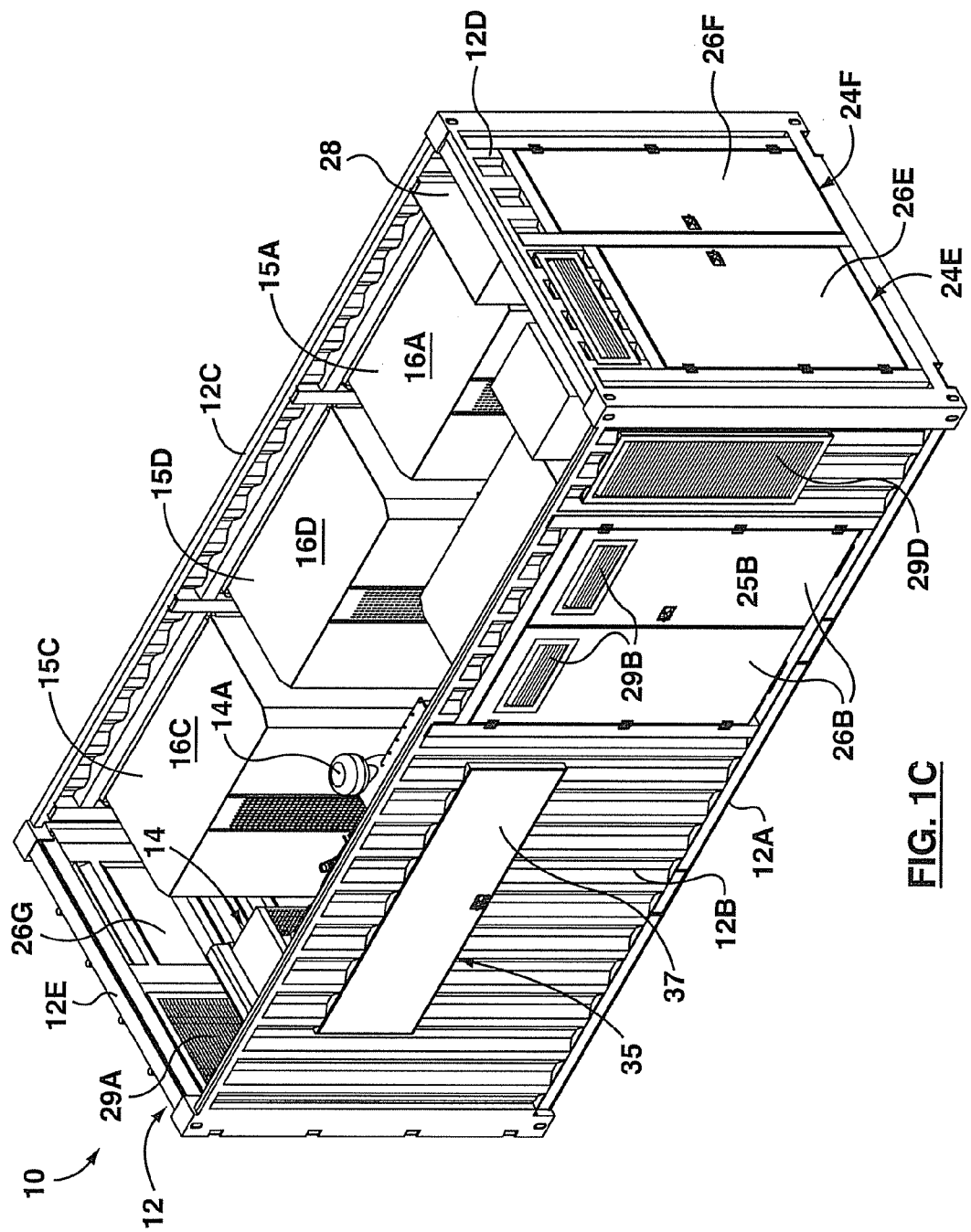
FIG. 1C is a second isometric view of an exemplary transportable modular multi-appliance device according to an aspect of the present invention, with its roof omitted to show the interior thereof.

As best seen in FIG. 1B, a primary power source 14 for producing AC power is disposed inside the container 12 and secured thereto. In the illustrated embodiment, the primary power source is a diesel-fuelled electrical generator offered under model number 1P-D150-8 by Caterpillar Inc, having an address at 100 North East Adams Street, Peoria, Ill., U.S.A., 61629. Other types of primary power source may also be used, such as other types of diesel generators, and gasoline generators. As will be explained in greater detail below, the size and capacity of the primary power source should be selected in view of the size of the container in which it is housed, and the number of functional modules to be powered as well as their electrical requirements. Such selection is within the capability of one skilled in the art, once informed by the herein disclosure.

Also preferably, the primary power source 14 produces all of the electricity required by the transportable modular multi-appliance device 10, with no need to connect to an external power grid, and is part of a unit which includes a fuel tank. Optionally, the primary power source may be capable of being coupled to an external power grid to receive power therefrom. Preferably, the primary power source has an integral fuel tank which can store a sufficient quantity of fuel to provide twenty-four hours of continuous power with all functional modules (described below) in use at 100% of their respective outputs. For example, the Caterpillar 1P-D150-8 diesel-fuelled electrical generator used in the exemplary embodiment comprises an electrical generation unit 14A secured on top of a fuel tank housing 14B (best seen in FIG. 1B). In addition, where the primary power source does not include an integral fuel tank, or to provide additional capacity, an external fuel tank may be secured inside the container (not shown). In one embodiment (not shown), the container may include an interior floor which is raised relative to the exterior bottom of the container so that the exterior container bottom, interior container floor and container walls define an interior volume in which fuel can be stored. In a preferred implementation of such an embodiment, an internal fuel tank is secured within the volume so defined, with the walls of the fuel tank being spaced inwardly from the exterior walls of the container to provide a double-wall structure so that a puncture of an exterior wall of the container will not necessarily puncture the corresponding fuel tank wall. Moreover, external fuel tanks (not shown) may be positioned outside of the container 12 and used to store additional fuel used by the primary power source 14, and may be coupled to the primary power source 14 to provide fuel thereto by conventional techniques. As will be described in greater detail below, suitable ventilation is provided in the container 12 for venting exhaust fumes from the primary power source 14 and fuel tank. The primary power source 14 is grounded to the container 12, which is itself grounded at an operation site by way of ground rods 22 (FIG. 1B). Specifically, the ground rods 22 are driven into the ground at the operation site, and electrically connected by cable to the container 12, so that the primary power source is effectively grounded.

A plurality of AC-powered functional modules 16A to 16D are removably mounted inside the container 12. Each of the functional modules 16A to 16D comprises a respective enclosure 15A to 15D that contains one or more functional units. As used herein, the term "functional unit" refers to any apparatus which can receive AC power, directly or indirectly, from a primary power source to perform a particular function. For example, a functional unit may include an integral transformer and/or rectifier and receive AC power directly from the primary power source, or a particular functional module may include an intervening transformer and/or rectifier and/or an uninterruptible power supply from which the functional units draw current. Each of the functional modules 16A to 16D is removably electrically coupled to the primary power source 14 so as to receive AC power therefrom. In the illustrated embodiment, the functional modules 16A to 16D receive AC power from the primary power source 14 by way of an electrical and control assembly 32. More particularly, AC electrical current flows from the primary power source 14 to the electrical and control assembly 32 via cables 19, and then flows from the electrical and control assembly 32 to the functional units 16A to 16D by way of cables 21, and then returns via the cables 19 and 21 to the primary power source 14 to complete the circuit. Preferably, the primary power source 14 is selected so that it can provide continuous power at 60 Hz regardless of demand variations, and can provide such power with all four functional modules 16A to 16D, as well as the AC outlets 30A, 30B (described below) and any lighting systems forming part of the transportable modular multi-appliance device 10, in use simultaneously, for at least twenty-four hours.

Examples of functional units include welding power supplies, plasma cutters, air compressors, hydraulic power units, pressure washers (including hot water pressure washers), water filtration systems, air filtration systems, food preparation systems, water heaters, heating, ventilation and air conditioning (HVAC) systems, computer systems, video game systems, visual display systems, communication systems, lighting systems such as light stands, as well as many others. In the illustrated embodiment, each of the functional modules 16A to 16D comprises a standardized enclosure 15A to 15D of standard size and shape within which one or more functional units are secured. As will be described in greater detail below, each enclosure 15A to 15D comprises a base in the form of a cassette 18 which can be removably secured to the floor of the container 12, and further comprises a wall assembly 402 and a roof 404 (see FIGS. 4A to 6F).

One particular type of functional module which is particularly advantageous in certain applications, such as construction, is a secondary power source. As used herein, the term "secondary power source" refers to a machine, device or system that is operable to convert the AC power received (directly or indirectly) from the primary power source into a secondary form of power. Examples of secondary forms of power include pneumatic power, DC current, hydraulic power and mechanical power. As such, typical types of secondary power sources which may advantageously be used as, or as part of, a functional module include welding power supplies, plasma cutters, air compressors, hydraulic power units, and pressure washers (including hot water pressure washers), to which the appropriate tools may be attached. Welding power supplies which may be used include those for stick welding, TIG welding and MIG welding. Where MIG and/or TIG welding power supplies are used as secondary power sources, provision must be made for containers for the gas required for the welding process. Optionally, the welding power supply functional modules may include a cavity or other receptacle for receiving such gas containers, or, alternatively, receptacles for securely receiving the gas containers may be defined inside the container. In the further alternative, brackets or other fittings may be provided on the exterior of the container (not shown) for receiving gas containers provided at a construction site.

In the exemplary embodiment, each of the functional modules 16A to 16D contains at least one secondary power source. The functional modules 16A to 16D consist of an air compressor module 16A, which provides a form of pneumatic power, an hydraulic power module 16B, which provides a form of hydraulic power, a pressure washer module 16C, which provides a form of hydraulic power, and a welder/plasma cutter module 16D (comprising several individual welder packs and/or plasma cutters secured within a single enclosure), which provides DC power. It is to be appreciated that functional modules 16A to 16D are merely exemplary of common types of functional modules that can be used as part of a transportable modular multi-appliance device, and that other types of functional module may also be used. In addition, more than one of the same type of functional unit may be used as part of the same transportable modular multi-appliance device, without departing from the scope of the present invention. For example, three air compressor modules and one welder module may be used, or two hydraulic power modules, one air compressor module and one pressure washer module may be used, and so on.

The functional modules 16A to 16D are removably mounted within the container 12 so that each functional module 16A to 16D is aligned with a respective correspondingly-sized aperture 24A to 24D (see FIGS. 1D and 1E) defined in the container 12. In particular, an aperture 24C is defined in the side wall 12B of the container 12, and apertures 24A, 24B and 24D are defined in the side wall 12C of the container 12. These apertures 24A to 24D can be selectively opened and closed by way of module access doors 26A to 26D hingedly mounted on the container 12, to permit installation and removal of the functional modules 16A to 16D, as well as operation thereof. The module access doors 26A to 26D may be provided with respective locks 25A to 25D so that the functional modules 16A to 16D can be secured inside the container 12 during transportation and to inhibit theft and other unauthorized access. In addition, respective sensor arrangements (not shown) can be provided at the upper corners of the module access doors 26A to 26D and at corresponding positions on the upper edges of the apertures 24A to 26D to provide signals to a controller 50 (described in greater detail below) indicating whether a particular door 26A to 26D is open or closed. Alternatively (not shown), smaller access ports may be provided in the doors for accessing the power couplings on the functional modules. The functional modules 16A to 16D, as discussed above, are surrounded by standardized enclosures 15A to 15D. The enclosures may themselves have removable or hinged covers for accessing the power couplings or other features.

An electrical access aperture 24E and corresponding electrical access door 26E, and a storage access aperture 24F and a corresponding storage access door 26F are provided in the end 12D of the container 12. The electrical access aperture 24E and corresponding electrical access door 26E provide access to the electrical outlets 30A, 30B and electrical and control assembly 32. The storage access aperture 24F and a corresponding storage access door 26F provide access to a storage space 28, which can be used to store tools and other equipment, such as the ground rods 22. The electrical access door 26E and storage access door 26F may also be provided with sensor arrangements for detecting whether the electrical access door 26E and storage access door 26F are open or closed.

The end wall 12E defines a main container access aperture 24G, which may be selectively opened and closed by way of main container access doors 26G, so as to selectively enable access to the interior volume of the container 12. The main container access doors 26G can also be provided with sensor arrangements to detect whether they are open or closed.

A number of louvers are provided in the container 12 to permit airflow therethrough to provide ventilation to the primary power source 14, and also to the functional modules 16A to 16D when the same are operated within the container 12. A main louver 29A is disposed in the main container access door 26G adjacent the primary power source 14, and door louvers 29B are disposed in each of the module access doors 26A to 26D. Supplemental louvers 29C and 29D, respectively, are defined in the container end wall 12D above the electrical access door 26E, and in the container side wall 12B adjacent the container end wall 12D.

An engine control access aperture 35, which can be selectively opened and closed by way of a hingedly mounted door 37, is defined in the side wall 12B of the container 12, and provides direct access to the electrical generation unit 14A and the control system of the primary power source 14.

FIGS. 2A to 2F show various views of the exterior of the transportable modular multi-appliance device.

Figure 2B:
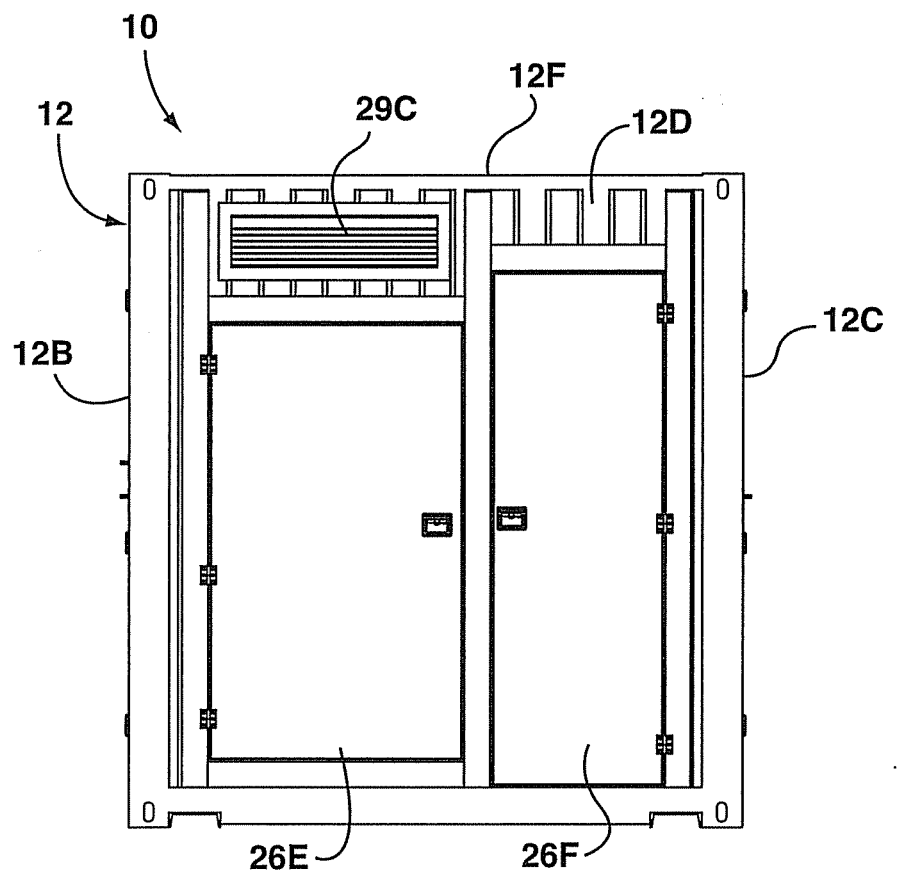
FIG. 2B is a first end view of the transportable modular multi-appliance device of FIG. 1A.
Figure 2C:
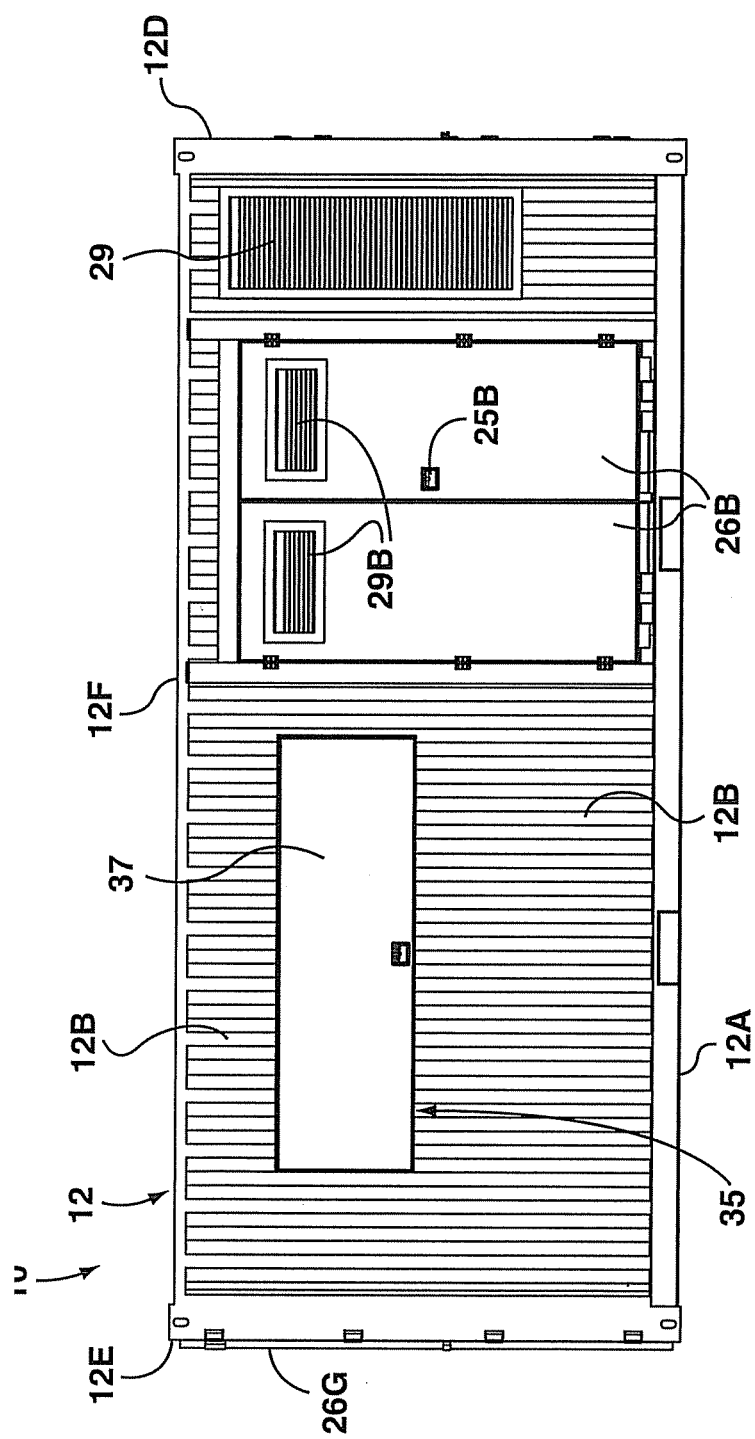
FIG. 2C is a second side view of the transportable modular multi-appliance device of FIG. 1A.
Figure 2D:
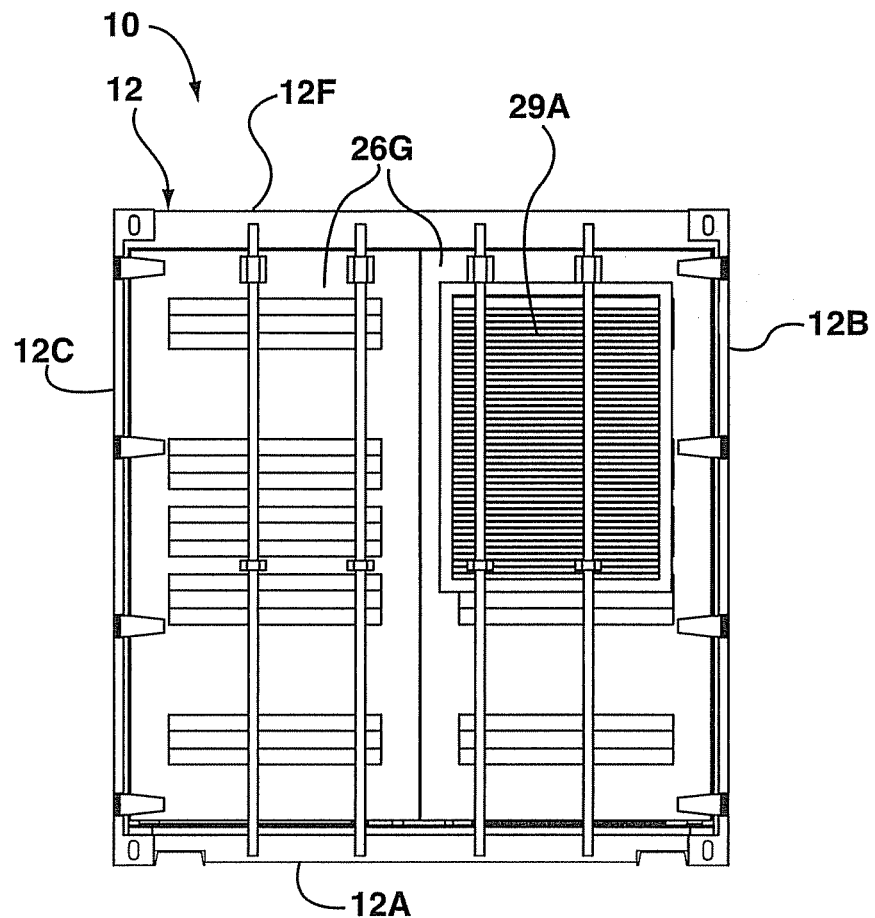
FIG. 2D is a second end view of the transportable modular multi-appliance device of FIG. 1A.
Figure 2E:
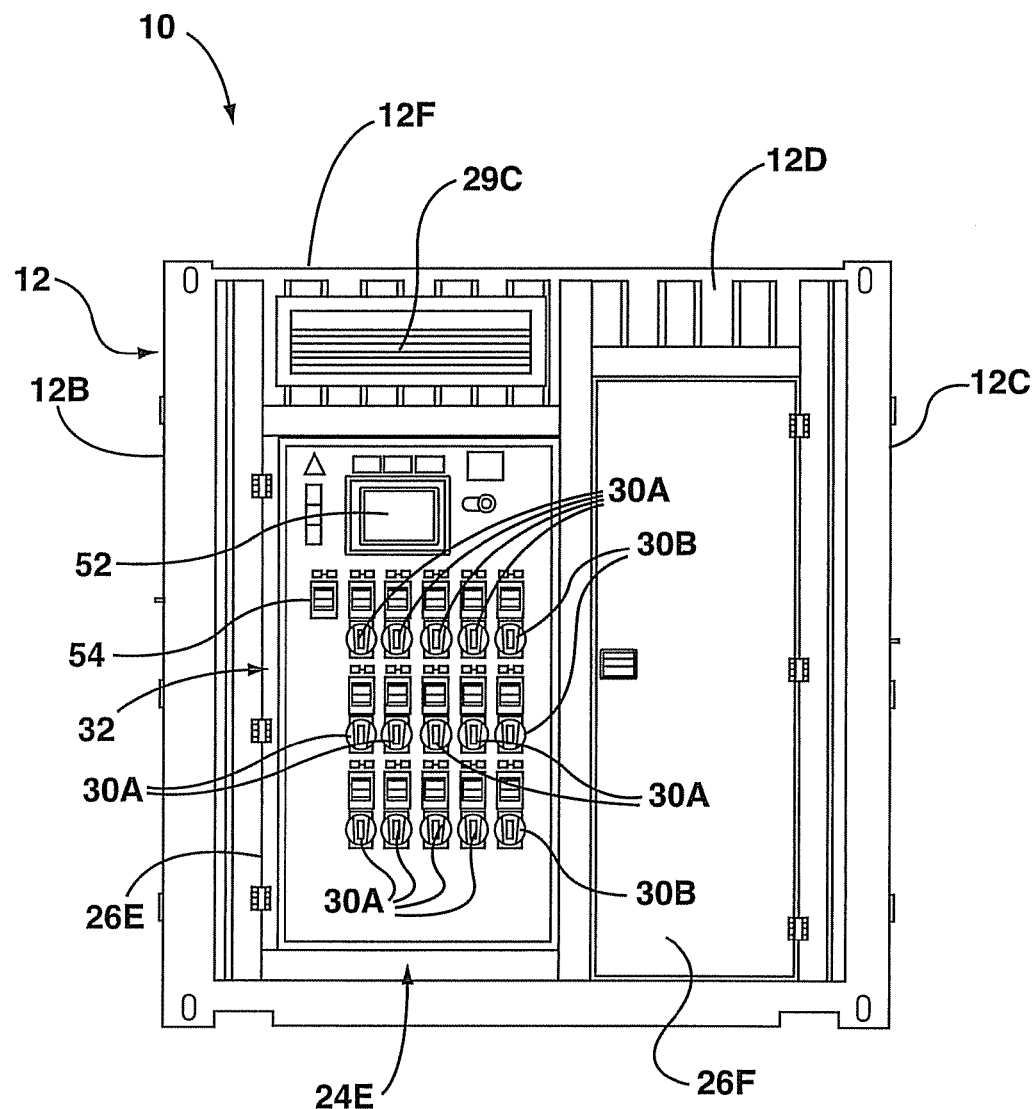
FIG. 2E is an end view of the transportable modular multi-appliance device of FIG. 1A, analogous to that shown in FIG. 2B, with an electrical access door thereof open.
Figure 2F:
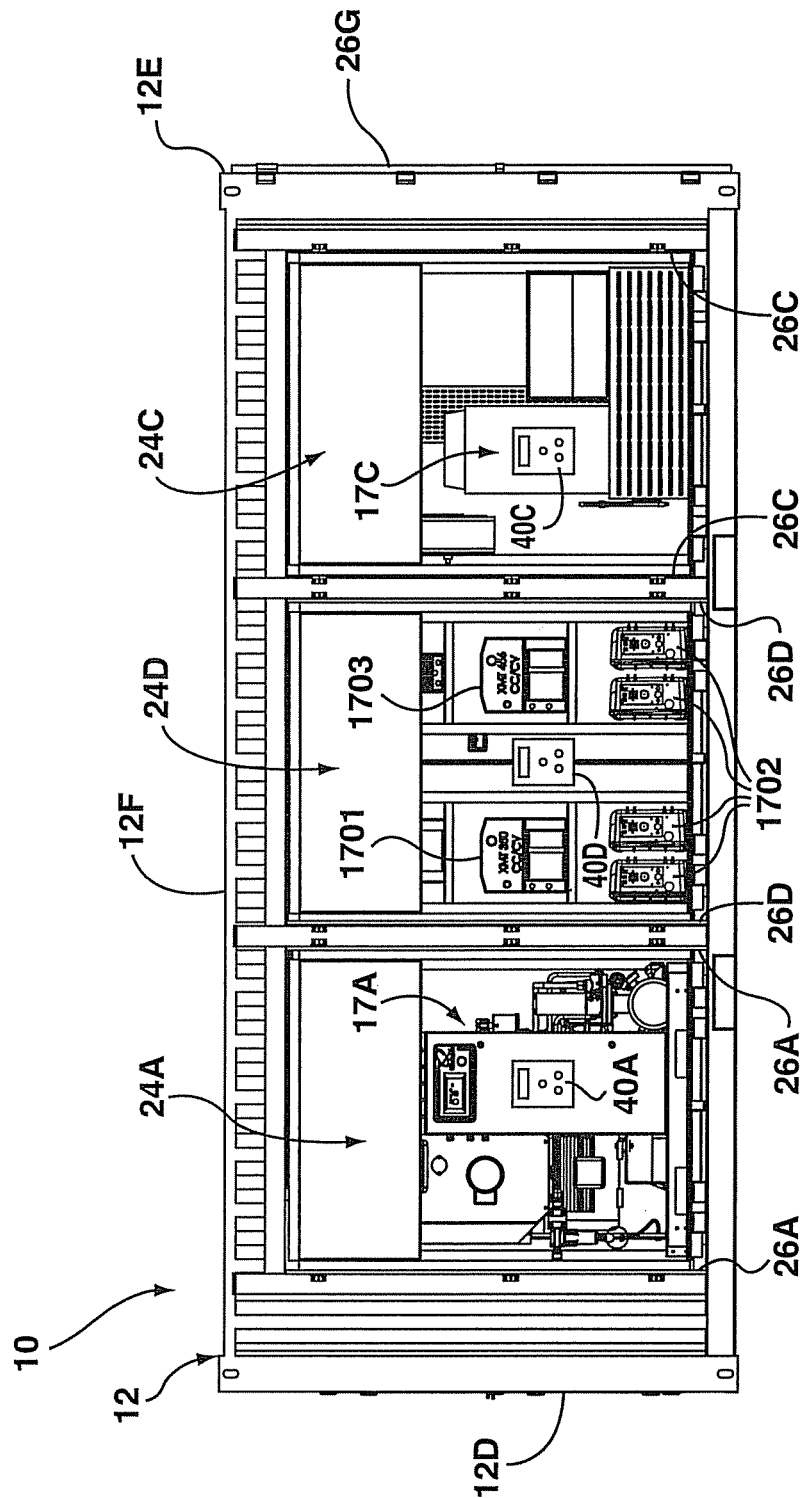
FIG. 2F is a side view of the transportable modular multi-appliance device of FIG. 1A, analogous to that shown in FIG. 2A, with module doors thereof open.

As best seen in FIG. 2E, a plurality of AC outlets 30A and 30B are accessible from outside the container 12. These include 120V and 208V outlets 30A, which are electrically coupled by way of the electrical and control assembly 32 and electrical cable 19 to the primary power source 14 so as to receive transformed AC power from the primary power source 14, and also include 480V outlets 30B which receive untransformed AC power from the primary power source 14. Typically, the 120V outlets 30A will be single phase and the 480V 30B outlets will be three phase, and the 208V outlets 30A may be single phase or three phase, or some may be single phase and others may be three phase. In the illustrated embodiment, the AC outlets 30A, 30B and electrical and control assembly 32 are positioned adjacent the end wall 12D, in registration with the electrical access aperture 24E, which as noted above is selectably closable by the corresponding electrical access door 26E. The AC outlets 30A, 30B can be used to power electrical apparatus such as handheld power tools, fans, and lights. Optionally, the container 12 may include integral interior and exterior lighting (not shown).

Figure 3A:
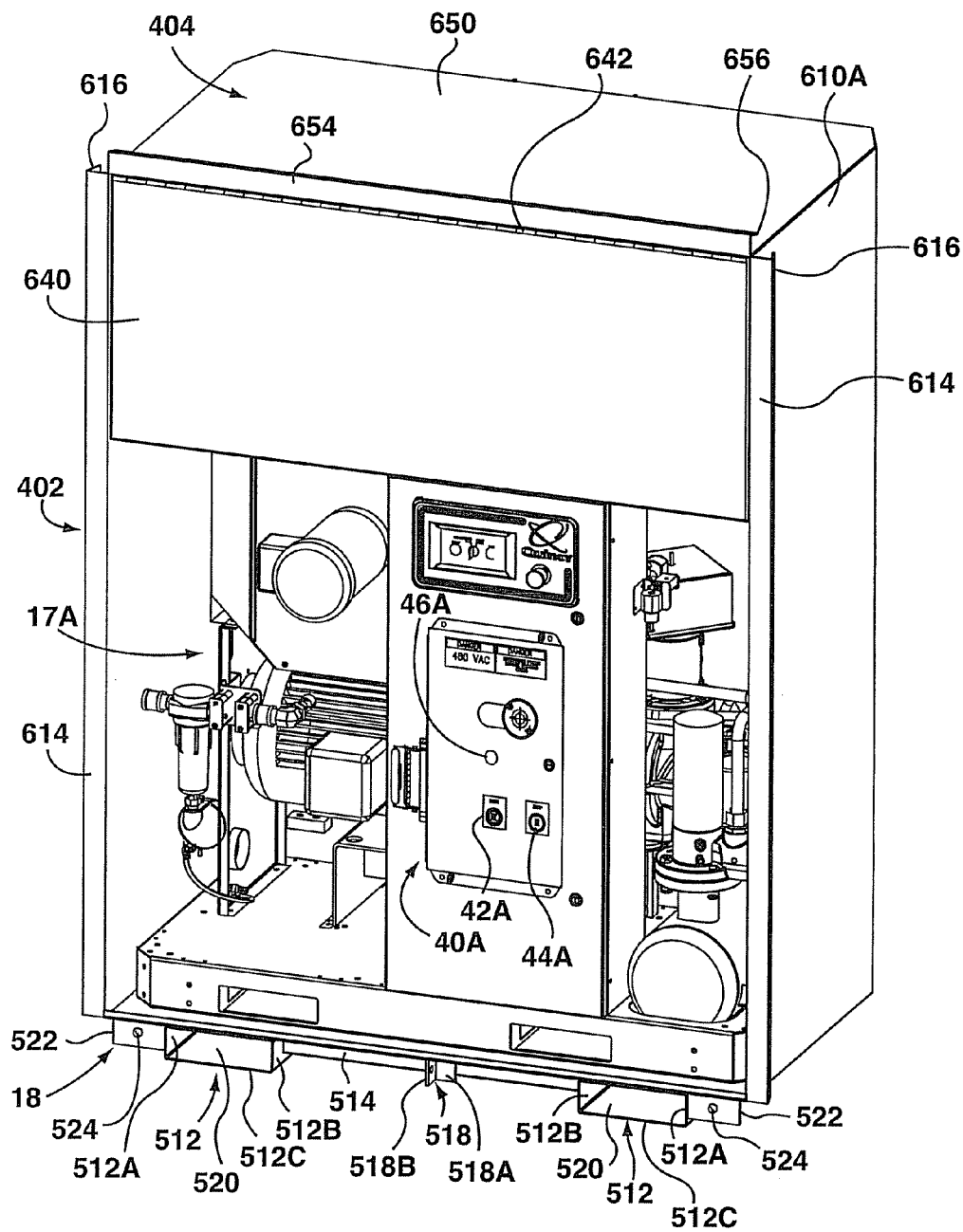
FIG. 3A is a perspective view of an exemplary air compressor module according to an aspect of the present invention.
Figure 3B:
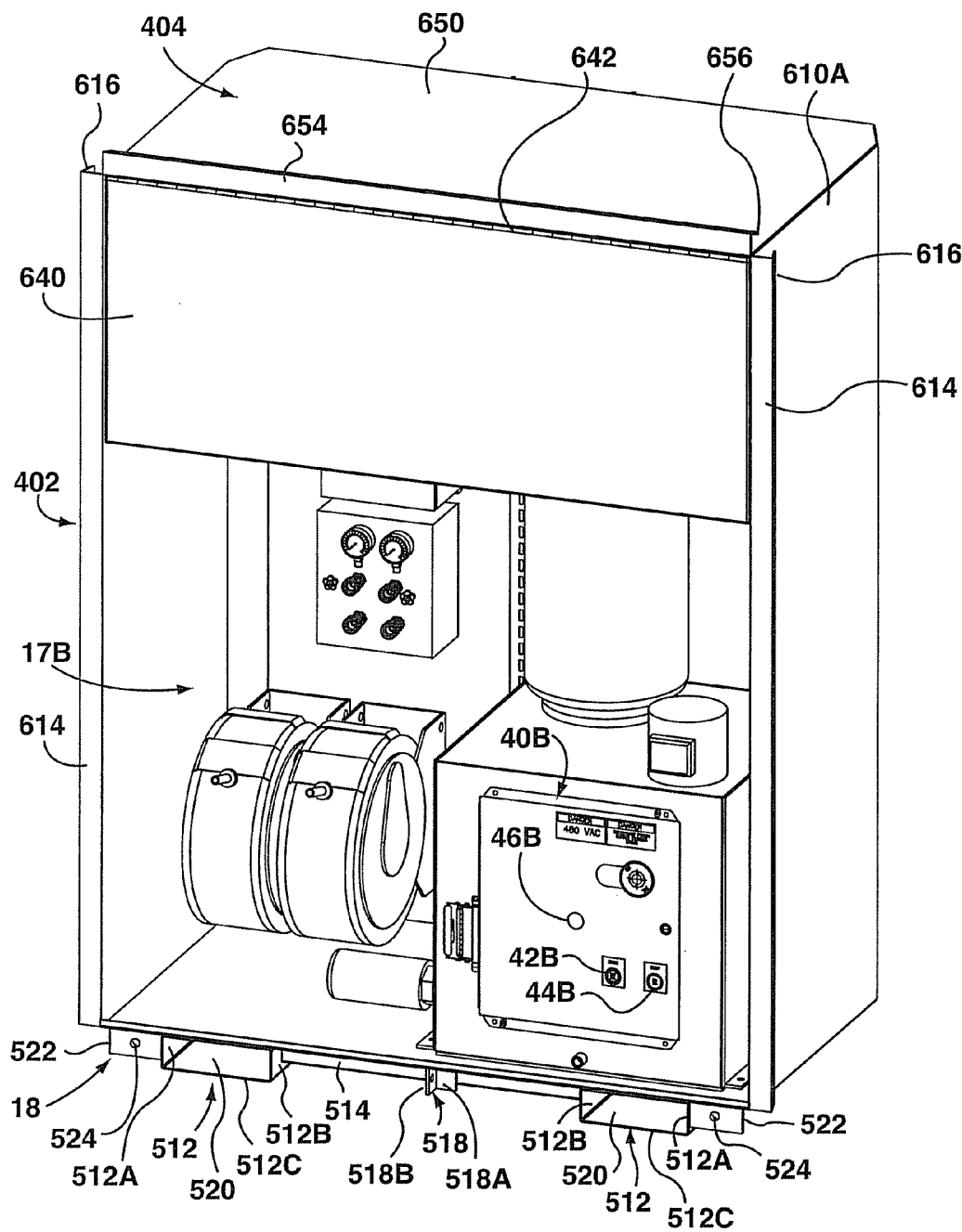
FIG. 3B is a perspective view of an exemplary hydraulic power module according to an aspect of the present invention.
Figure 3C:
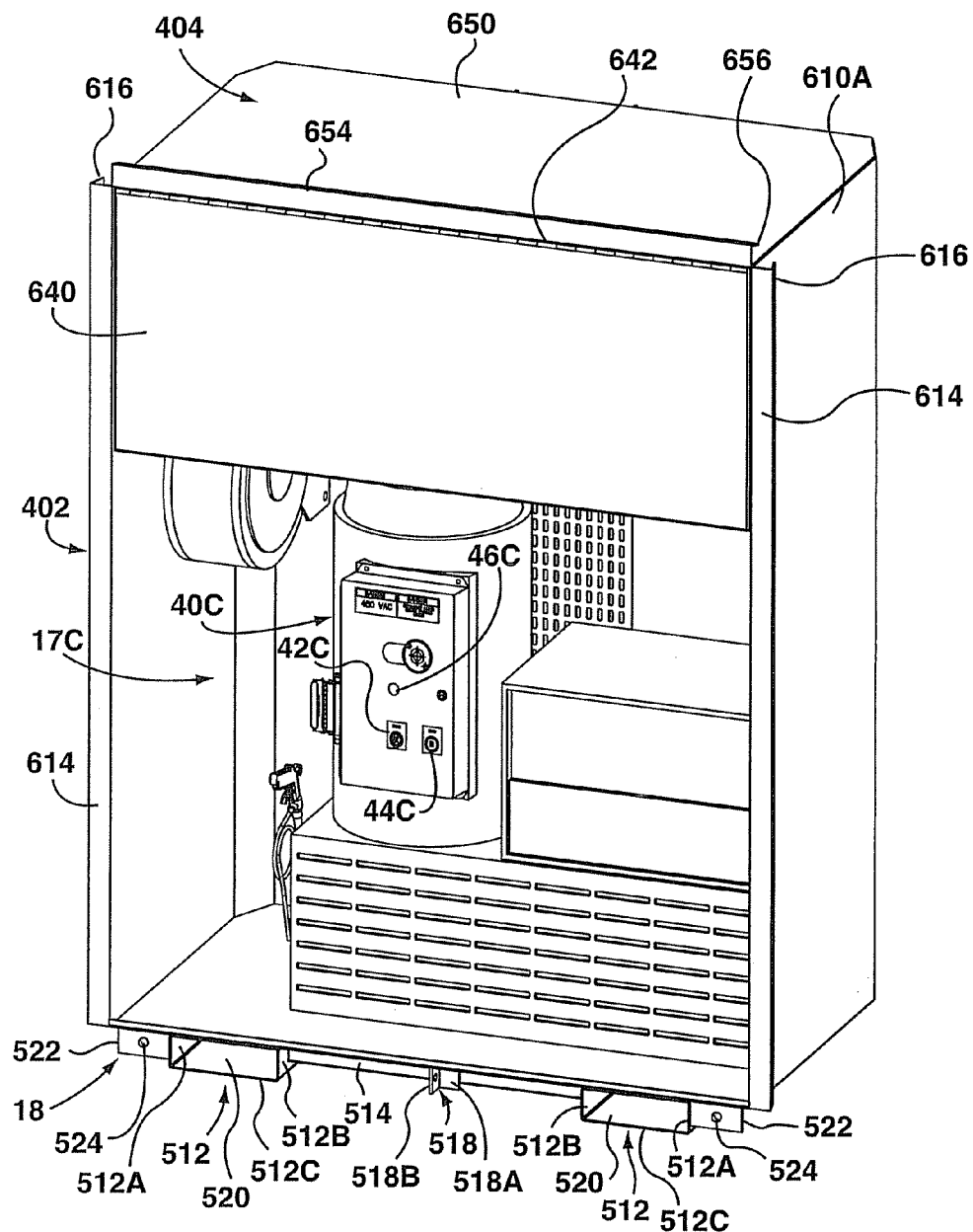
FIG. 3C is a perspective view of an exemplary pressure washer module according to an aspect of the present invention.
Figure 3D:
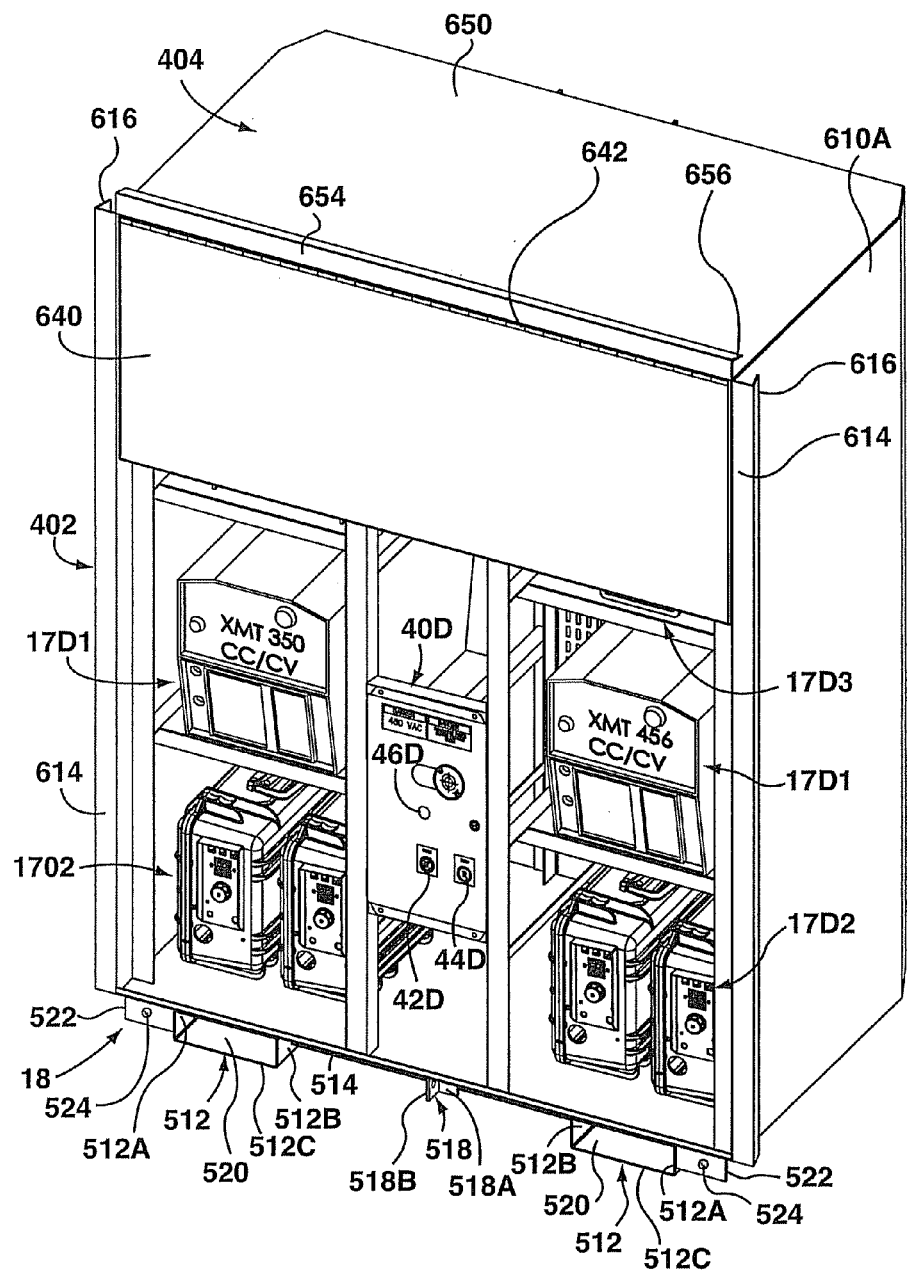
FIG. 3D is a perspective view of an exemplary welder/plasma cutter module according to an aspect of the present invention.

FIGS. 3A to 3D show, respectively, the air compressor module 16A, the hydraulic power module 16B, the pressure washer module 16C, and the welder/plasma cutter module 16D. Referring to FIG. 3A, the illustrated air compressor functional unit is a model QGD30 rotary screw air compressor offered by Quincy Compressor, having an address at 701 North Dobson Ave., Bay Minette, Ala., U.S.A. 36507, and is indicated generally by the reference numeral 17A. The air compressor module 16A includes a control panel 40A, which has a "start" button 42A, a "stop" button 44A, and an indicator light 46A. Referring to FIG. 3B, the illustrated hydraulic power functional unit, indicated generally by the reference numeral 17B, is a VDC model 61000031 hydraulic power unit available from AVL Manufacturing Inc., having an address at 243 Queen St. N., Hamilton, Ontario, Canada L8R 3N6. The hydraulic power module 16B includes a control panel 40B, which has a "start" button 42B, a "stop" button 44B, and an indicator light 46B. With reference to FIG. 3C, the illustrated pressure washer functional unit, indicated by the reference numeral 17C, is a Hotsy model 1423 SS pressure washer, offered by C-Tech Industries Inc., having an address at 4275 NW Pacific Rim Blvd., Camas, Wash., U.S.A. 98607. The pressure washer module 16C includes a control panel 40C, which has a "start" button 42C, a "stop" button 44C, and an indicator light 46C. Referring now to FIG. 3D, the illustrated welder functional units are an XMT® 350 and an XMT 456 indicated generally by the reference numeral 17D1 along with SuitCase® X-TREME™ VS feeders indicated generally by the reference numeral 17D2, all offered by Miller Electric Manufacturing Co., having an address at 1635 W. Spencer St., P.O. Box 1079, Appleton, Wis., U.S.A. 54912-1079. The plasma cutter functional units (mostly concealed by the canopy 640) are Spectrum® 1000 plasma cutters, also offered by Miller Electric Manufacturing Co. and indicated generally by the reference numeral 17D3. The welder/plasma cutter module 16D includes a control panel 40D, which has a "start" button 42D, a "stop" button 44C, and an indicator light 46D. The construction of the enclosures 15A to 15D, and the associated reference numerals, is described in greater detail below with reference to FIGS. 4A to 6G.

As noted above, the respective enclosure 15A to 15D of each of the functional modules 16A to 16D includes a respective standardized cassette 18A to 18D that can be carried by a forklift and can be removably mounted to the floor 23 of the container 12, as will be described in greater detail below. The functional unit(s) may be secured within the enclosure 15A to 15D of their respective functional modules 16A to 16D by welding, bolts, or any other suitable technique. In certain alternative embodiments (not shown), the roof and wall portions 402, 404, respectively, of the enclosures (e.g. 15A to 15D) may be omitted, and the functional modules may consist of functional units mounted on the cassettes 18. Standardized guide assemblies 20 are provided on the floor 23 of the container 12, in alignment with the apertures 24A to 24D, which cooperate with the standardized cassettes 18A to 18D to facilitate removable mounting of the functional modules 16A to 16D. In the illustrated embodiment, four sets of guide assemblies 20 are used, permitting the removable installation of four cassettes 18 and hence four functional modules; in other embodiments, depending on the size of the container and the size of the functional module enclosures 15, more or fewer sets of guide assemblies 20 may be used. The construction of the exemplary embodiments of the guide assemblies 20, cassettes 18, and functional module enclosures 15, will be described in greater detail below.

In a preferred embodiment, when mounted inside the container 12, the functional modules 16A to 16D are positioned so that they have at least one respective power coupling, tool or other fitting accessible from outside the container 12 by way of the respective apertures 24A to 24D and module access doors 26A to 26D, so that the functional modules 16A to 16D can be used while still secured within the container 12. For example, suitable electrical cables (not shown) may be attached to the power coupling on a welding power supply or plasma cutter, and suitable hoses may be attached to the power coupling of an air compressor, hydraulic power pack, or pressure washer, as is conventionally known. In the case of functional modules which are not secondary power sources, the relevant fittings will be accessible from outside of the container as well. For example, in the case of a water filtration unit, the water input and output connections would be accessible from the outside of the container by opening the relevant door.

The module access doors 26A to 26D may be opened at a configuration site where the functional modules 16A to 16C are initially installed, and then closed to facilitate transport of the of the transportable modular multi-appliance device 10 which, where the container 12 is an ISO 668 compliant container, may be by conventional freight transport including ships, rail, truck, or any combination thereof. Once the transportable modular multi-appliance device 10 has arrived at the site where it is to be used, the module access doors 26A to 26D can be opened to permit access to the power couplings, tools and other fittings on the functional modules 16A to 16D.

Figure 1D:
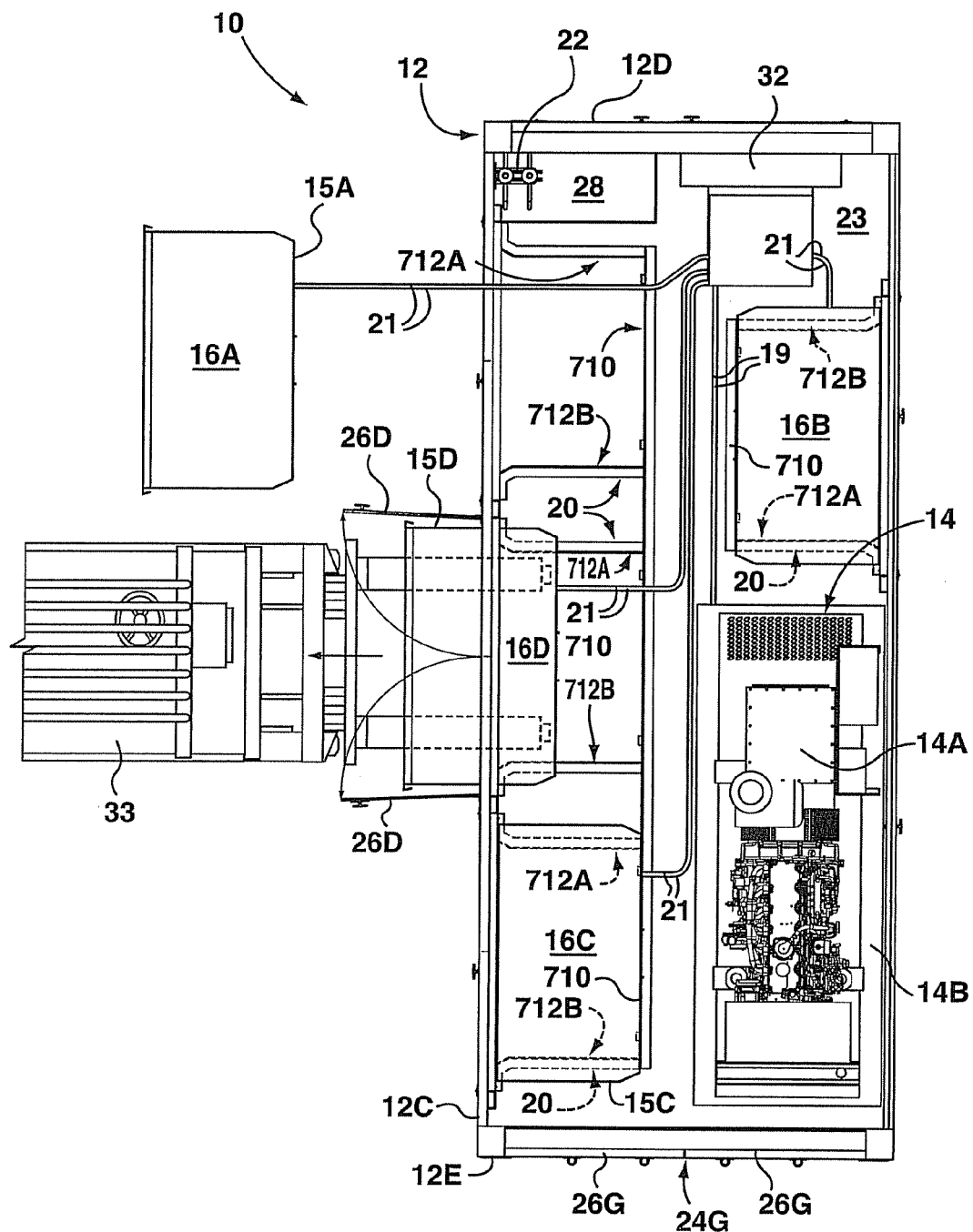
FIG. 1D is a plan view of the transportable modular multi-appliance device of FIG. 1A, showing the interior of the container thereof, showing one functional module having been deployed and a second functional module being deployed by a forklift.
Figure 1E:
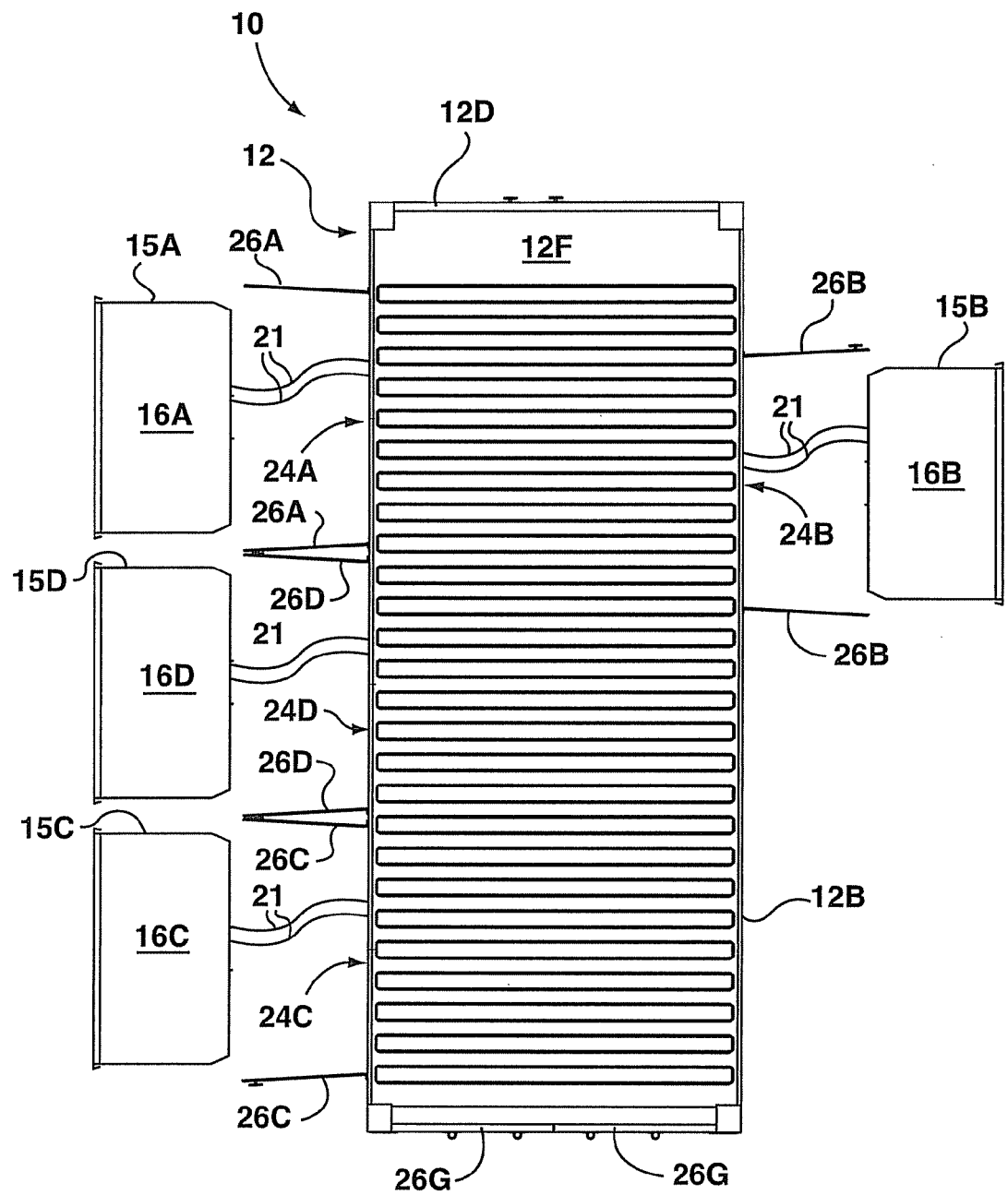
FIG. 1E is a plan view of the transportable modular multi-appliance device of FIG. 1A, showing all functional modules having been deployed.

In addition, in a particularly preferred embodiment the electrical cables 21 are of sufficient length to permit the functional modules 16A to 16D to be removed from the container 12 and operated at a distance therefrom (e.g. up to several hundred yards or meters) once the transportable modular multi-appliance device 10 has been positioned at a job site. For example, once the transportable modular multi-appliance device 10 has arrived at the operation site, the functional modules 16A to 16D may be removed from the container 12 by a forklift 33, as shown in FIG. 1D, and transported to particular locations at the overall operation site. FIG. 1E shows an overhead view of the functional modules 16A to 16D having been removed from the container 12 and deployed at various locations at the operation site. To facilitate deployment and operation of the functional modules 16A to 16D at locations that are physically remote from the container 12, brush seals are provided at the bottom of the module access doors 26A to 26D for the electrical cables 21, so that the module access doors 26A to 26D can be closed once the functional modules 16A to 16D have been dismounted from the container 12 and moved to their operating locations.

One exemplary embodiment of a structure for removable mounting of functional modules will now be described.

Figure 4A:
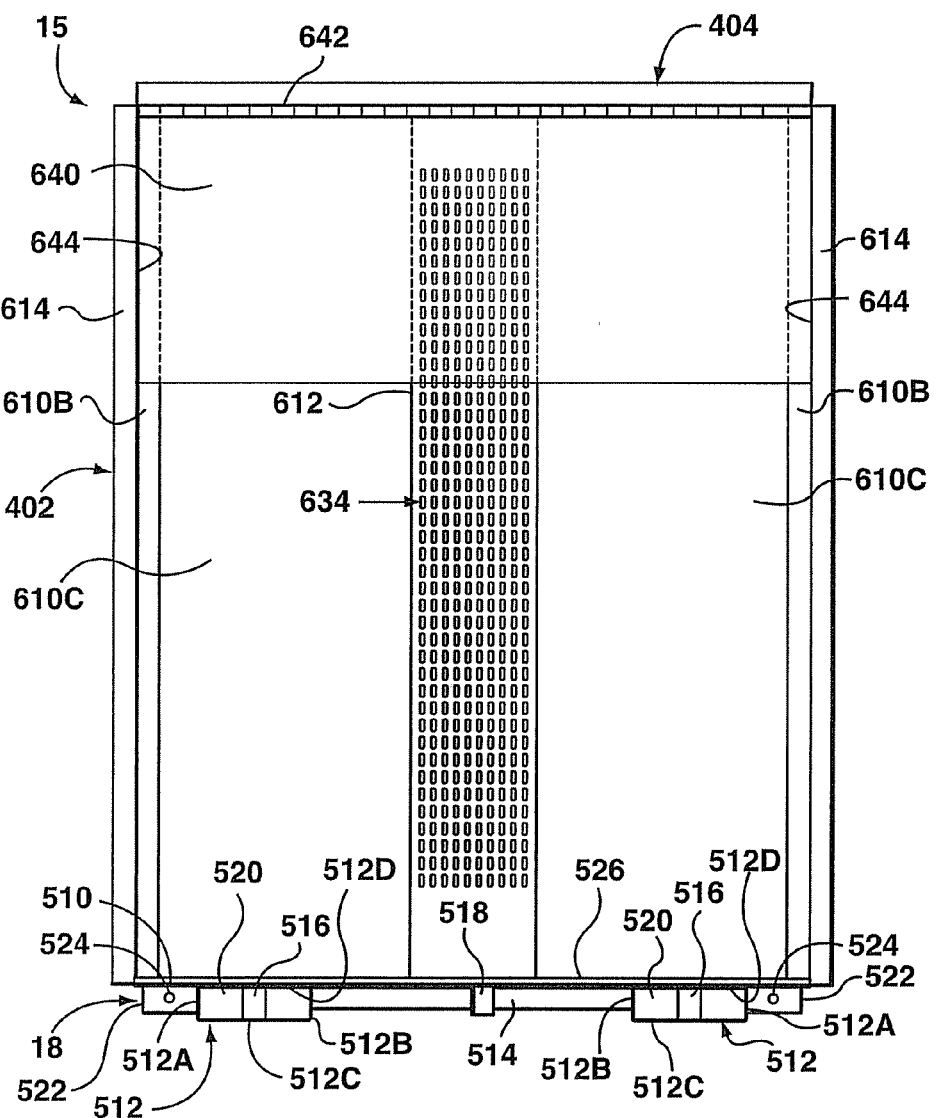
FIG. 4A is a front view of an exemplary module enclosure, according to an aspect of the present invention.
Figure 4B:
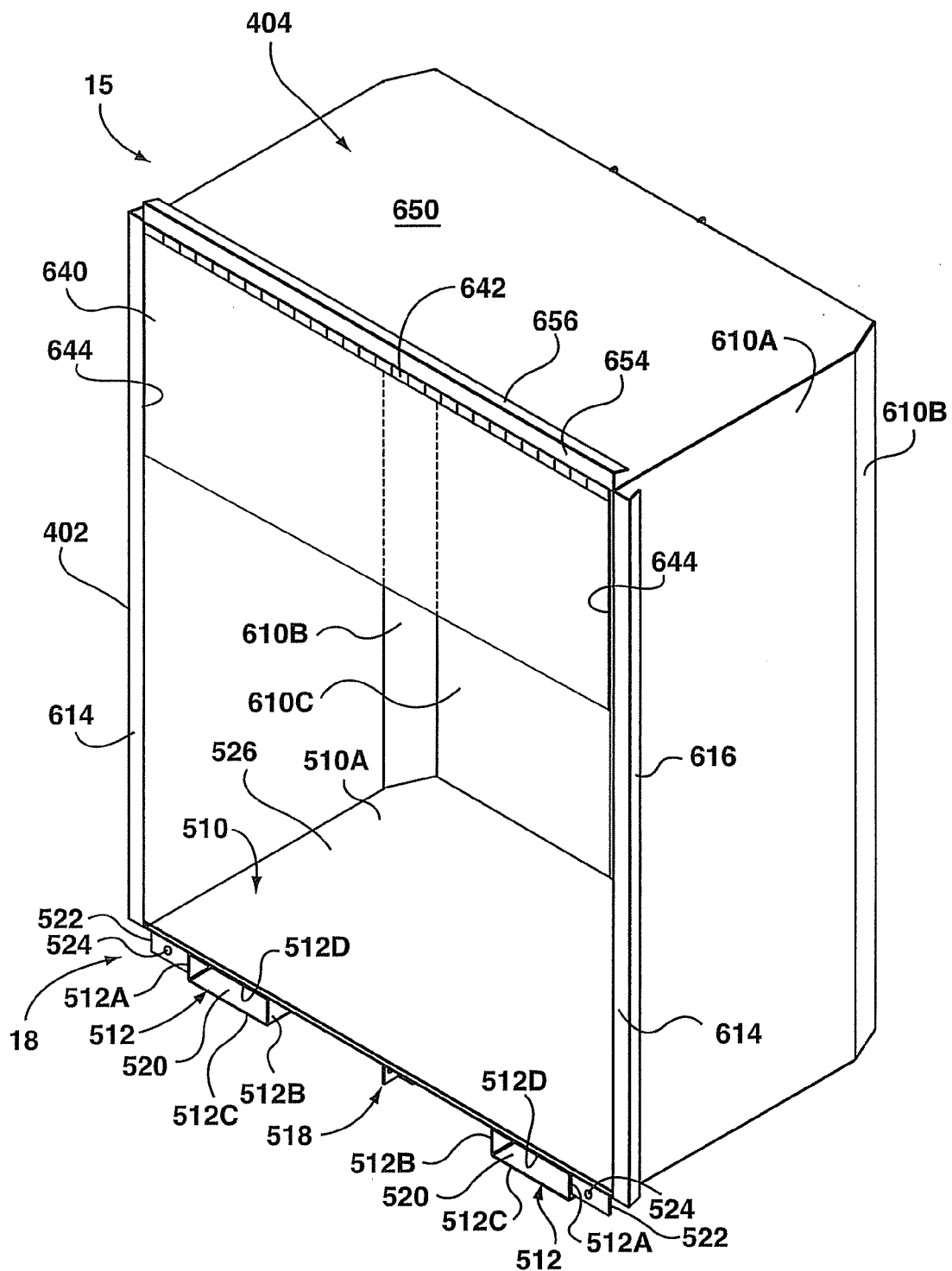
FIG. 4B is a perspective view of the module enclosure of FIG. 4A, showing a canopy thereof in a collapsed position.
Figure 4C:
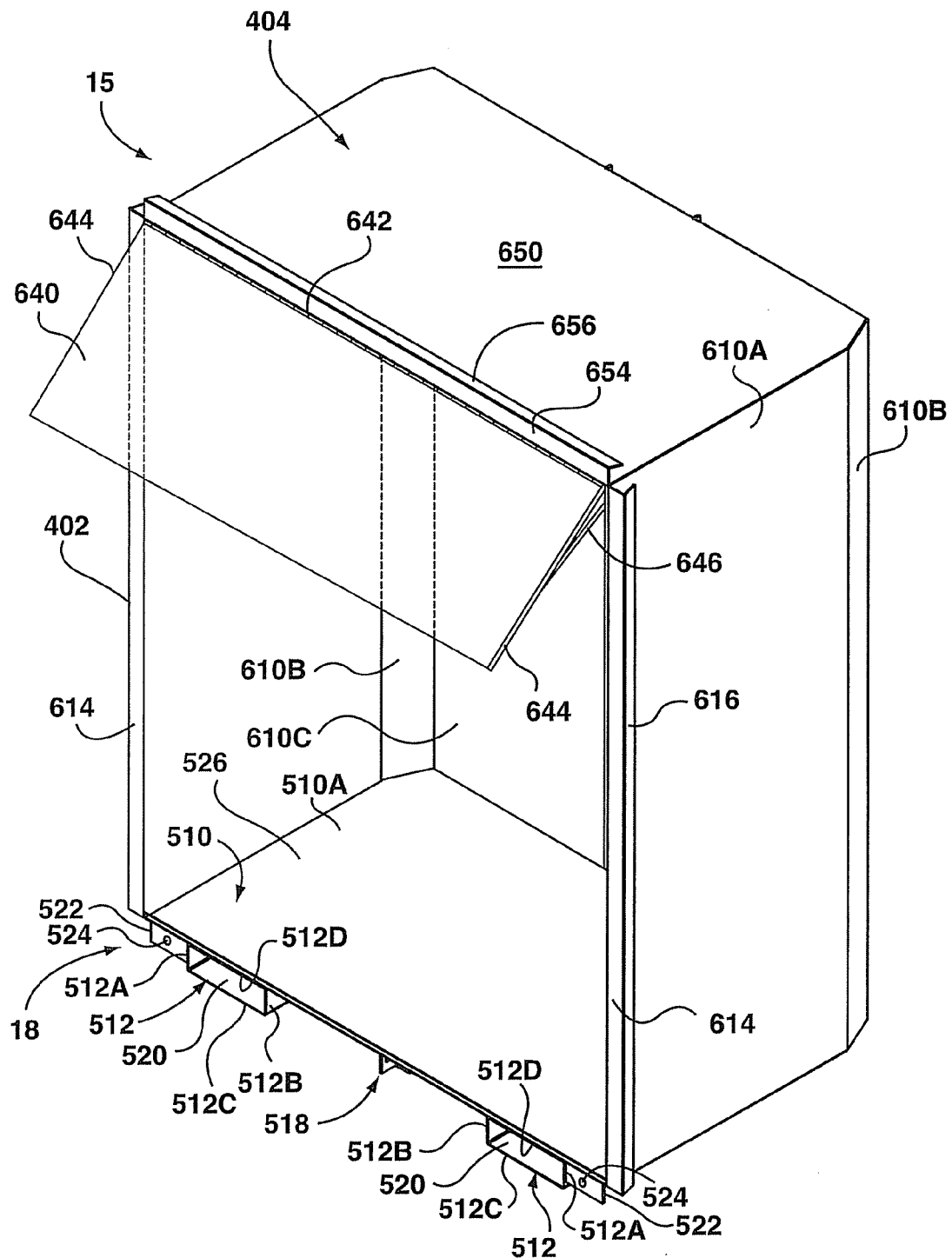
FIG. 4C is a perspective view of the module enclosure of FIG. 4A, showing a canopy thereof in an intermediate position.

Referring now to FIGS. 4A to 4C, an exemplary standard enclosure for a functional module is shown generally at 400. The enclosure 400 includes a standardized cassette 18 which serves as a base for the enclosure 400, a wall assembly 402, and a roof 404. A canopy 640 extends across the upper portion of the open front defined by the wall assembly 402.

Figure 5B:
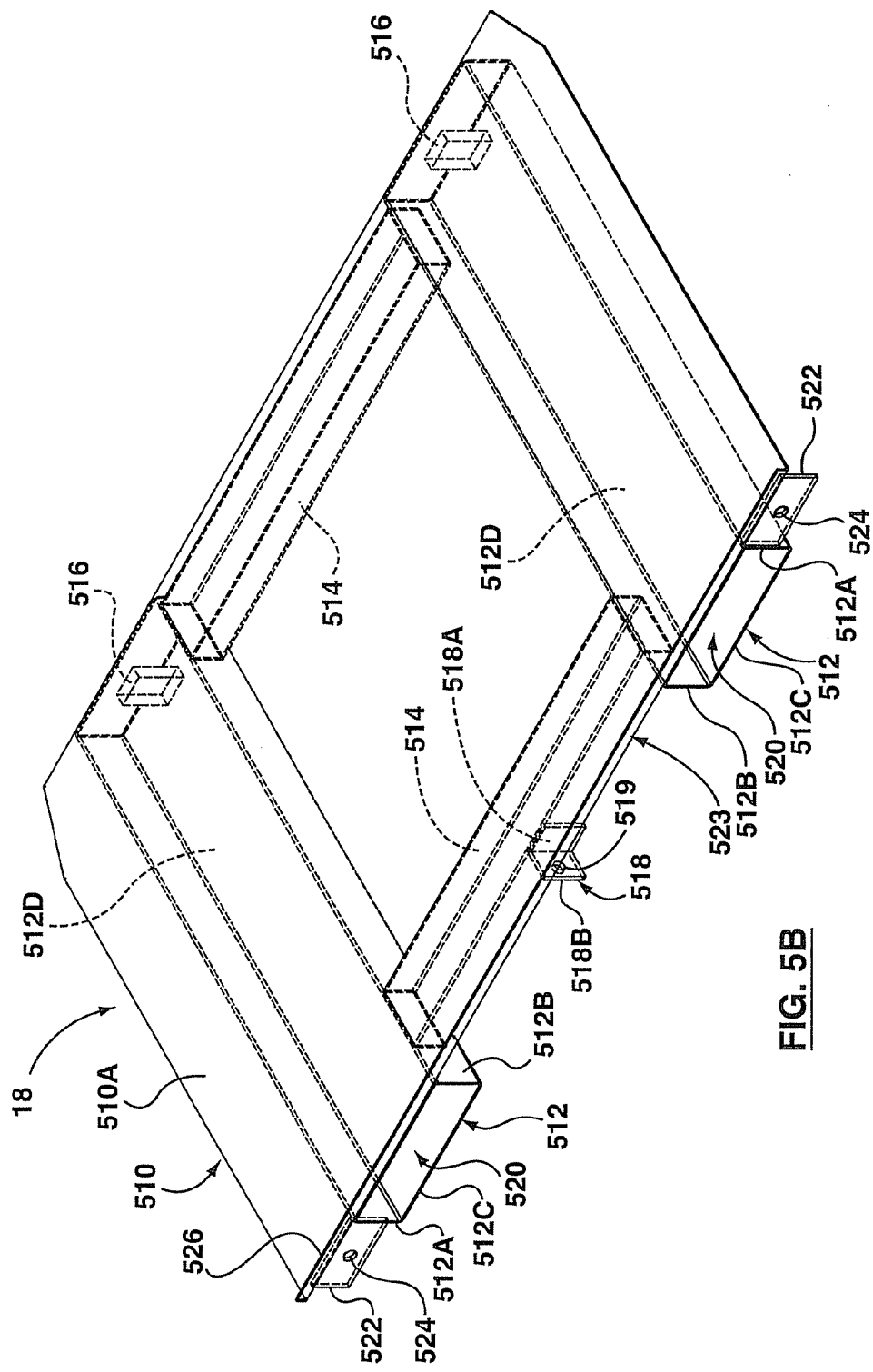
FIG. 5B is a perspective view of the base of FIG. 5A.

With reference now to FIGS. 5A to 5C, construction of an exemplary cassette 18 is described. The cassette 18 comprises a mounting plate 510, two spaced-apart fork pocket channels 512, two crossbars 514, and a shackle mount 518. The mounting plate 510 has an upper surface 510A to which the wall assembly 402 and functional unit(s) are mounted, and a lower surface 510B to which the fork pocket channels 512 are secured. The fork pocket channels 512 each comprise an outer wall 512A, an inner wall 512B, a lower wall 512C and an upper wall 512D which cooperate to define fork pockets 520 sized to receive the fork members of a forklift, such as forklift 33. A fork stop 516 extends between the lower wall 512C and the upper wall 512D of each fork pocket channel 512. The upper wall 512D of each fork pocket channel 512 is secured, typically by welding, to the lower surface 510B of the mounting plate 510, and the crossbars 514 are secured to and extend between the opposed inner walls 512B of the fork pocket channels 512.

The shackle mount 518 is an L-shaped member comprising a mounting portion 518A secured to the front crossbar 514 and a shackle-receiving portion 518B having an aperture 519 (see FIG. 5B) defined therethrough for receiving a hook or shackle to assist in dismounting a functional module from the container 12.

Securing plates 522 depend downwardly from the lower surface 510B of the mounting plate 510 adjacent the front edge 523 thereof, outwardly of the outer walls 512A of the fork pocket channels 512. The securing plates 522 are typically welded to the lower surface 510B of the mounting plate 510, and through holes 524 are defined through the securing plates to facilitate mounting of the functional module enclosure 15 in the container 12, as will be described in greater detail below.

An upturned lip 526 extends along the front edge 523 of the mounting plate 510, which cooperates with the wall assembly 402 to confine to the upper surface 510A of the mounting plate 510 any small amounts of fluid leaking from or condensing on a functional unit.

Referring now to FIGS. 6A to 6D, a wall assembly 402 is shown. The wall assembly comprises first and second opposed integral main wall sections 610 of complementary shape, and a linking section 612. Each main wall section comprises a sidewall portion 610A, an angled rear corner portion 610B, and a rear wall portion 610C. The forward edge of each main wall section 610, which is the edge defined by the sidewall portion 610A, has an outwardly extending flange 614 which continues into an inwardly angled, rearwardly extending guide member 616 to assist a forklift operator in guiding an enclosure 15 through an aperture 24A to 24D in the container 12. Preferably, the guide members are angled inwardly at 75 degrees, measured from the flange 614. The rearward edge of each main wall section 610, which is the edge defined by the rear wall portion 610C, has a rearwardly extending lip 618 which extends perpendicularly from the rear wall portion 610C and mates with one of two corresponding rearwardly extending lips 620 at the opposed edges of the linking section 612 so that the main wall sections can be secured to the linking section 612, for example by welding.

The perimeter shape defined by the wall assembly 402, other than the flanges 614, guide members 618 and lips 618 and 620, corresponds to the shape of the mounting plate 510, with the open front 623 of the wall assembly 402 corresponding to the front edge 523 of the mounting plate 510. The respective lower edges 624A, 624B and 624C of the sidewall portions 610A, angled rear corner portions 610B, and rear wall portions 610C of the main wall section 610, and the lower edge 626 of the linking section 612, are secured to the corresponding edges of the mounting plate 510, preferably by welding. Preferably, the upturned lip 526 and the flanges 614 are flush with one another, which can be achieved by appropriate notching. The respective upper edges 628A, 628B and 628C of the sidewall portions 610A, angled rear corner portions 610B, and rear wall portions 610C of the main wall section 610, and the upper edge 630 of the linking section 612, receive the corresponding edges of the roof 404, which are preferably secured thereto by welding. A plurality of apertures 632 (FIG. 6B) are defined along most of the vertical extent of the linking section 612 to create a vent 634 for the functional units received within the enclosure 15.

Figure 6B:
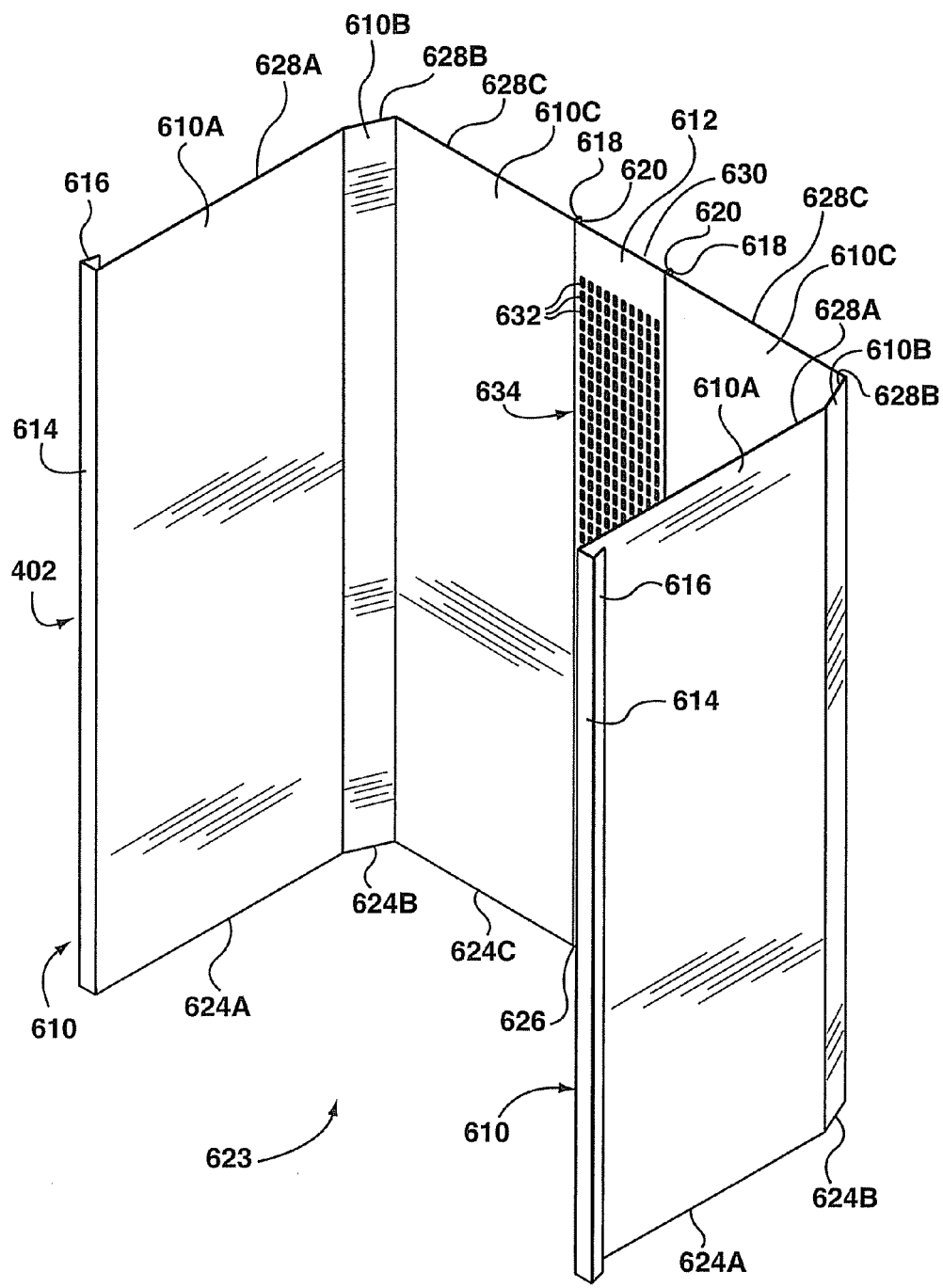
FIG. 6B is a perspective view of the wall assembly of FIG. 6A.
Figure 6G:
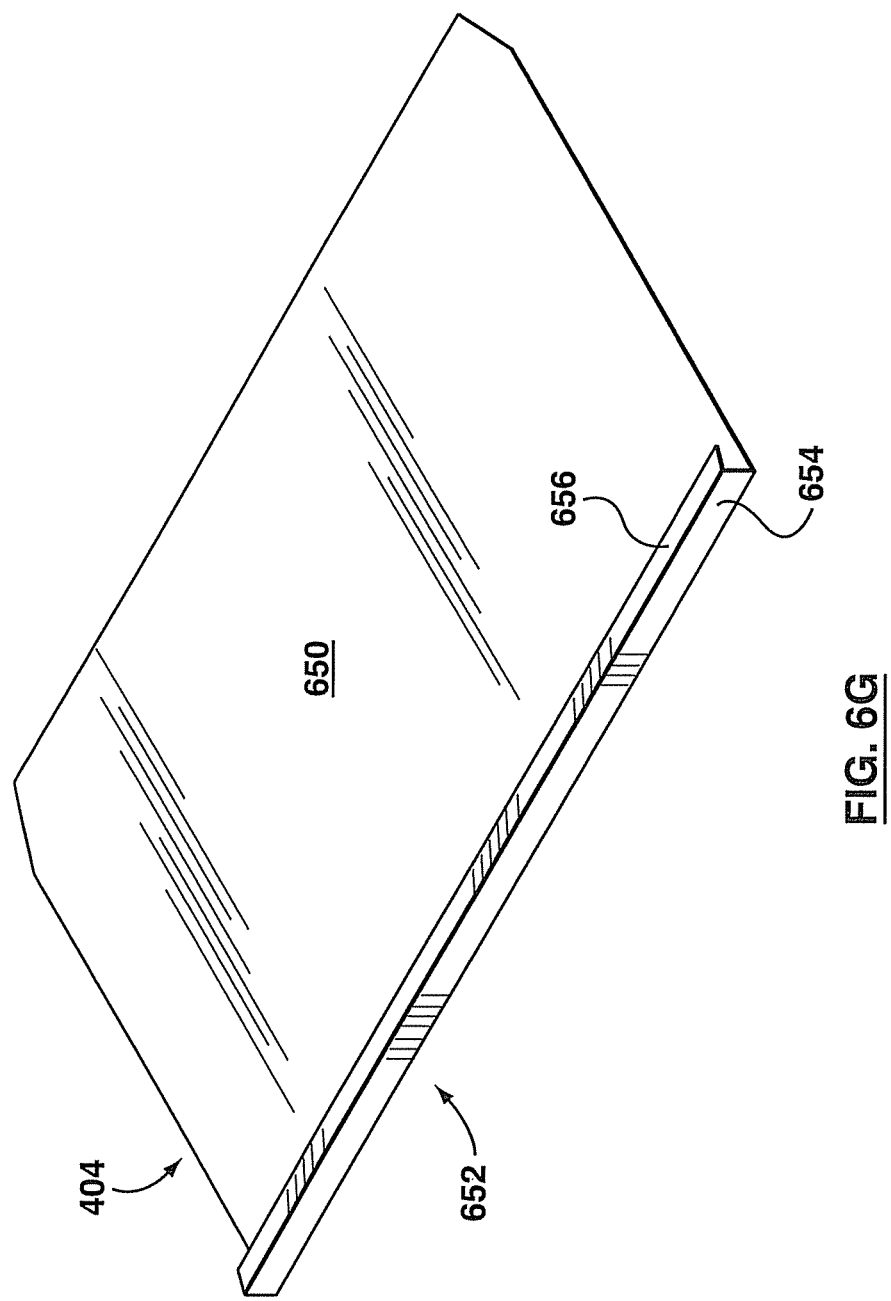
FIG. 6G is a perspective view of the roof of FIG. 6E.
Figure 7A:
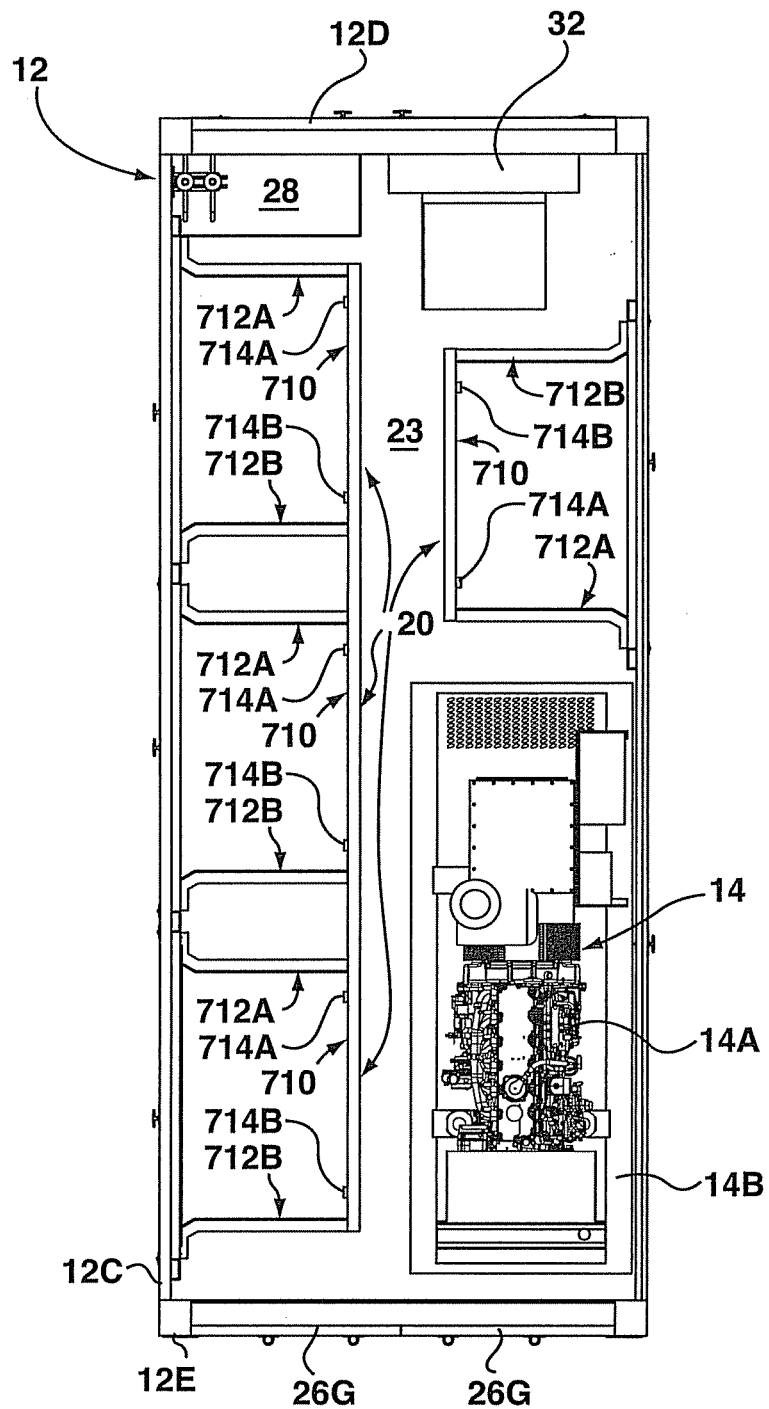
FIG. 7A is a plan view of the interior of the transportable modular multi-appliance device of FIG. 1A with the functional modules removed therefrom to show the module receptacles.
Figure 7C:
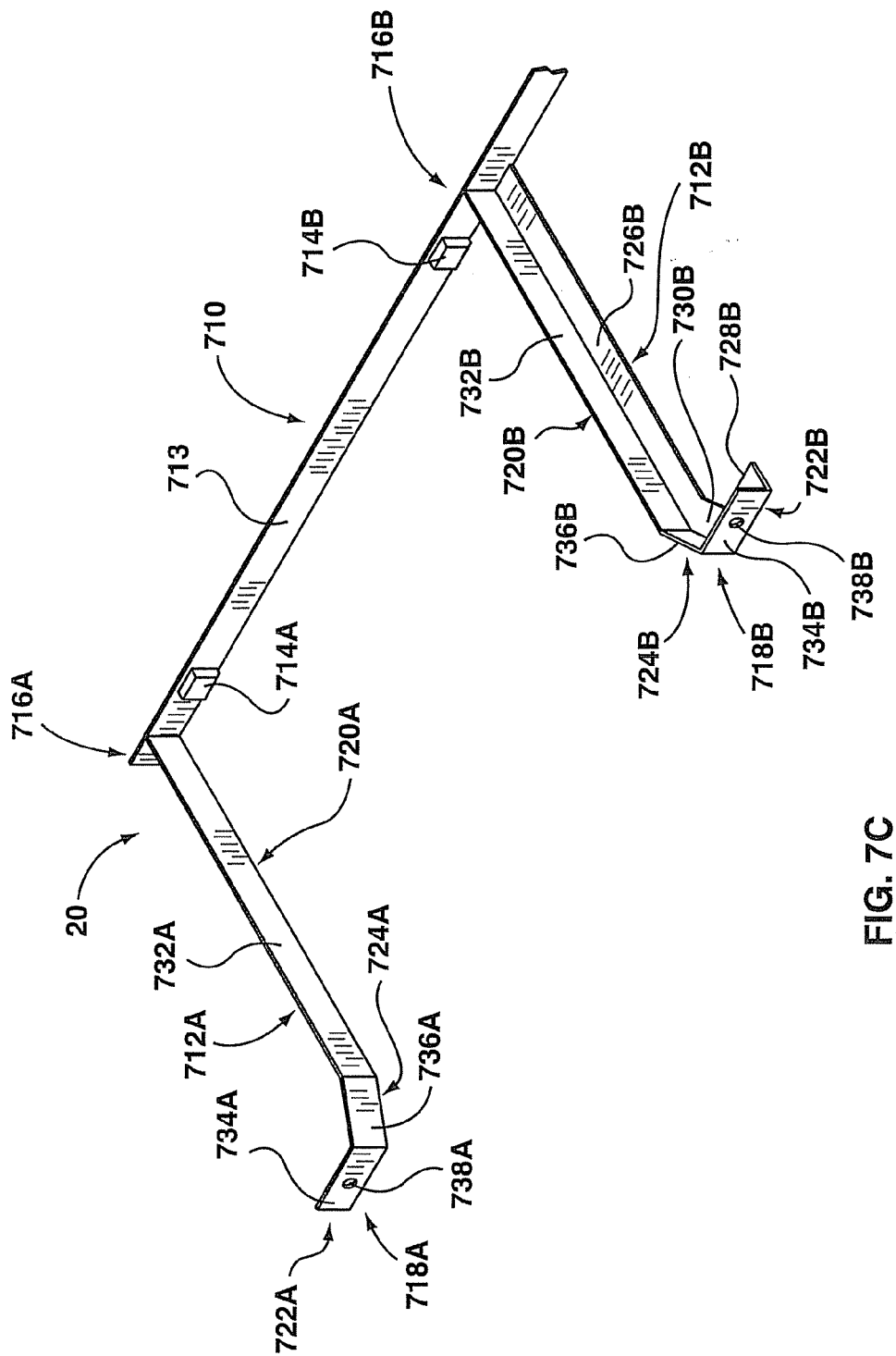
FIG. 7C is a perspective view of the module receptacle of FIG. 7B.

Referring now to FIGS. 6E to 6G, the roof 404 for the functional module enclosure 15 comprises a roof plate 650 whose outer perimeter corresponds in shape to the mounting plate 510 and also to the perimeter shape defined by the wall assembly 402 (other than the flanges 614, guide members 618 and lips 618 and 620). The forward edge 652 of the roof plate 650 has an upwardly extending flange 654 which is perpendicular to the main planar portion of the roof plate 650, and which continues into a downwardly angled, rearwardly extending guide member 656 to assist a forklift operator in guiding an enclosure 15 through an aperture 24A to 24D in the container 12. Preferably, the guide member 656 is angled downwardly at 75 degrees measured from the flange 654.

Referring again to FIGS. 4A to 4C, a canopy 640 extends across the upper portion of the open front 623 (FIGS. 6B and 6C) of the wall assembly 402 and is secured to the forward edge 652 of the roof plate 650 by a hinge line 642. The canopy 640 is movable between a collapsed position (FIGS. 4A and 4B) and an extended position substantially parallel to the plane of the mounting plate 510. In the collapsed position, the side edges 644 of the canopy 640 are parallel to the flanges 614, and the outer surface of the canopy 640 is preferably flush with the flanges 614. One or more support arms 646 can, by way of any suitable mechanical contrivance, support the canopy 640 in the extended position or in any one of a plurality of intermediate positions between the extended position and the collapsed position, such as the intermediate position shown in FIG. 4C.

With reference now to FIGS. 7A to 7E, construction of an exemplary guide assembly 20 for a receptacle for a functional module enclosure 15 is shown. As described above, and as best seen in FIG. 7A (in which the wires 19 are not shown for clarity), in the illustrated embodiment four standardized guide assemblies 20 are provided on the floor 23 of the container 12, in alignment with the apertures 24A to 24D. The guide assemblies 20 are designed to cooperate with the standardized cassettes 18 on the functional module enclosures 15 to facilitate removable mounting of functional module enclosures 15 in the container 12.

Referring now to FIGS. 7B to 7E, each guide assembly 20 comprises a backstop 710, first and second opposed, spaced-apart guide rails 712A, 712B, and first and second spaced apart hold-down blocks 714A and 714B. In the illustrated embodiment, the on one side of the container 12 there is disposed an elongate member 709 which serves as the backstop for three guide assemblies 20 (see FIG. 7A), while on the other side of the container 12 there is only a single guide assembly 20 and hence a correspondingly shorter backstop 710. The backstop 710 is L-shaped, and comprises a floor support portion 711 and an upright backstop portion 713 extending perpendicular to the floor support portion 711. The guide rails 712A, 712B have inner ends 716A, 716B and outer ends 718A, 718B ("inner" and "outer" meaning, with respect to the guide rails 712A, 712B, the position relative to the container 12 when secured to the floor 23 thereof). The inner ends 716A, 716B of the guide rails 712A, 712B are secured to the upright backstop portion 713 of the backstop 710, as are the hold-down blocks 714A, 714B. The guide rails 712A, 712B comprise respective main rail portions 720A, 720B running generally parallel to one another, respective laterally extending securing portions 722A, 722B located at and hence defining the outer ends 718A, 718B of the guide rails 712A, 712B, and respective outwardly-angled lead-in portions 724A, 724B between the securing portions 722A, 722B and the main rail portions 720A, 720B, immediately inwardly of the securing portions 722A, 722B. The main rail portions 720A, 720B, laterally extending securing portions 722A, 722B and outwardly-angled lead-in portions 724A, 724B are all generally L-shaped, and comprise respective floor support members 726A, 726B, 728A, 728B and 730A, 730B, and respective upright guide members 732A, 732B, upright securing members 734A, 734B and upright lead-in members 736A, 736B, each extending upwardly, perpendicular to the associated floor support member 726A, 726B, 728A, 728B and 730A, 730B and hence to the floor 23 of the container 12 when the guide rails 712A, 712B are secured thereto. The guide rails 712A, 712B are preferably secured to the floor 23 of the container 12 by welding the floor support members 726A, 726B, 728A, 728B and 730A, 730B to the floor 23. The upright securing members 734A, 734B have respective through holes 738A, 738B (see FIG. 7C) defined therethrough.

The main rail portions 720A, 720B of the guide rails 712A, 712B of each guide assembly 712 are parallel to and spaced from one another so that the distance between the inside surfaces upright guide members 732A, 732B is equal to or very slightly larger than the distance between the outside surfaces of the outer walls 512A of the fork pocket channels 512 on the cassettes 18 (FIGS. 3A to 3F), so that the fork pocket channels 512A can be received between the upright guide members 732A, 732B on the main rail portions 720A, 720B of the guide rails 712A, 712B, as shown in FIG. 7F. The outwardly-angled lead-in portions 724A, 724B assist in guiding the fork pocket channels 512 into position between the main rail portions 720A, 720B.

The hold-down blocks 714A, 714B are secured to the backstop 710 in spaced relation with one another so that they are in registration with the fork pockets 520 when the fork pocket channels 512A are received between the upright guide members 732A, 732B. As best seen in FIG. 7D, each hold-down block 714 is spaced from the floor 23 of the container 12 so that the distance between the floor 23 and the lower edge 740 of each hold-down block 714 is equal to or very slightly greater than the thickness of the lower wall 512C of the fork pocket channels 512. The hold-down blocks 714 have inner ends 742 and outer ends 744, and the lower edges 740 define respective retention surfaces 746 adjacent the inner ends 742 and also define inwardly angled guide surfaces 748. Preferably, the guide surfaces 748 are at an angle of 45 degrees to the retention surfaces 746 and the floor 23. As can be seen in FIG. 7F, when a cassette 18 is slid between the guide rails 712A, 712B, the outer walls 512A of the fork pocket channels 512 are received between the upright guide members 732A, 732B on the respective main rail portions 720A, 720B and the lower walls 512C of the fork pocket channels 512 are received between the retention surfaces 746 on the hold-down blocks 714A, 714B and the floor 23 of the container 12. The angled guide surfaces 748 assist in guiding the lower walls 512C of the fork pocket channels 512 into position between the retention surfaces 746 on the hold-down blocks 714A, 714B and the floor 23 of the container 12. The securing plates 522 on the cassette 18 will be aligned with the upright securing members 734A, 734B, with the through holes 524 in the securing plates 522 in registration with the through holes 738A, 738B in the upright securing members 734A, 734B. As such, bolts 750A, 750B can be passed through the through holes 524 and 738A, 738B and secured with nuts 752A, 752B to lock the cassette 18, and hence the associated enclosure 15, in its respective receptacle. In particular, the rear edges of the lower walls 512C of the fork pocket channels 512 are trapped between the hold-down blocks 714A, 714B and the floor 23, inhibiting vertical movement of the inner end of the cassette 18 relative to the floor 23 of the container 12, and the bolts 750A, 750B and nuts 752A, 752B inhibit vertical movement of the outer end of the cassette 18 and also inhibit horizontal movement of the cassette 18, again relative to the floor 23 of the container 12.

The use of the guide assemblies 20, together with the use of functional modules (e.g. functional modules 16A to 16D) comprising one or more functional units mounted in enclosures 15 that include the cassettes 18, provide a modular arrangement whereby various functional modules can be easily interchanged. In particular, any suitable functional module is receivable by any mating guide assembly 20 so that various combinations of functional modules can be provided, thereby enabling a transportable modular multi-appliance device 10 that is completely reconfigurable and can be tailored to a particular project or task. For example, in a project where a large amount of welding is expected, a transportable modular multi-appliance device 10 can be provided with two welding/plasma cutter modules and two air compressor modules. Similarly, where a large number of pneumatic tools are expected to be deployed, two or more pneumatic power modules may be provided in the transportable modular multi-appliance device 10. It should be noted here that when a plasma cutter is included in a welder/plasma cutter functional module, an air compressor functional module should also be included in the transportable modular multi-appliance device 10, since the plasma cutter requires a supply of clean, dry, air (produced by the air compressor module) to operate.

In addition, it is to be appreciated that transportable modular multi-appliance devices according to aspects of the present invention are not limited to construction applications. For example, a video game promotion could use a transportable modular multi-appliance device according to an aspect of the present invention which has been configured so that all of the functional modules are video game modules, with the functional units being video game systems and visual displays. In addition, for situations where local water quality has been compromised, a transportable modular multi-appliance device according to aspects of the present invention may be configured so that all of the functional modules are water filtration modules. Job or work site examples include (but are not limited to): areas affected by natural or man-made disaster, urban or rural fires, construction, demolition, aboriginal reservations, military bases and outposts, and remote sites.

Figure 1F:
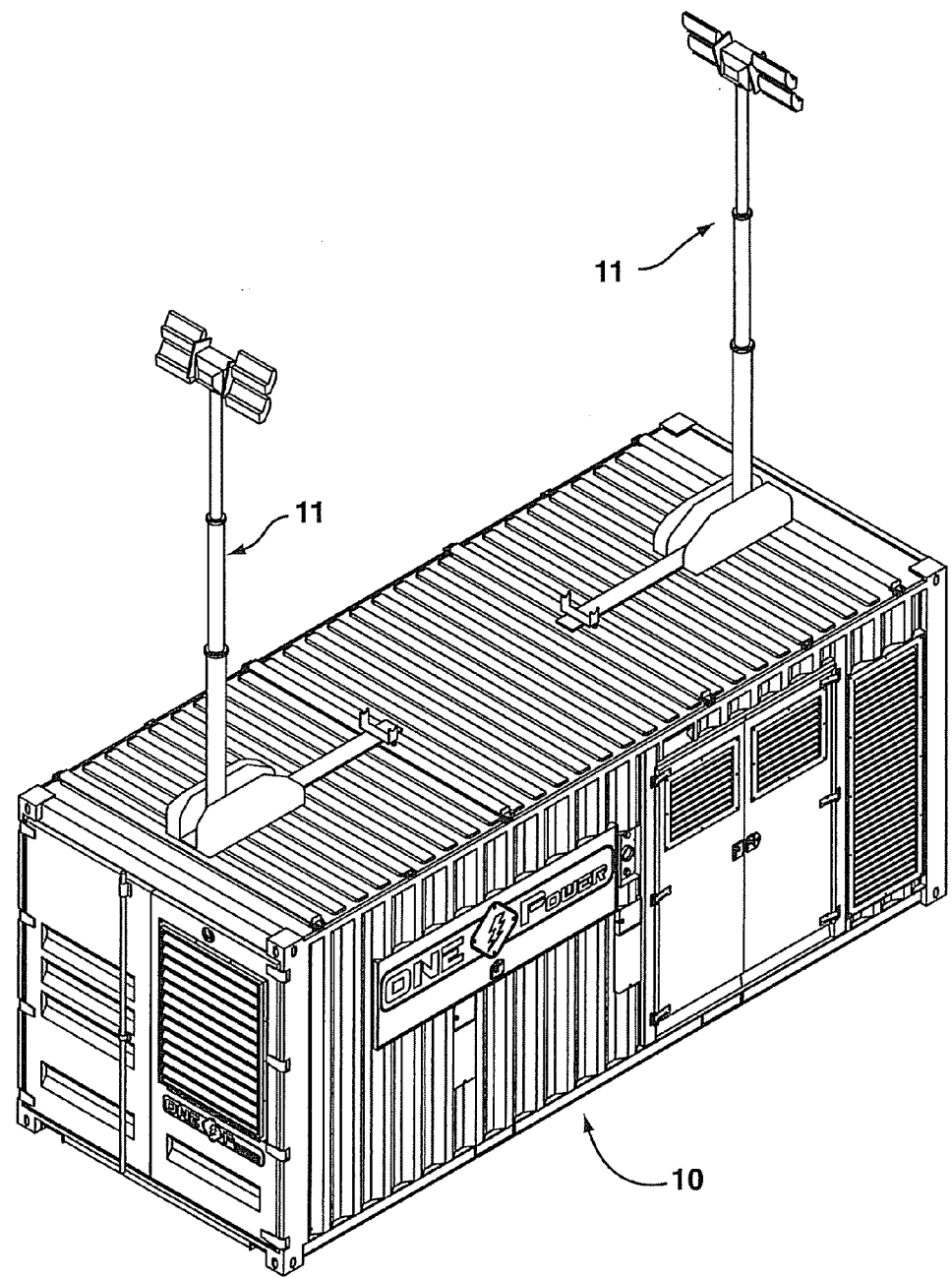
FIG. 1F is an isometric view of the transportable modular multi-appliance device of FIG. 1A further having optional roof-mounted lights.

The transportable modular multi-appliance device 10 may be optionally provided with roof-mounted lights such as illustrated by reference 11 in FIG. 1F. Preferably, the lights will be telescopic as illustrated and foldable against the roof of the device 10 when in a non-deployed position so as to avoid damage during shipping.

Operation of the transportable modular multi-appliance device 10 is managed by a controller 50, which is coupled to a human-machine interface 52 providing suitable input/output functions for communicating with an operator. In the illustrated embodiment, the controller 50 is physically located in the electrical and control assembly 32, and is accessible by way of the electrical access aperture 24E and corresponding electrical access door 26E, as shown in FIG. 2E. A plurality of sensors is provided inside the container 12 for sensing conditions inside the container, and sensors are also associated with the functional modules 16A to 16D. The controller 50 receives input from the sensors, and is operably coupled to the primary power source 14 and the functional modules 16A to 16D and is configured to automatically control the primary power source 14 and allocate the AC power supplied by the primary power source 14 among the functional modules (e.g. 16A to 16D) and the AC outlets in response to inputs from the sensors. In one embodiment, the controller 50 takes the form of a programmable logic controller. In the exemplary embodiment, the controller comprises an Allen Bradley CompactLogix Controller with 750 MB memory, part number 2369-L32E, coupled to an Allen Bradley PanelView Plus 1000 Touch human-machine interface, part number 2711P-T10C4D1, which provides both input and output functions. Both of these products are offered by Rockwell Automation, having an address at 1201 South Second Street, Milwaukee, Wis., U.S.A. 53204-2496. Alternatively, the controller 50 may be a suitably programmed general purpose computer.

In the illustrated embodiment, the sensors associated with the functional modules (e.g. 16A to 16D) include current sensors in the controller 50 which monitor the current consumed by each functional module, activation and deactivation sensors, and other diagnostic sensors positioned to monitor certain other operational parameters of certain of the functional modules (e.g. 16A to 16D), with each sensor being in communication with the controller 50. Such communication can be by wired or wireless connection. The current consumed by devices plugged into the AC outlets 30A, 30B is monitored by current sensors in the controller 50.

In a preferred embodiment, each functional module will include a "start" sensor associated with a "start" button (e.g. 42A to 42D) for the functional module, and a "stop" sensor associated with a "stop" button (e.g. 44A to 44D) for the functional module. The "start" sensor signals to the controller 50 that the associated functional module is to be activated, and the "stop" sensor signals to the controller 50 that the associated functional module is to be deactivated. Additionally, where the primary power source 14 has not yet been activated, a signal from the "start" sensor of any functional module can provide a signal to the controller 50 to initiate start-up of the primary power source 14. However, the "stop" button and associated sensor will only deactivate the functional module with which it is associated. Optionally, "start" and "stop" buttons and sensors may be provided for the AC outlets 30A, 30B as well to start and stop allocation of current thereto. The "start" and "stop" buttons, and associated sensors are distinct from any hard-wired electrical on/off switch(es) for the functional module (or for any individual functional units comprising the functional module), which will remain in the "on" position during normal operation and which can be moved to the "off" position to effect, for example, an emergency shut-down of the functional module or functional unit. Each functional module, as well as each set of electrical outlets 30A, 30B, has a conventional circuit breaker (circuit breakers 54 for the electrical outlets 30A, 30B are shown in FIG. 2E) associated with its electrical connection to the primary power source, and a sensor may be associated with each such circuit breaker to detect when it has been tripped.

Suitable sensors associated with the functional modules may include, without limitation, temperature sensors monitoring the temperature of temperature-sensitive portions or components of the functional modules, pressure sensors, condition sensors monitoring the operating condition of various components of the functional modules, as well as level sensors monitoring the level of certain fluids, such as lubricants and oils. For example, and without limitation, some functional modules, such as welding equipment and pressure washers, do not require additional diagnostic sensors other than the current sensors, while other types of functional modules may be provided with additional sensors. A hydraulic power unit may advantageously be provided with a fluid level sensor, a temperature level sensor, and a pressure sensor, and an air compressor unit may advantageously be provided with a motor on/off sensor (distinct from the "start" and "stop" sensors described above), as well as a temperature sensor, a motor overload sensor, and filter sensors to monitor the conditions of each of the moisture filter, fluid filter and air filter. For any given functional module, the types of sensors that will be advantageous, as well as their placement, will be apparent to one skilled in the art, now informed by the herein disclosure.

In a preferred embodiment, in the event that activation of a particular functional module is anticipated to cause the total current drawn from the primary power source 14 to exceed a predetermined threshold, the controller 50 will prevent that functional module from being activated (typically by preventing current from flowing to that functional module). Similarly, in the event that the total current being drawn from the primary power source 14 exceeds a predetermined threshold, the controller will deactivate one or more of the functional modules (typically by interrupting the current flow to that functional module). The controller may deactivate the functional module that was most recently activated, or it may deactivate functional modules according to a preset order of priority, which will be advantageous in cases where some functional modules perform life safety functions while others do not. Moreover, as will be explained in greater detail below, the controller 50 is configured so that in the event of an input from one of the diagnostic sensors indicating a fault in the associated secondary power source, the controller 50 will either deactivate that functional module (typically by interrupting the flow of current thereto) and transmit an alert or, in the case of a less serious fault, provide a warning while permitting the functional module to continue to operate. Processes for monitoring and controlling operation of the primary power source 14, functional modules 16A to 16D, and AC outlets 30A, 30B will be described in greater detail below.

Reference is now made to FIG. 8, which is a schematic representation of the controller 50 and the primary power source 14, functional modules 16A to 16D and other components of the transportable modular multi-appliance device 10. The schematic representation in FIG. 8 shows the exemplary sensor inputs to the controller 50, and the outputs from the controller 50, as well as the electrical interconnections among the various components of the exemplary transportable modular multi-appliance device 10. Pathways for the electrical current used to actually drive operation of the functional modules 16A to 16D, and to provide power to AC outlets 30A, 30B, are shown in thicker lines. Pathways for sensor signals and control signals are shown in thinner lines.

As can be seen in FIG. 8, the controller 50 includes a processor 802 which can store information in, and retrieve information from, storage 804. While the lines depicting incoming sensor signals and outgoing control signals are shown as entering the controller 50 generally for simplicity of illustration, it is to be appreciated that the processor 802 is responsible for processing all incoming sensor signals, and generating all required control signals. The controller 50 includes, or is otherwise coupled to so as to be operable to control, a plurality of contactors 806A to 806F which govern respective electrical circuits 808A to 808F passing through the controller 50, so that the controller 50 can selectively open and close those electrical circuits. As can be seen, the electrical circuit 808A can supply electrical power to the air compressor module 16A, the electrical circuit 808B can supply electrical power to the hydraulic power module 16B, the electrical circuit 808C can supply electrical power to the pressure washer module 16C, the electrical circuit 808D can supply electrical power to the welder/plasma cutter module 16D, the electrical circuit 808E can supply electrical power to the transformer 32A (which forms part of the electrical and control assembly 32, which is not specifically shown in FIG. 8) and hence the 120V and 208V electrical outlets 30A. Depending on the number of electrical outlets, one or more transformers 32A may be used. The electrical circuit 808F can also supply electrical power to the 480V electrical outlets 30B, either directly or by way of a transformer (not shown). The controller 50 also includes, or is otherwise coupled to so as to receive input from, a plurality of current sensors 810A to 810F which sense the current flowing through each of the respective electrical circuits 808A to 808F. While the electrical circuits 808A to 808F schematically represent power as flowing from the primary power source 14 to the various components being powered, this is merely to represent the fact that the primary power source 14 provides the electrical current, which of course flows in a complete circuit and returns to the primary power source 14. As can be seen, the controller 50 is coupled to a human-machine interface 52 which includes an input device 812 and an output device 814. The input device 812 and output device 814 may be integrated into the same physical apparatus, such as a touch screen display.

The primary power source 14 includes a control system 816 which controls operation of the primary power source 14, and which is coupled to the controller 50 so that the control system 816 can provide the controller 50 with information about operational parameters of the primary power source 14, and receive control signals from the controller 50 to control operation of the primary power source 14. In addition, the primary power source 14 has one or more fuel tank level sensors 818 positioned in its fuel tank, which transmit signals to the controller 50 representative of the fuel level in the fuel tank. An incline sensor 819 and a fire sensor 821 are also positioned in the container 12 and provide signals to the controller 50 if, respectively, incline of the container 12 exceeds a predetermined angle relative to level, or if a fire is detected. A temperature sensor 823 in the container 12 transmits a signal to the controller representative of the temperature in the container 12, which may be an analog signal or may be a digital signal indicating that the temperature is above a predetermined threshold.

Each of the functional modules 16A to 16D has a plurality of sensors associated therewith to provide the controller 50 with information about aspects of the operation of the functional modules 16A to 16D. In addition to the current sensors 810A to 810F, sensors are positioned at suitable locations on or near the functional modules 16A to 16D. Suitable positions for such sensors will be apparent to one skilled in the art from the nature of the sensor and the information sought, and exemplary sensor arrangements will be described below.

In the illustrated embodiment, each of the functional modules 16A to 16D has a set of identification tags 820A to 820D which identify the type of functional module (e.g. hydraulic power module, air compressor module, etc.). Although represented by a single box for simplicity, in the illustrated embodiment each set of identification tags 820A to 820D comprises three binary elements, referred to as binary 1, binary 2 and binary 4, each returning a binary signal to the controller 50. Each binary combination represents a different type of functional module, enabling the controller 50 to carry out a "handshake" check to verify that the type of functional unit installed matches the type of functional unit expected at that position. For example, a setting of binary 1 "on", binary 2 "off" and binary 3 "off" might indicate a hydraulic power module, while a setting of binary 1 "on", binary 2 "on" and binary 3 "off" might indicate an air compressor module. In the illustrated embodiment, binary 1, binary 2 and binary 3 are set using jumpers so that the appropriate signals are returned in response to a query signal from the controller 50. Other techniques for permitting the controller 50 to identify the functional modules may also be used.

A number of sensor types are common for all types of functional module. As described above, each of the functional modules 16A to 16D has a respective "start" sensor 822A to 822D, which detects when the associated "start" button 42A to 42D has been pressed, and a respective "stop" sensor 824A to 824D, which detects when the associated "stop" button 44A to 44D has been pressed. When triggered, the "start" sensors 822A to 822D and "stop" sensors 824A to 824D send a signal to the controller 50. In addition, the electrical circuits 808A to 808F each include a conventional circuit breaker (not shown in FIG. 8) and each of the functional modules 16A to 16D has associated therewith a respective breaker trip sensor 826A to 826D, which detects when the associated circuit breaker has been tripped and transmits a signal to the controller 50.

In addition to the above-described common sensor arrangements, each functional module 16A to 16D also includes a respective indicator light 828A to 828D which, responsive to a control signal from the controller 50, is illuminated to indicate that the associated functional module is activated.

The pressure washer module 16C and welder/plasma cutter module 16D do not have additional sensors, and do not receive direct controller inputs, beyond those common to all functional units. The air compressor module 16A and the hydraulic power module 16B each have additional sensors associated therewith, and each also receives additional direct controller inputs, as described below.

In addition to the common sensor arrangements described above, the air compressor module 16A also has associated therewith a motor operation sensor 830, which sends a signal to the controller 50 indicating that the air compressor motor is running, a remote high temperature alert sensor 832 which sends a signal to the controller 50 when the temperature of the motor exceeds a predetermined threshold, and a remote overload sensor 834 which sends a signal to the controller when the current across the air compressor motor exceeds a predetermined threshold. The air compressor module 16A also includes filter sensors 836A to 836C which monitor, respectively, the condition of the separator filter, the fluid filter and the air filter, and send a signal to the controller 50 when the associated filter requires replacement. Moreover, the air compressor module 16A also has a remote start input 838 and a remote stop input 840 which receive signals from the controller 50 to start and stop the air compressor motor.

The hydraulic power module 16B also has a number of additional sensors. The hydraulic power module 16B includes a low fluid level sensor 842 which sends a signal to the controller when the level of hydraulic fluid is below a predetermined threshold, a low fluid temperature sensor 844 which sends a signal to the controller when the temperature of the hydraulic fluid is below a predetermined threshold. The hydraulic power module 16B also includes filter sensors 846 and 848 for monitoring, respectively, the pressure filter and the return filter and providing a signal to the controller 50 if the respective filter becomes plugged. In addition, the hydraulic power module 16B includes three analog sensors for monitoring the condition of the hydraulic fluid, namely a hydraulic fluid pressure sensor 850, a hydraulic fluid flow sensor 852 and a hydraulic fluid temperature sensor 854 which continuously provide the values of their respective variables to the controller 50. The hydraulic power module 16B also has a hydraulic motor start input 856, a cooling fan start input 858 and a heater start input 860, which allows the controller to activate these components.

Figure 9:
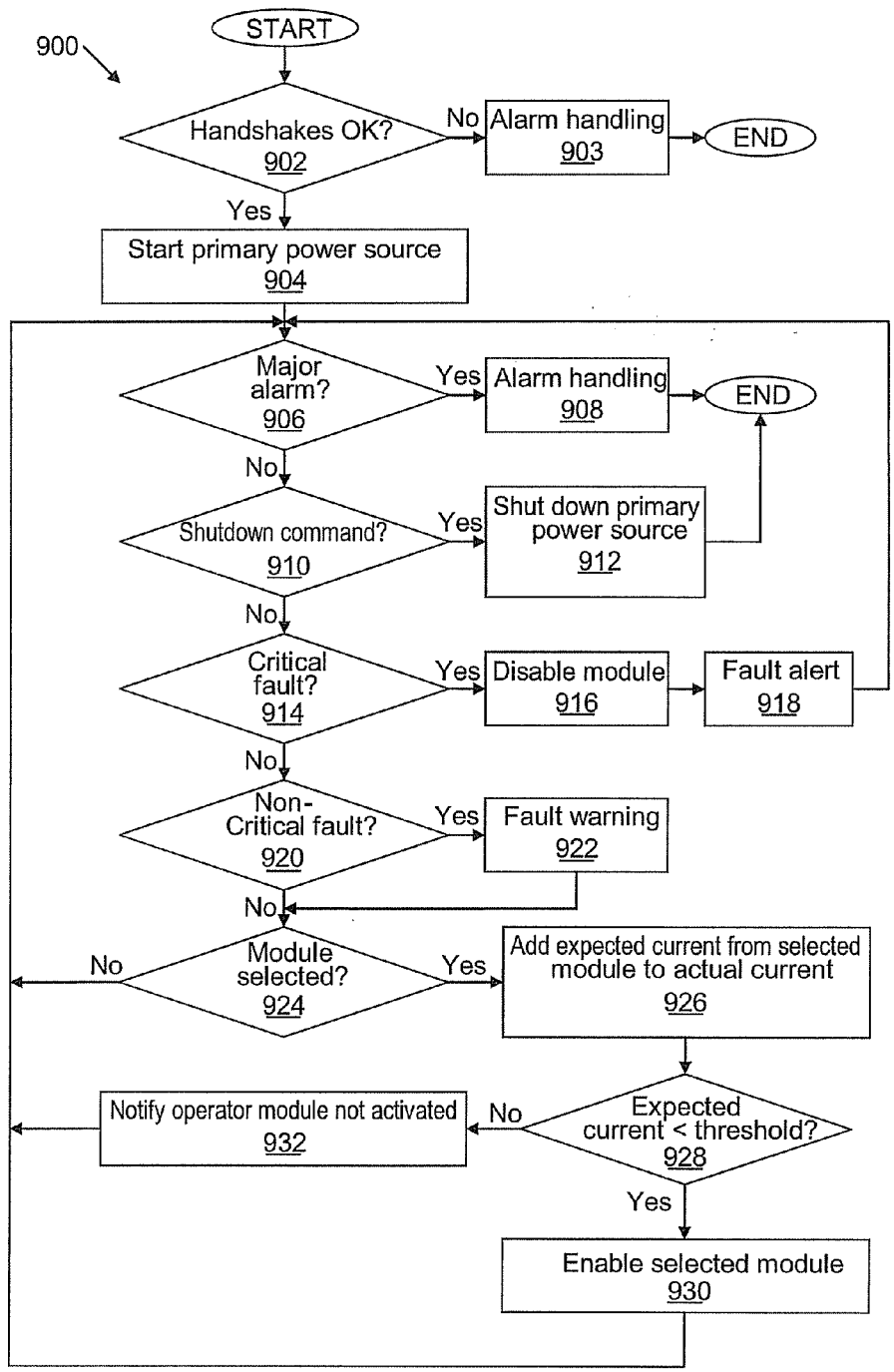
FIG. 9 is a flow chart showing an exemplary process for start-up and operation of a transportable modular multi-appliance device, according to an aspect of the present invention.

With reference now to FIG. 9, an exemplary process for start-up and operation of the transportable modular multi-appliance device 10, or a similar transportable modular multi-appliance device, is indicated generally at 900. The method 900 will be executed by the controller 50.

Figure 12:
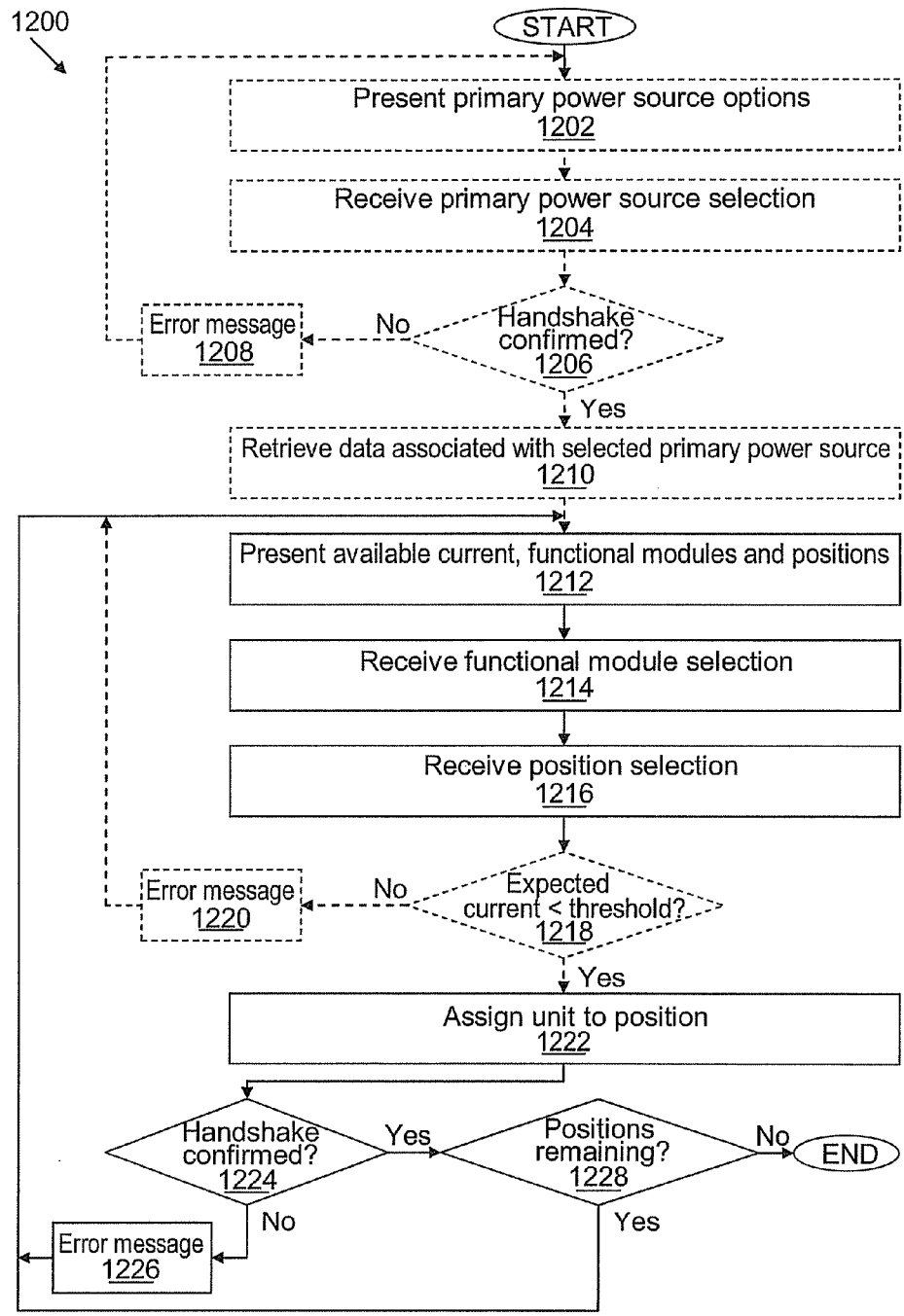
FIG. 12 is a flow chart showing an exemplary configuration method for a controller for a transportable modular multi-appliance device, according to an aspect of the present invention.

In a preferred embodiment, the controller 50 for any particular transportable modular multi-appliance device is pre-configured according to the particular functional modules provided for that transportable modular multi-appliance device, so that it will possess, or have access to, the relevant information to effectively monitor and control the operation of those functional modules (e.g. nominal current consumption, sensors from which input is expected, etc.). An exemplary method for such pre-configuration is shown in FIG. 12.

Returning to the exemplary process for start-up and operation shown in FIG. 9, at step 902 the controller 50 confirms the functional module identification (i.e. the type of functional module) for each installed functional module by way of a "handshake" utilizing the identification tags (e.g. identification tags 820A to 820D) as described above to confirm that the functional module actually installed at the selected position corresponds to the selected type of functional module. For example, if the controller 50 is expecting pressure washer modules in positions 1 and 2, a hydraulic power module in position 3, and a water filtration module in position 4, at step 902 the controller 50 will confirm that these functional modules are in fact electrically coupled to the primary power source and the controller 50 at these positions. If the handshake fails to confirm that the expected functional modules are in their respective positions, then the method 900 issues an alarm at step 903 and then ends. If the handshakes succeed, the controller 50 will activate the primary power source at step 904, and then proceed to step 906. It is to be appreciated that while step 906 is shown as a single step for ease of illustration, in operation step 906 may consist of multiple steps, such as sequentially checking the identification tag (e.g. identification tags 820A to 820D) of each installed functional module in turn.

Steps 906, 910, 914, 920 and 924 are repeated continuously during operation of the transportable modular multi-appliance device 10 to monitor the condition of the components thereof, and while executed in series, should be executed sufficiently rapidly that they are effectively executed in parallel.

At step 906, the controller 50 checks whether there is a major alarm, that is, whether a sensor indicates a condition during which the primary power source 14 should not be operated. Examples of such conditions include fire, excessive incline of the container, excessive temperature inside the container, the presence of carbon monoxide (if the primary power source is gasoline-driven), or critically low fuel levels, and appropriate sensors are provided to monitor these conditions. Other conditions may also be monitored, with events relating to those conditions also being treated as major alarms. In the event that a major alarm is detected, then at step 908 the controller 50 executes an alarm handling routine 908 (which will generally include shutdown of the primary power source and notifying an operator, and possibly other individuals, of the shutdown) and then ends. If no major alarm is detected, then the controller 50 proceeds to step 910.

At step 910, the controller 50 checks whether a shutdown command has been received from an operator. If a shutdown command has been received, then at step 912 the controller 50 will shut down the primary power source 14. Optionally, depending on the types of functional modules included in the transportable modular multi-appliance device, at step 912 the controller 50 may also power down one, some or all of the functional modules before shutting down the primary power source, in order to avoid damage to the functional modules. After step 912, the method 900 ends. If no shutdown command has been received at step 910, then the controller 50 proceeds to step 914.

At step 914, the controller 50 checks whether any of the sensors associated with the functional modules is providing a signal indicative of a critical fault, i.e. a fault during which that functional module should not continue to operate. If such a fault is detected, then at step 916 the controller 50 will disable the functional module for which the critical fault was detected, and then at step 918 will provide a fault alert to an operator (and possibly other individuals), after which the controller returns to step 906 to continue monitoring. Examples of critical faults include critically low levels of lubricating fluids, or filters which are so dirty that damage to the functional unit will likely result from further operation of the functional unit. If the critical fault is one which should also cause the primary power source to be shut down, this can be reflected by having the sensor which detected the fault trigger a major alarm, which will cause the primary power source to be shut down by steps 904 and 908. If no critical fault has been detected at step 914, the controller 50 proceeds to step 920.

At step 920, the controller 50 checks whether any of the sensors associated with the functional modules is providing a signal indicative of a non-critical fault, i.e. a fault which is not sufficiently severe as to require the functional module to be shut down, but of which notice should be provided to an operator. Examples of non-critical faults include situations where a component of a functional module or a functional unit thereof, such as a filter or lubricating fluid, will soon require replacement but is still in good enough condition to permit operation of that functional module. If no non-critical faults are detected at step 920, the controller 50 proceeds directly to step 924; if a non-critical fault is detected, the controller will issue a fault warning to an operator, and possibly other individuals, at step 922 before proceeding to step 924. Optionally, where the controller 50 is configured to communicate with a network as described in greater detail below, detection of a non-critical fault at step 920 which requires a replacement part can trigger an automated check of inventory records, and generate an automated order for the required part(s) if such part(s) are not presently in inventory.

At step 924, the controller 50 checks whether a functional module has been selected for activation, which may be the first functional module selected for activation or a subsequently selected functional module. Typically, the functional module will be selected for activation by pressing the "start" button (e.g. 42A to 42D) on that functional module, which will result in a signal from the corresponding "start" sensor being received by the controller 50. If no (first or subsequent) functional module has been selected for activation, the controller 50 returns to step 904 to continue monitoring operation of the transportable modular multi-appliance device 10. If a (first or subsequent) functional module has been selected for activation, then the controller proceeds to step 926, at which the expected current consumption of the selected functional module is added to the actual current presently being drawn from the primary power source 14 to obtain an expected current once the selected functional module is activated. Then, at step 928, the controller 50 checks whether the expected current is lower than a predetermined threshold. The predetermined threshold will typically represent the maximum amount of current which should be drawn from the primary power source 14, or the maximum available current less a suitable safety margin. If the controller 50 determines at step 928 that the expected current once the selected functional module is activated would exceed the predetermined threshold, then the controller 50 will not activate the selected functional module, but will instead notify the operator at step 932 and then return to step 904 to continue monitoring operation of the transportable modular multi-appliance device 10. If the controller 50 determines at step 928 that the expected current once the selected functional module is activated will not exceed the predetermined threshold, then the controller 50 proceeds to step 930 to enable the selected functional module. As described above with respect to FIG. 8, in a preferred embodiment, current interrupters in the form of contactors 806A to 806D are interposed in the electrical circuits 808A to 808D coupling the primary power source 14 to the functional modules 16A to 16D, so that that controller 50 can selectively open and close the circuits 808A to 808D between the primary power source 14 and each functional module 16A to 16D, with the contactors normally being maintained in the open position. Accordingly, in cases where the controller 50 determines at step 928 that the expected current once the selected functional module is activated would exceed the predetermined threshold, no action is required, since the circuit will remain open and the relevant functional unit will remain inactive. Conversely, in cases where the controller 50 determines at step 928 that the expected current once the selected functional module is activated will not exceed the predetermined threshold, step 930 will consist of sending a signal to the relevant contactor 806A to 806F to close the relevant circuit 808A to 808D, thereby activating the relevant functional module. After step 930, the controller 50 returns to step 904 to continue monitoring operation of the transportable modular multi-appliance device 10. The controller 50 can also use the contactors 806E and 806F to disable the electrical outlets 30A, 30B in appropriate circumstances.

The sensors may also be configured to provide signals for tracking the usage of each of the functional modules. For example, usage may be tracked by recording the amount of current being drawn by a particular functional module, which can be compared to current levels expected when that functional module is idle, and when that functional module is in use, to determine whether the relevant functional unit is idling. In such an embodiment, the controller 50 would be configured to cause the primary power source 14 to cease supplying AC power to an idle functional module in response to sensor signals indicating that the functional module has been idle for a predetermined period of time.

Figure 17:
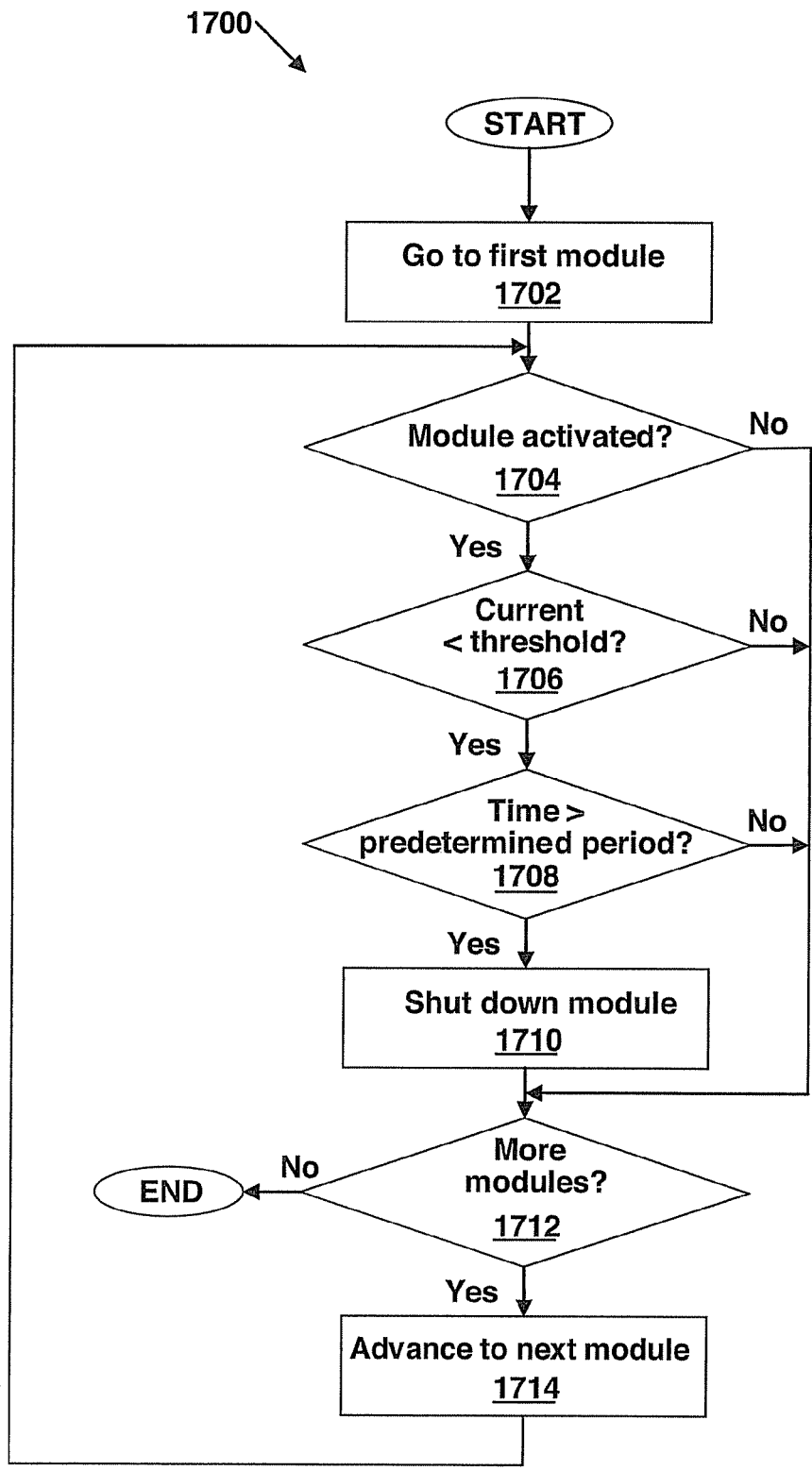
FIG. 17 is a flow chart showing an exemplary method for monitoring functional modules and shutting down those functional modules that are determined to be idle, according to an aspect of the present invention.

Referring now to FIG. 17, an exemplary method for monitoring functional modules and shutting down those modules that are determined to be idle is shown generally at 1700. The method 1700 is implemented by the controller 50, and may form part of the method 900 described above. For example, a determination that a functional module is idle may be considered to be a critical fault at step 914 and 1008.

At step 1702, the controller 50 prepares to check the first functional module. The determination as to which functional module is "first" may be arbitrary, and step 1702 is intended to ensure that all functional modules (e.g. 16A to 16D) are checked. At step 1704, the controller 50 checks whether the functional module has been activated (i.e. the relevant "start" button has been pressed). If the current functional module has not been activated, then the controller 50 proceeds to step 1712 to check if there are more functional modules to examine. If the functional module has been activated, then the controller 50 proceeds to step 1706 and checks whether the current drawn by the functional module is less than a predetermined threshold. The threshold is selected to represent a current level indicative of the relevant functional module being idle, and may be different for different functional modules. If the current drawn by the functional module is equal to or above the threshold, then the controller 50 proceeds to step 1712 to check if there are more functional modules to examine. If the current drawn by the functional module is below the threshold, the controller 50 proceeds to step 1708. At step 1708, the controller 50 checks whether the length of time that the current drawn by the functional module was below the predetermined threshold exceeds a predetermined period of time. If the length of time does not exceed the predetermined period, then the controller 50 proceeds to step 1712 to check if there are more functional modules to examine. If the length of time that the current drawn by the functional module was below the predetermined threshold exceeds the predetermined period of time, the controller 50 proceeds to step 1710 and shuts down the relevant functional module, and then advances to step 1712. At step 1712, the controller checks whether there are more functional modules to be examined. If there are more functional modules to examine, then the controller 50 advances to the next unexamined functional module at step 1714, and then returns to step 1704. If there are no more unexamined functional modules, then the method 1700 ends.

Figure 10:
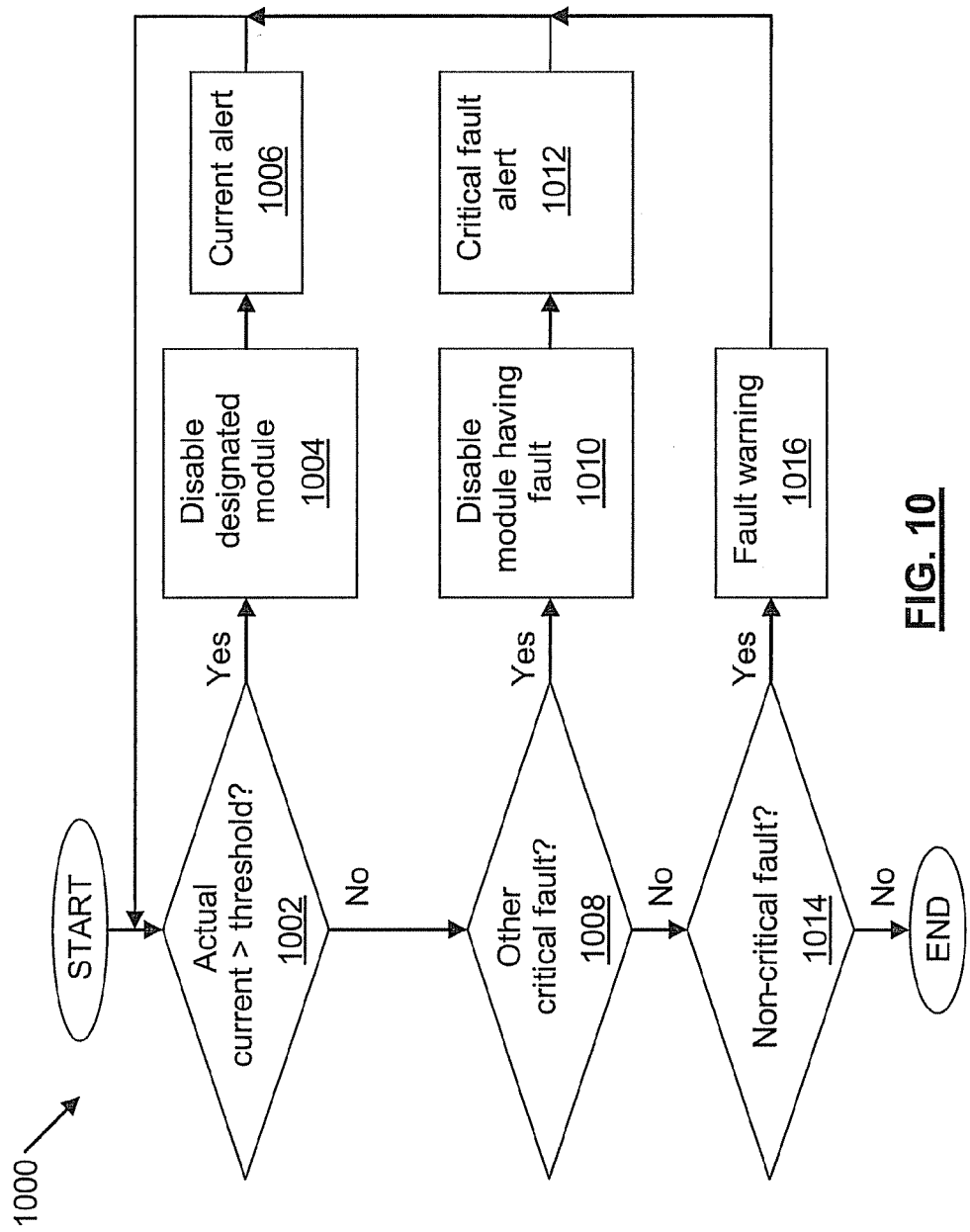
FIG. 10 is a flow chart showing an exemplary fault monitoring and reporting method, according to an aspect of the present invention.

Reference is now made to FIG. 10, which is a flow chart showing an exemplary fault monitoring and reporting method 1000. The method 1000 may be considered to be a more detailed representation of an exemplary implementation of steps 914 to 922 of the method 900, and is implemented by the controller 50.

At step 1002, the controller 50 checks whether the actual current being drawn from the primary power source 14 exceeds a predetermined threshold. Step 1002 is distinct from step 928 in the method 900, because it compares the actual current to a predetermined threshold, rather than the expected current as in step 928 in the method 900. The predetermined threshold used in step 1002 may be the same threshold used in step 928, or may be a different threshold. If the controller 50 determines at step 1002 that the actual current exceeds the threshold, which is considered to be a critical fault for the purpose of step 914 of the method 900 (FIG. 5), then the controller disables a designated functional module at step 1004 (e.g. by sending a signal to the relevant current interrupter to open the relevant circuit). Then, at step 1006, the controller 50 issues an alert to notify an operator (and possibly others) that the current threshold was exceeded, and that one of the functional modules was disabled. After step 1006, the controller 50 returns to step 1002 to check the actual current again. The designated functional module disabled at step 1004 may be the most recently activated functional module, or may be a functional module selected on the basis of a predetermined sequence of priority, for example if certain functional modules are performing life safety functions while others are not. If the controller 50 determines at step 1002 that the actual current is below the predetermined threshold, the controller 50 then proceeds to step 1008.

At step 1008, the controller checks whether the sensor signals indicate any other critical faults in any of the functional modules. The nature of the faults which are considered critical will depend on the nature of the functional modules. For example, if the current drawn by a particular functional module is significantly higher or lower than the nominal current for that functional module, this may be considered a critical fault. Similarly, if a key component of a functional unit has failed, or a filter is too dirty to support continued operation of the functional unit of which it forms a part, a critical fault exists. In response to a determination at step 1008 that one of the functional modules has a critical fault, at step 1010 the controller 50 disables the functional unit having the critical fault (e.g. by sending a signal to the relevant contactor to open the relevant circuit) and then issues a critical fault alert at step 1012 to notify the operator (and possibly others) of the fault and the fact that the associated functional module was disabled. After step 1012, the controller returns to step 1002 to check the actual current again. If no critical fault is detected at step 1008, the controller proceeds to step 1014.

At step 1014, the controller 50 checks whether any non-critical faults are indicated by the incoming sensor signals. Non-critical faults may include, for example, an indication from a sensor that a component of a functional unit, such as a filter or lubricating fluid, will need to be replaced soon but not immediately. If a non-critical fault is identified at step 1014, then at step 1016 the controller 50 will issue a fault warning to notify the operator (and possibly other individuals) of the non-critical fault, and then return to step 1002 to check the actual current again. If no non-critical fault is identified at step 1014, the method 1000 ends and, since the method 1000 is a more detailed view of steps 914 to 922 of the method 900, processing by the controller will proceed to step 924 of the method 900.

As noted above, a plurality of sensors is provided in the container 12 for detecting various conditions. Such sensors may include an incline sensor for sensing inclination of the container 12, one or more fire sensor(s) (e.g. smoke detectors or heat detectors), a carbon monoxide detector (if the primary power source is gasoline-driven), one or more fuel level sensors, and one or more temperature sensors. Other sensors may also be provided in the container 12.

Figure 11:
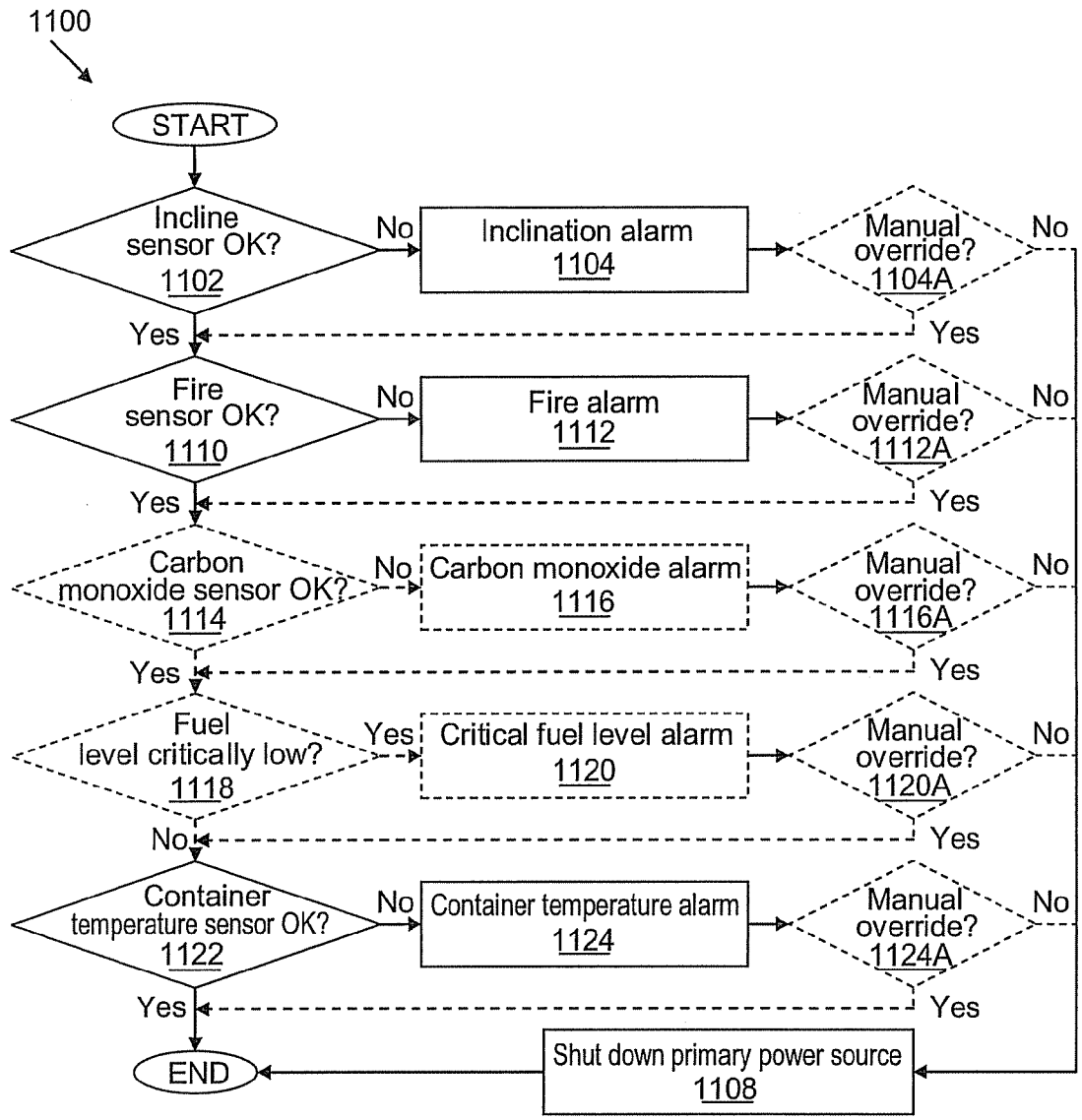
FIG. 11 is a flow chart showing a method of checking for a major alarm, according to an aspect of the present invention.

Reference is now made to FIG. 11, which is a flow chart showing a method 1100 of checking for a major alarm. As such, the method 1100 may be considered a more detailed representation of an exemplary implementation of steps 904 and 908 of the method 900. The method 1100 is executed by the controller 50.

At step 1102, the controller 50 checks whether the signal from the inclination sensor (e.g. inclination sensor 819) indicates excessive inclination of the container 12. If excessive inclination is detected, the controller 50 issues an inclination alarm at step 1104 to notify the operator (and possibly other individuals), and then shuts down the primary power source 14 at step 1108 and then the method 1100 ends. An optional manual override step 1104A may be provided to allow an operator to override shutdown of the primary power source 14, for example to permit operation of the transportable modular multi-appliance device if the incline sensor is known to be defective. If excessive inclination is not detected at step 1102, or if the (optional) manual override is triggered, the method continues to step 1110.

At step 1110, the controller 50 checks whether the fire sensor(s) (e.g. fire sensor 821) indicate the presence of fire inside the container 12. If a fire is detected, the controller 50 issues a fire alarm at step 1112 to notify the operator (and possibly other individuals), and then shuts down the primary power source 14 at step 1108, after which the method 1100 ends. Optionally (not shown), where the transportable modular multi-appliance device 10 includes a fire suppression system, the controller 50 will activate the fire suppression system in response to detection of a fire. As with step 1102, an optional manual override step 1112A may be provided to allow an operator to override shutdown of the primary power source 14. If no fire is detected at step 1110, or if the (optional) manual override is triggered at step 1112A, the method 1100 continues to optional step 1114 (where present), or to optional step 1118 (where present) or to step 1122.

At optional step 1114, the controller 50 checks whether the signal from the carbon monoxide sensor indicates the presence of carbon monoxide inside the container 12. Responsive to detection of carbon monoxide at step 1114, the controller 50 provides a carbon monoxide alarm to the operator (and possibly other individuals) at step 1116 and, unless an override command is received at step 1116A, shuts down the primary power source 14 at step 1108 and then the method 1100 ends. If excessive carbon monoxide levels are not detected at step 1114, or if the (optional) manual override is triggered at step 1116A, the method continues to optional step 1118 (where present). It is to be appreciated that a carbon monoxide detector, and therefore optional steps 1114 to 1116A, are not required where the primary power source 14 is a diesel generator, but are advantageous when a gasoline powered generator is used as the primary power source.

At optional step 1118, the controller 50 checks whether the fuel sensors are signaling critically low levels of fuel for the primary power source (e.g. the tank is expected to run dry shortly). If such a low fuel level is detected at step 1118, the controller 50 will issue a critical fuel level alarm to the operator (and possibly other individuals) at step 1120, and, if no manual override command is received at step 1120A, shut down the primary power source 14 at step 1108, after which the method 1100 ends. If fuel levels are determined to be adequate at step 1118, or if a manual override command is provided at step 1120A, the controller 50 proceeds to step 1122. Steps 1118 to 1120A are optional and, alternatively or additionally, fuel level sensors may provide a warning well in advance of the primary power source running out of fuel. In a preferred embodiment, the controller 50 may also provide a warning when the fuel level sensors indicated that the fuel tank is at 25% of capacity.

At step 1122, the controller 50 determines whether the temperature inside the container 12 is too high, based on the input from the temperature sensor (e.g. temperature sensor 823). If the controller 50 determines that the temperature is too high, then the controller 50 will issue a container temperature alarm to notify the operator (and possibly other individuals) at step 1124. As long as no manual override signal is received at step 1124A, the controller 50 proceeds to step 1108 to shut down the primary power source 14. If a manual override signal is received at step 1124A, or if excessive temperatures are not detected at step 1122, the method 1100 ends. Because the method 1100 is a detailed representation of an exemplary implementation of steps 904 and 908 of the method 900, processing by the controller 50 will then proceed to step 910.

As noted above, the transportable modular multi-appliance device 10 shown and described herein is exemplary only. Many different configurations, using different sizes of containers, different types of primary power sources, and different types and numbers of functional modules may be used, without departing from the scope of the present invention. Preferably, containers used in constructing an embodiment of the invention are ISO 668 compliant.

One feature of the present invention is that a particular transportable modular multi-appliance device can be configured for one type of operation by providing it with a particular set of functional modules and, upon completion of that operation, the transportable modular multi-appliance device can be reconfigured for a different operation by providing it with a different set of functional modules. This enables a provider to rent or lease one or more transportable modular multi-appliance devices to a first customer, with the transportable modular multi-appliance device(s) being individually configured for the first customer's particular operational needs and then transported to the first customer's work site. Upon completion of the first customer's operation, the same transportable modular multi-appliance device(s) can be returned to the provider's site, reconfigured for the particular operational needs of a second customer (by replacing some or all of the functional modules), and then transported to the second customer's work site.

With reference now to FIG. 12, there is shown an exemplary configuration method 1200 for the controller 50 for the transportable modular multi-appliance device 10. The method 1200 is carried out once the selected functional modules (e.g. 16A to 16D) have been physically mounted in the container 12 and electrically connected to the primary power source 14 (which also serves as the main power supply for the controller, which may also have a backup power supply, such as a battery) and the sensors and identification tags have been connected to the controller 50.

Optional steps 1202 to 1210 form part of the method 1200 for cases where a transportable modular multi-appliance device may have more than one type of primary power source, and the controller 50 may therefore be configured to control multiple types of primary power source. It is envisioned that transportable modular multi-appliance devices according to aspects of the present invention may comprise different numbers of functional modules than in the exemplary transportable modular multi-appliance device 10 illustrated herein, and hence require different types of primary power source and different container sizes.

The following table shows the parameters of an exemplary assortment of different configurations for transportable modular multi-appliance devices according to aspects of the present invention. The illustrated transportable modular multi-appliance device 10 is the "industrial duty" model, it being understood that the names assigned to the configurations are arbitrary and form no part of the present invention. All of the primary power sources listed in the table below are Caterpillar diesel electric generators, and the designations refer to Caterpillar's internal categories, and the container types are ISO 668 containers. All of the listed configurations provide voltage of 600/480 volts.

| Name | Primary Power Source | Prime Power (Kw) | KVA | Power (HP) | Number of Functional Modules | Container Type (ISO 668) |
| --- | --- | --- | --- | --- | --- | --- |
| Super Elite | C-15 | 410 | 512 | 626 | 6 | 2CC |
| Elite | C-15 | 365 | 456 | 563 | 6 | 2CC |
| Super Duty | C-15 | 320 | 400 | 500 | 6 | 2CC |
| Heavy Duty | C-6 | 157 | 197 | 245 | 4 | 1CC |
| Industrial Duty | C-6 | 135 | 168 | 210 | 4 | 1CC |

If only a single type of primary powers source is used, then steps 1202 to 1210 are not required, and may be omitted from the method 1200.

Figure 12A:
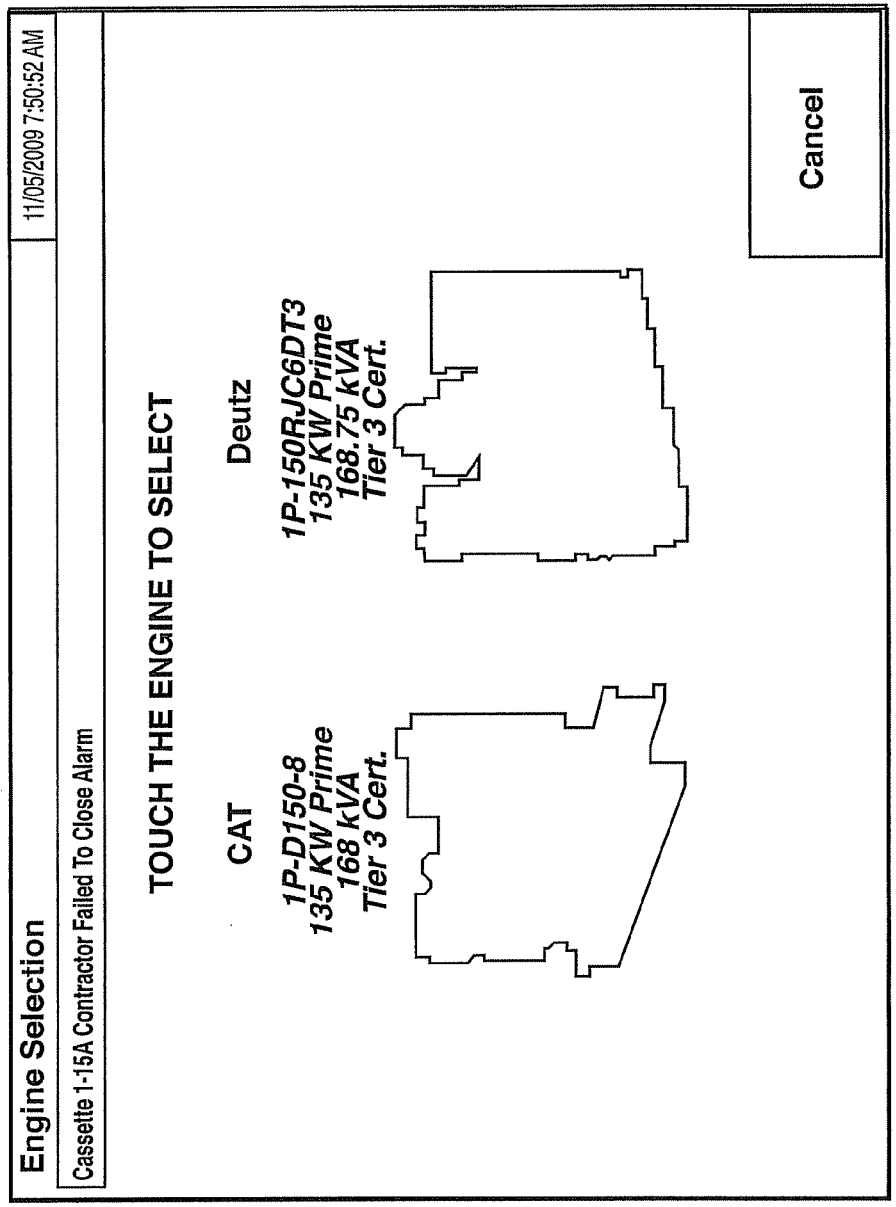
FIG. 12A shows an exemplary screen presentation of available primary power sources, according to an aspect of the present invention.

At step 1202, the controller 50 presents the available primary power source options to the operator, such as by presenting them on screen. For example, several different models of diesel generator may be presented. An exemplary screen presentation of available primary power sources is shown in FIG. 12A. At step 1204, the controller 50 receives the operator's selection of a primary power source. For example, where a he human-machine interface 52 is a touch screen, the user may touch the image of the desired primary power source on the exemplary screen shown in FIG. 12A. At step 1206 the controller 50 performs a "handshake" check (e.g. by communicating with the control system of the primary power source) to confirm that the primary power source selected by the operator matches the primary power source to which the controller is connected. If the handshake check indicates that the controller 50 is connected to a different primary power source than the one selected by the operator, then an error message is generated at step 1208 and the controller 50 returns to step 1202 to again present the available primary power source options to the operator. If the handshake check 1206 confirms that the primary power source selected by the operator matches the primary power source connected to the controller 50, then the controller 50 proceeds to step 1210.

At step 1210, the controller 50 retrieves data about the selected primary power source (e.g. primary power source 14) and the transportable modular multi-appliance device associated with the selected primary power source, including the number and location of the positions/receptacles for the functional modules. In one embodiment, each particular type of transportable modular multi-appliance device has a different type of primary power source associated therewith, so that identification of the type of primary power source uniquely identifies the transportable modular multi-appliance device so that the relevant data can be retrieved. Alternatively, steps of explicitly soliciting and receiving a selection of the relevant transportable modular multi-appliance device may be included in the method 1200. Other data retrieved at step 1210 includes electrical characteristics of the transportable modular multi-appliance device, such as the maximum current that can be drawn from the primary power source, and the maximum current that can be drawn by any single functional module. In cases where only a single type of primary power source is used, the relevant data will already be stored in data storage forming part of, or otherwise accessible and usable by, the controller (e.g. storage 804).

Figure 12B:
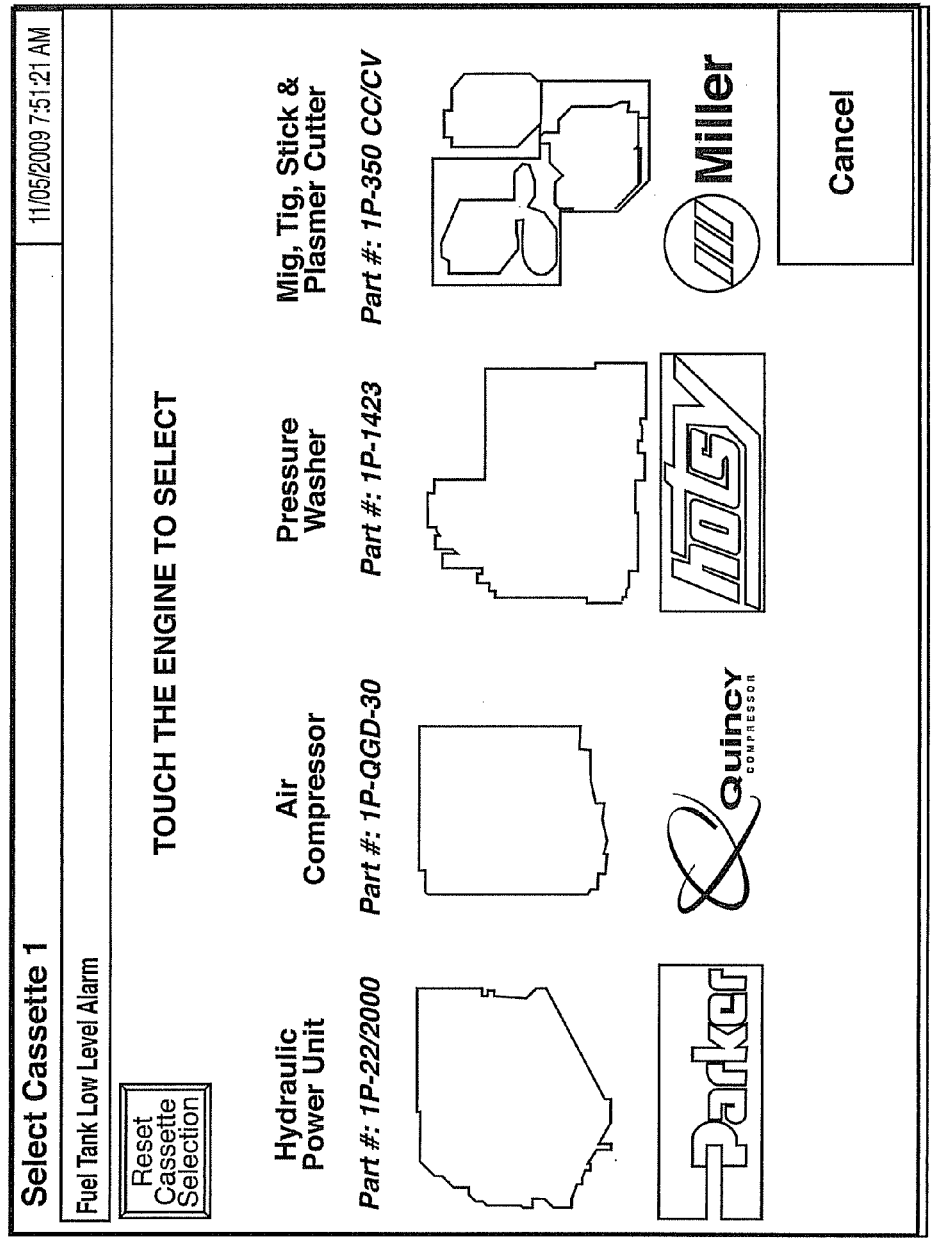
FIG. 12B shows an exemplary screen presentation of available functional modules that can be assigned to a first position in the container of a transportable modular multi-appliance device, according to an aspect of the present invention.

At step 1212, the controller 50 presents to the operator the available current (i.e. the total amount of current that can be produced by the selected primary power source, possibly reduced by a safety margin, less the expected current that would be drawn by the functional modules already selected), the available types of functional modules (i.e. those types of functional modules supported by the programming of the controller 50) and the available positions (i.e. the physical positions/receptacles within the container 12 to which a type of functional module has not already been assigned). Presentation of this information may be in a single step, such as a single screen, or each piece of information may be presented separately or in different combinations. In addition, depending on the available functional modules, it may not be necessary to present the available current when no functional modules have yet been assigned to a position. FIG. 12B shows an exemplary screen which presents the available functional modules that can be assigned to the first position in the container, designated as "cassette 1". It will be noted here that the "fuel tank low level" alarm is shown along an upper portion of the screen, because at the configuration stage fuel has not yet been added to the fuel tank. At step 1214 the controller receives the operator's selection of one of the supported types of functional modules, which may be made, for example, by touching the appropriate image on the screen, and at step 1216 the controller receives the operator's selection of an available position. Steps 1214 and 1216 may be performed in reverse order. It should be noted here that the operator will select a type of functional module rather than a physical functional module, and that the same type of functional module may be assigned to more than one position. For example, if the transportable modular multi-appliance device is to be used in support of a charitable car wash event, pressure washer modules may be placed in all of the available physical positions and assigned to the corresponding logical positions during the method 1200.

At optional step 1218, the controller checks whether the total expected current that would be drawn by all of the functional modules selected so far, when operating simultaneously, exceeds a threshold (typically the total amount of current that can be produced by the selected primary power source, possibly reduced by a safety margin). If the total expected current exceeds this threshold, then an error message is generated at optional step 1220 and the controller returns to step 1212 to enable the user to make another selection. Optional steps 1218 and 1220 may be included in the method 1200 in cases where it is assumed that an end user of the transportable modular multi-appliance device will likely wish to have all of the functional modules operating simultaneously, so as to ensure that the selected primary power source has sufficient capacity to support such simultaneous operation. Alternatively, in cases where the end user does not require such simultaneous operation, optional steps 1218 and 1220 may be omitted, a manual override option may be provided, or step 1220 may simply provide a warning and proceed to step 1222 instead of step 1212.

At step 1222, the selected unit is assigned to the selected position within data storage forming part of, or otherwise accessible and usable by, the controller 50 (e.g. storage 804). Then, at step 1224, the controller performs a handshake check, utilizing the identification tags (e.g. identification tags 820A to 820D) to confirm that the functional module actually installed at the selected position corresponds to the selected type of functional module. If the handshake fails at step 1222 (i.e. a functional module different from the type of functional module selected is physically installed in the selected receptacle), the controller 50 generates an error message at step 1226 and then returns to step 1212. If the handshake is confirmed at step 1224, then the controller 50 proceeds to step 1228.

Figure 12C:
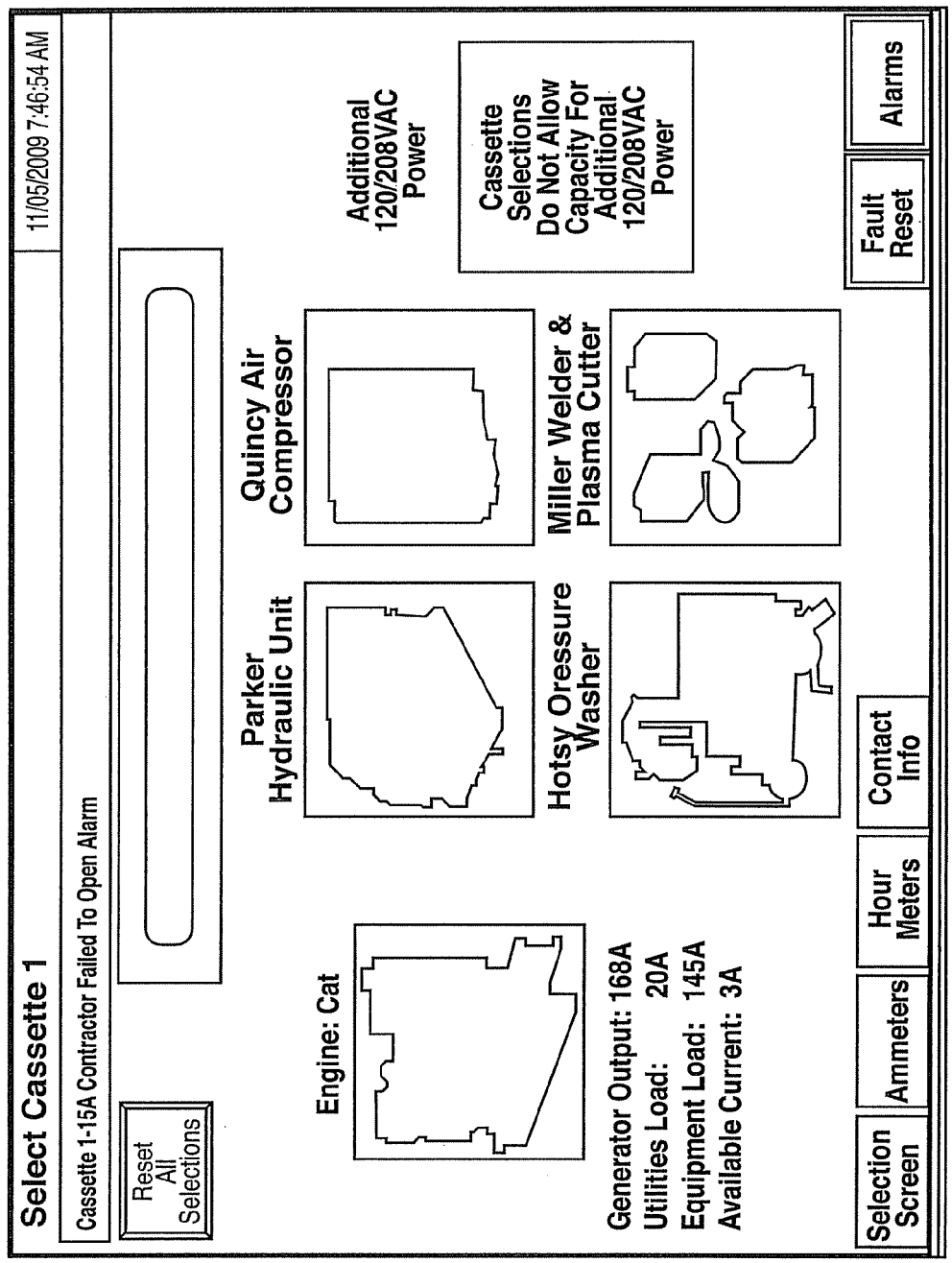
FIG. 12C shows an exemplary screen presentation of an exemplary summary of an exemplary configuration of a transportable modular multi-appliance device; according to an aspect of the present invention.

At step 1228, the controller 50 checks whether there are any positions/receptacles remaining to which a type of functional module has not yet been assigned. If at least one such position remains, the controller returns to step 1212. If no such positions remain, meaning that all positions in the transportable modular multi-appliance device 10 have had a type of functional module successfully assigned thereto, then the method 1200 ends. Optionally, once all positions have a functional module assigned thereto, the controller may present the user with a summary of the configuration of the transportable modular multi-appliance device. An exemplary screen displaying an exemplary such a summary is shown in FIG. 12C. In some embodiments, the controller may be programmed to provide the user with an option to leave certain positions empty (i.e. with no functional module assigned thereto). For example, this feature may be advantageous where fewer than the maximum number of functional modules (i.e. maximum in the sense of the number of available positions) are installed, but the functional modules that are installed require significant amounts of current, such that adding additional functional modules might exceed the capacity of the primary power source.

As noted above, in addition to triggering an appropriate response (e.g. shutting down a the primary power source 14 or a functional module, the controller 50 is also configured to generate an alarm signal (e.g. step 908, steps 1104, 1112, 1116, 1120, 1124) in response to certain signals from the sensors. Such an alarm signal may include an audio alarm, or a strobe light, or both. Similarly, the controller 50 will preferably trigger an alert (step 16, steps 1006, 1012) or a warning (step 922, step 1016) in response to a signal from one of the sensors indicating a fault in one of the functional modules.

In addition to audible and visible alarms, the controller 50 may, directly or indirectly by way of a suitable computer system, be able to cooperate with a communication system, such as a wired or wireless network connection, to transmit alarm, alert and warning signals in the form of remote notifications in response to certain sensor signals. For example, in the event that the fuel sensor indicates that the fuel supply for the primary power source 14 has dropped below a predetermined level, the controller 50 could respond by transmitting an automated e-mail message or pager message, or placing an automated telephone call. Such a communication could be sent to a construction site foreperson, or the controller could generate an automated order for additional fuel which could be sent via e-mail directly to a fuel supplier. In addition, certain sensor signals (e.g. a signal from a fire sensor) could cause the controller to send a remote notification of the alarm or alert to a more senior-ranking individual. For example, a project supervisor would likely want immediate notification in the event of a fire.

Figure 13A:
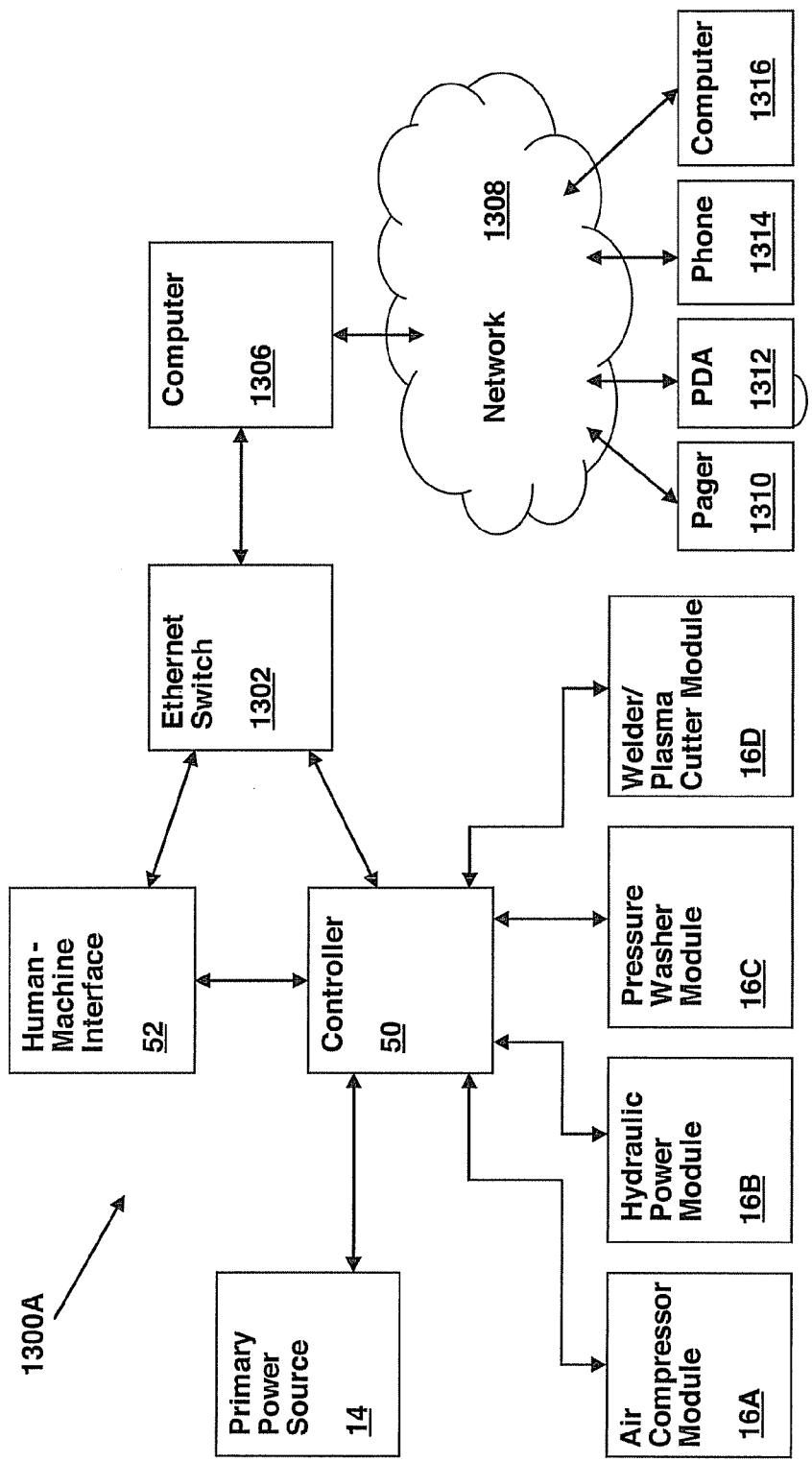
FIG. 13A is a schematic representation of a first exemplary arrangement for providing remote notifications, according to an aspect of the present invention.

With reference now to FIG. 13A, a first exemplary arrangement for providing remote notifications of alarms, alerts, warnings, and other information is shown generally at 1300A. FIG. 13A includes a simplified form of the schematic representation shown in FIG. 8, with the controller 50 receiving sensor signals from, and providing control signals to, the pressure washer module 16C, air compressor module 16A, welder/plasma cutter module 16D and hydraulic power module 16B. The controller is also in communication with the control system 816 (not shown in FIG. 13A) of the primary power source 14, and the human-machine interface 52. For ease of illustration, electrical power connections are not shown in FIG. 13A, and the electrical outlets 30A, 30B and incline sensor 819 and fire sensor 821 are not specifically illustrated in FIG. 13A.

Both the controller 50 and the human machine interface 52 are in communication with an Ethernet switch 1302, for example by way of CAT-5 cable connections, and each may have its own IP address (along with an IP address for the Ethernet switch 1302). The Ethernet switch 1302 is in communication with a computer 1306, such as a general purpose computer, which is located at the site where the transportable modular multi-appliance device 10 is deployed. The computer 1306 is in communication with a network 1308, such as the Internet, through which it can transmit messages relating to the operation of the transportable modular multi-appliance device 10 to remote devices that are also in communication, directly or indirectly, with the network 1308, such as one or more pagers 1310, one or more personal digital assistants 1312, one or more land-line or wireless telephones 1314, or one or more other computers 1316. Therefore, to transmit a communication, such as an alarm, alert or warning, or an operational report, the controller 50 would transmit the communication through the Ethernet switch 1302 to the computer 1306, which is configured with the appropriate software to transmit the communication through the network 1308 to its intended target(s).

Figure 13B:
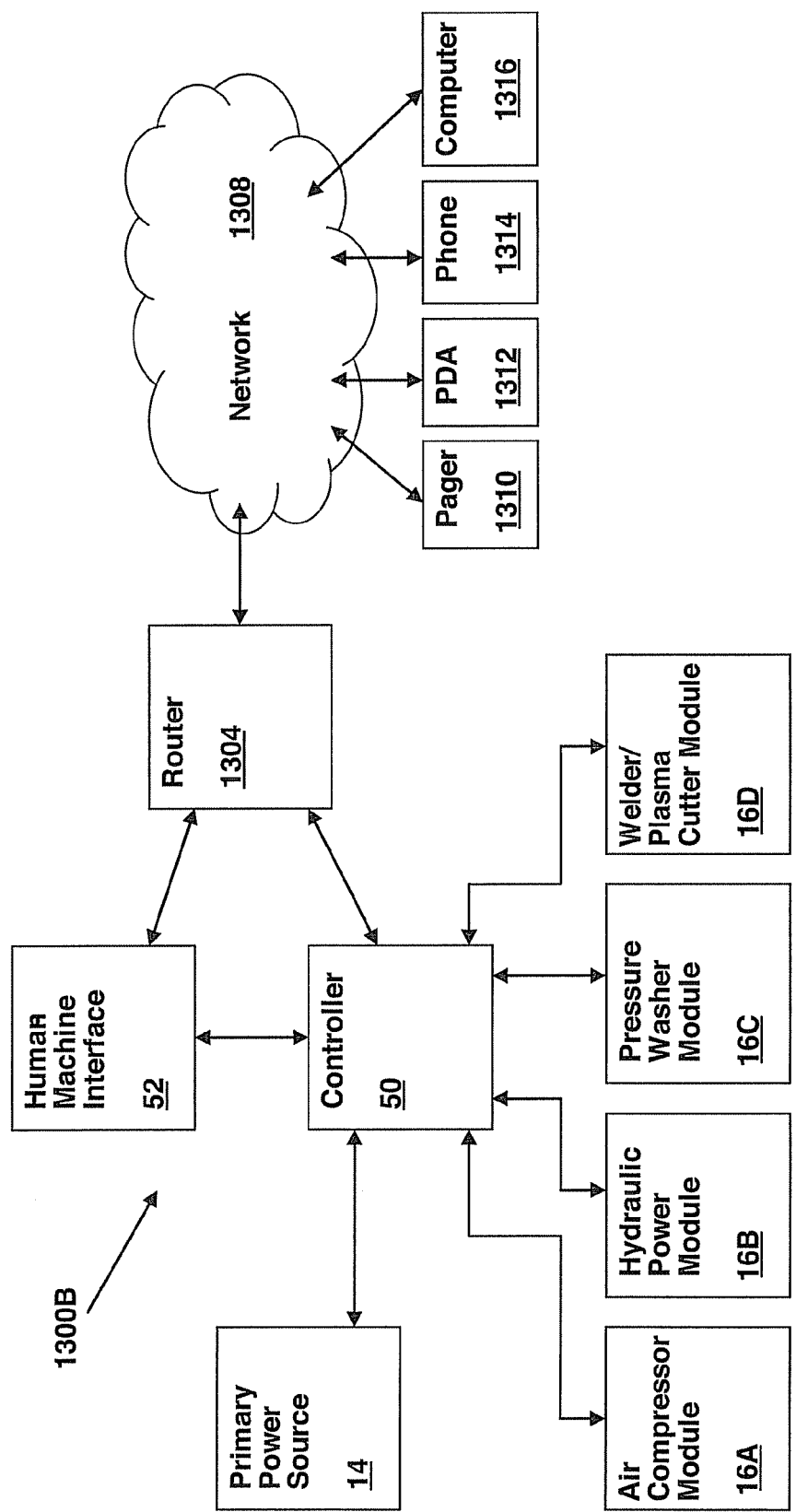
FIG. 13B is a schematic representation of a second exemplary arrangement for providing remote notifications, according to an aspect of the present invention.

Reference is now made to FIG. 13B, which shows a second exemplary arrangement for providing remote notifications of alarms, alerts, warnings, and other information at 1300B. FIG. 13B is identical to FIG. 13A, and hence the above description applies, except that instead of being in communication with an Ethernet switch 1302 that is in communication with a computer 1306 that is in communication with the network 1308, the controller 50 and human-machine interface 52 are in communication with a router 1304 which is in communication with the network 1308. The controller 50 can thereby communicate with the remote devices 1310 to 1316 by communicating with the network 1308 through the router 1304.

Figure 14B:
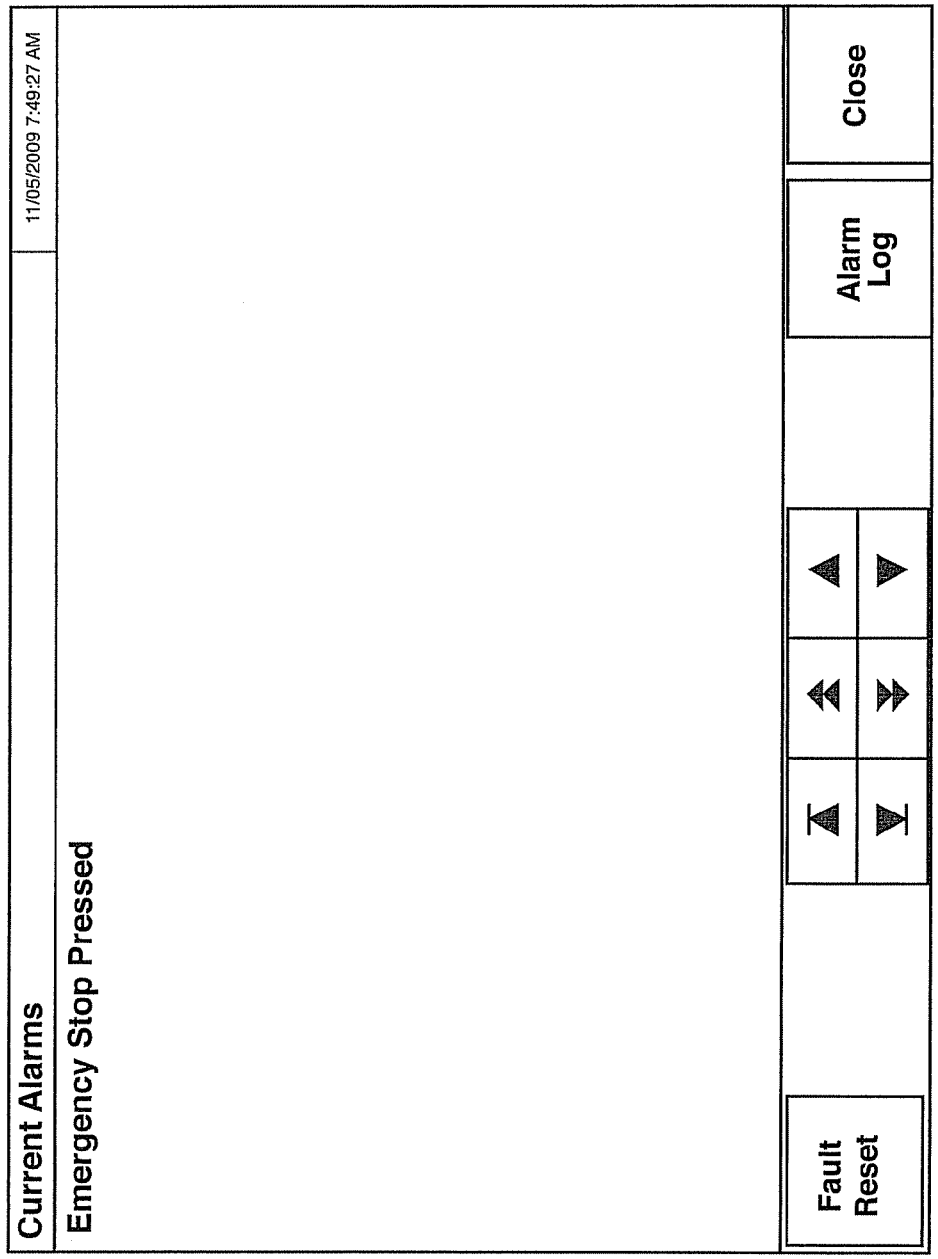
FIG. 14B shows an exemplary screen presentation of an alarm indicating that the emergency stop button for the primary power source has been pressed, according to an aspect of the present invention.

The controller 50 and human-machine interface 52 can provide further functionality in addition to that described above. For example, the controller 52 can record an event log, such as a log of all warnings, alerts and alarms, and the corresponding actions taken, and allow the log to be reviewed using the human-machine interface 52. In addition, the controller 50 may enable a user to review a log of warnings only, alerts only, alarms only, or any combination or subset thereof. An exemplary screen displaying an exemplary log to a user is shown in FIG. 14A. Furthermore, provision may be made to enable remote viewing of one or more such event logs, such as by way of the network arrangements shown in FIGS. 13A and 13B. In addition, any currently active alarm, alert or warning can be displayed on the human-machine interface 52. FIG. 14B shows an exemplary screen displaying an alarm showing that the emergency stop button for the primary power source 14 has been pressed.

Figure 14C:
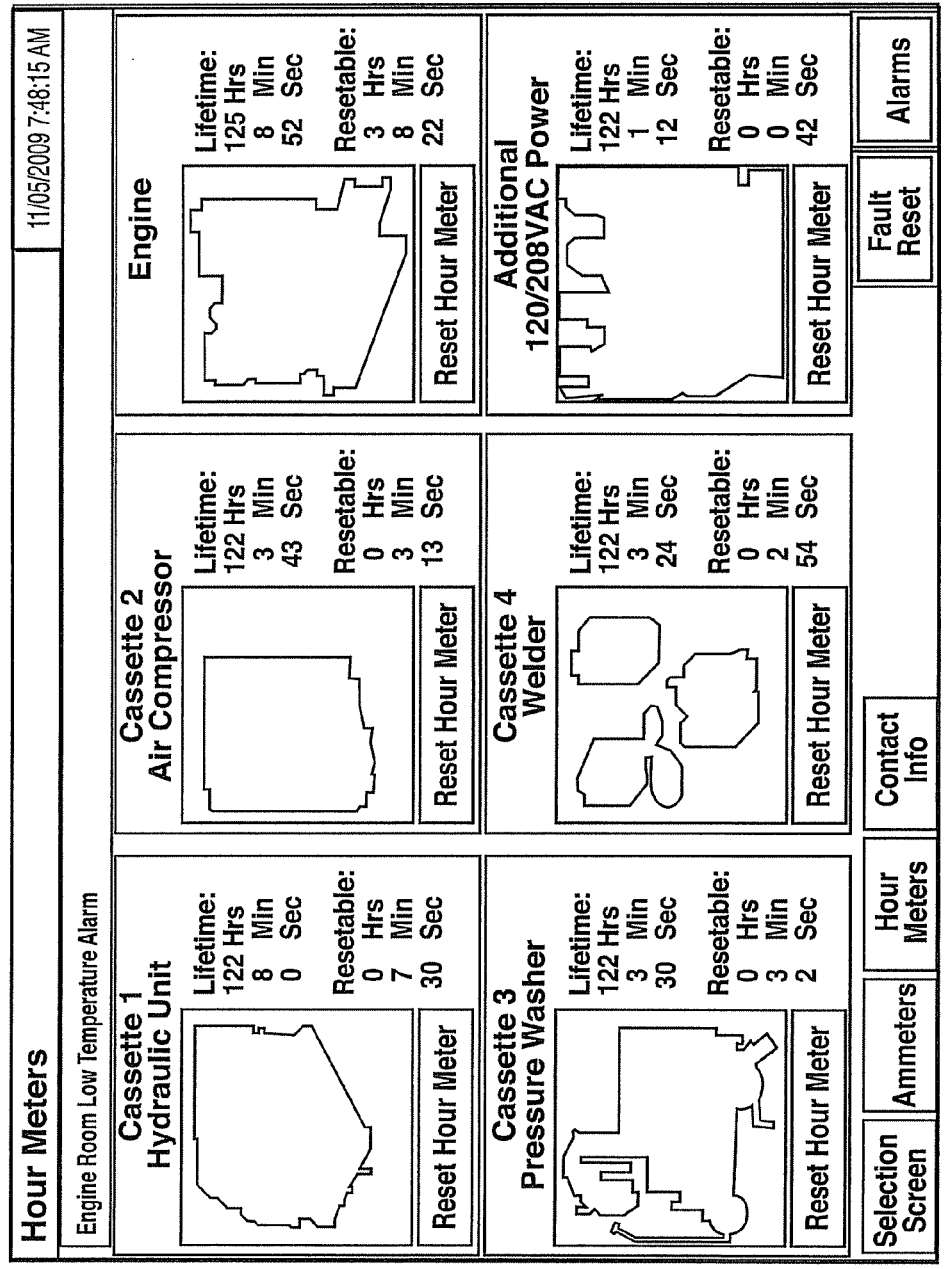
FIG. 14C shows an exemplary screen presentation of "resettable" and "lifetime" operation times for a set of functional modules as well as the primary power source and electrical outlets; according to an aspect of the present invention.

Another feature which can be provided by the controller 50 and human-machine interface 52 is that of tracking the amount of time that a particular functional module 16A to 16D has been in use (i.e. drawing current from the primary power source 14 once the "start" button has been pressed), and providing this information to the user. For each functional module 16A to 16D, the controller 50 can track the amount of time that the functional module has been in use by way of a "resettable" operation time meter, which can be manually reset by the user by pressing the appropriate "Reset Hour Meter" button. The controller 50 can also track the overall time that the functional module 16A to 16D has been in use since the transportable modular multi-appliance 10 was first deployed at the operation site, which provides a "lifetime" operation time. This information may assist the controller 50 in calculating when certain maintenance operations are required, or when certain types of functional module may require a "cooling down" period after lengthy continuous operation. The controller 50 can also track the "resettable" and "lifetime" operation times for the primary power source 14 and the electrical outlets 30A, 30B. FIG. 14C shows an exemplary screen displaying the "resettable" and "lifetime" operation times for the functional modules 16A to 16B as well as the primary power source 14 and electrical outlets 30A, 30B.

Figure 14D:
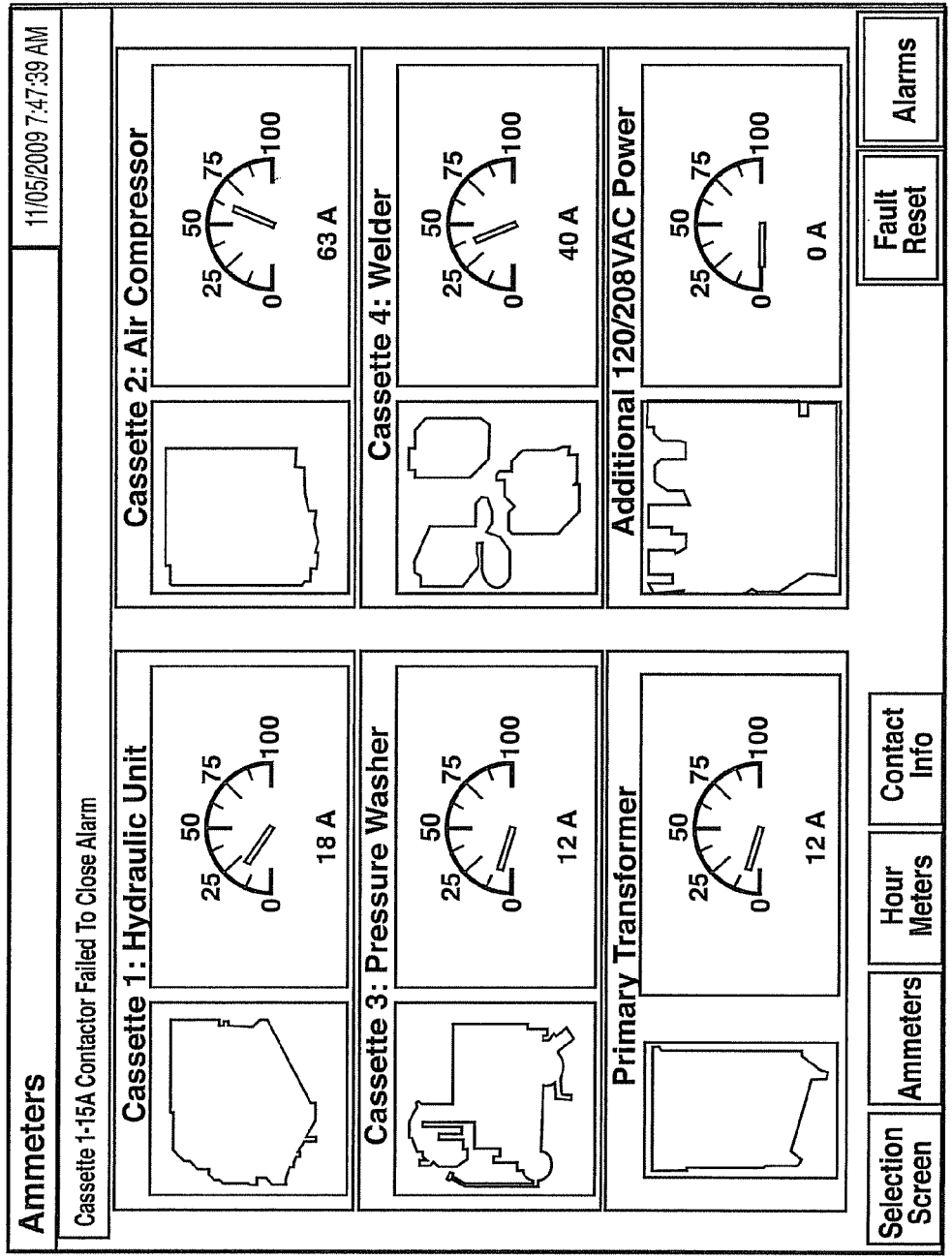
FIG. 14D shows an exemplary screen presentation of an exemplary representation of current usage by a set of functional modules and electrical outlets and a transformer.

A further feature that may be provided by the controller 50 is to monitor the current being consumed by each functional module 16A to 16D, as well as by the transformer 32A and by the electrical outlets 30A, 30B. The human-machine interface 52 can be used to display this information to a user. An exemplary screen displaying an exemplary representation of current usage at a particular point in time is shown in FIG. 14D.

Buttons (which may be virtual buttons in the case of a touch screen human machine interface 52) or other interface elements may be used to enable a user to switch between various different display formats, and to control other functions. For example, the exemplary screens shown in FIG. 12C and in FIGS. 14A to 14D include a "Selection Screen" button for switching to the screen type shown in FIG. 12A and initiating the process 1200, an "Ammeters" button for switching to the screen type shown in FIG. 14D, an "Hour Meters" button for switching to the screen type shown in FIG. 14C, and an "Alarms" button for showing the current alarm (if any) and hence switching to the screen type shown in FIG. 14B. Within the screen type shown in FIG. 14B, an "Alarm Log" button provides access to the alarm log illustrated by the screen type shown in FIG. 14A. A "Fault Reset" button is also provided to allow a user to clear an alarm, alert, or warning, for example because the matter which triggered the alarm, alert, or warning has been addressed (e.g. a clogged filter has been cleared). A "Contact Information" screen may be accessed by pressing a "Contact Info" button, thereby enabling a user to obtain contact information for the organization which provided the transportable modular multi-appliance device, and/or for suppliers of functional units contained in the functional modules.

In addition, the controller 50 may use the measurement of current consumed by each functional module (e.g. 16A to 16D), together with the operation times for that functional unit, to calculate various cost measures using additional variables that are pre-programmed into the controller 50. For example, if the transportable modular multi-appliance device is being rented at a known cost of $X per day, and is consuming diesel fuel at a known rate of Y gallons or liters per hour at a known cost of $Z per gallon or liter, the controller 50 can use these variables, together with the current consumption and operation times, to calculate how much a particular functional unit is costing per unit of time that it is actually in operation.

Figure 15A:
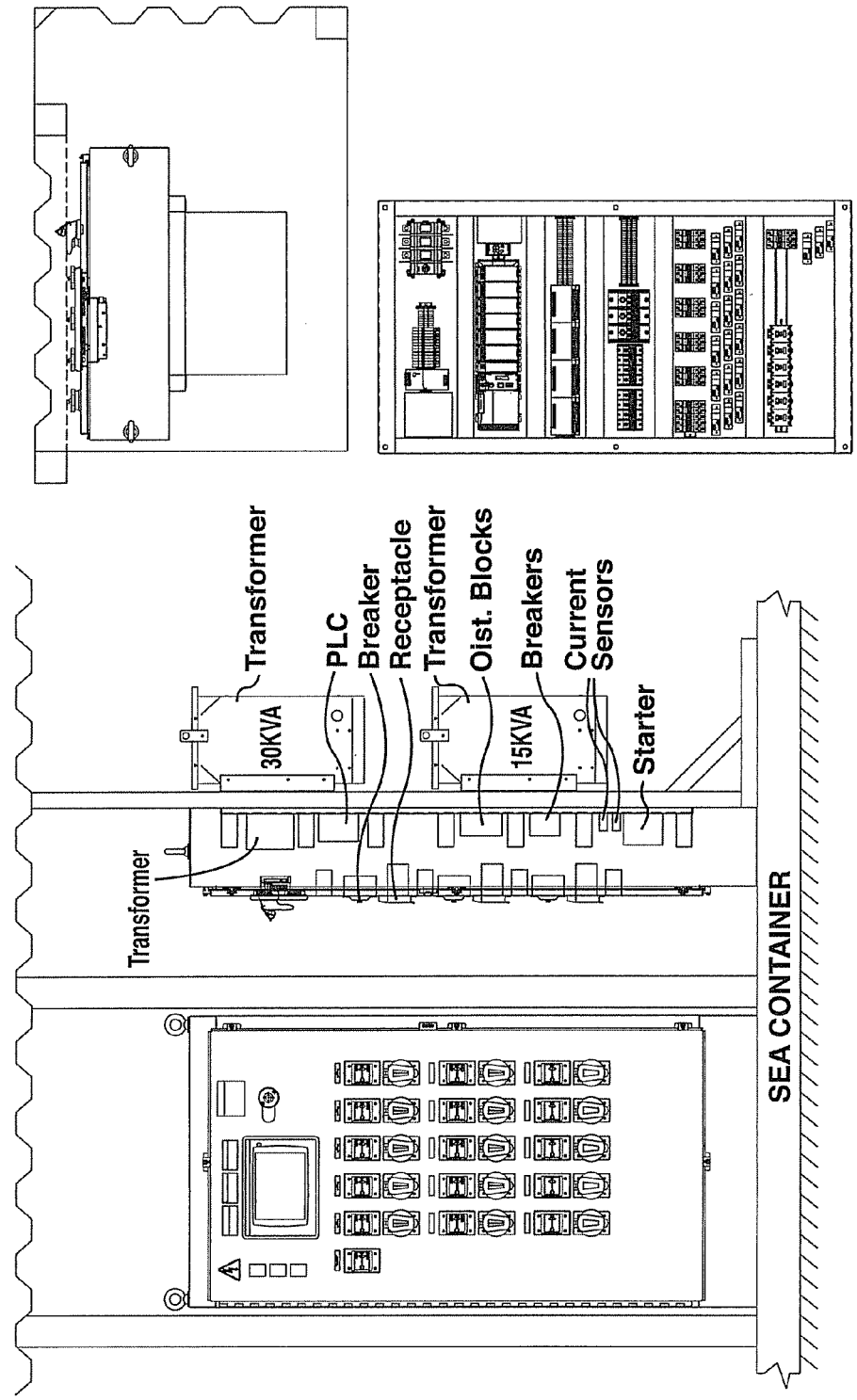
FIG. 15A shows various views of an electrical and control assembly, according to an aspect of the present invention.

FIG. 15A shows various views of the electrical and control assembly 32. FIG. 15B shows various views of the control panels 40A to 40D.

As noted above, the controller 50 may be a suitably programmed general purpose computer. In addition, general purpose computers may be used to facilitate communication, as described in respect of FIGS. 13A and 13B. An illustrative computer system in respect of which aspects of the present invention may be implemented, is presented as a block diagram in FIG. 16. The illustrative computer system is denoted generally by reference numeral 1600 and includes a display 1602, input devices in the form of keyboard 1604A and pointing device 1604B, computer 1606 and external devices 1608. While pointing device 1604B is depicted as a mouse, it will be appreciated that other types of pointing device may also be used.

Figure 16:
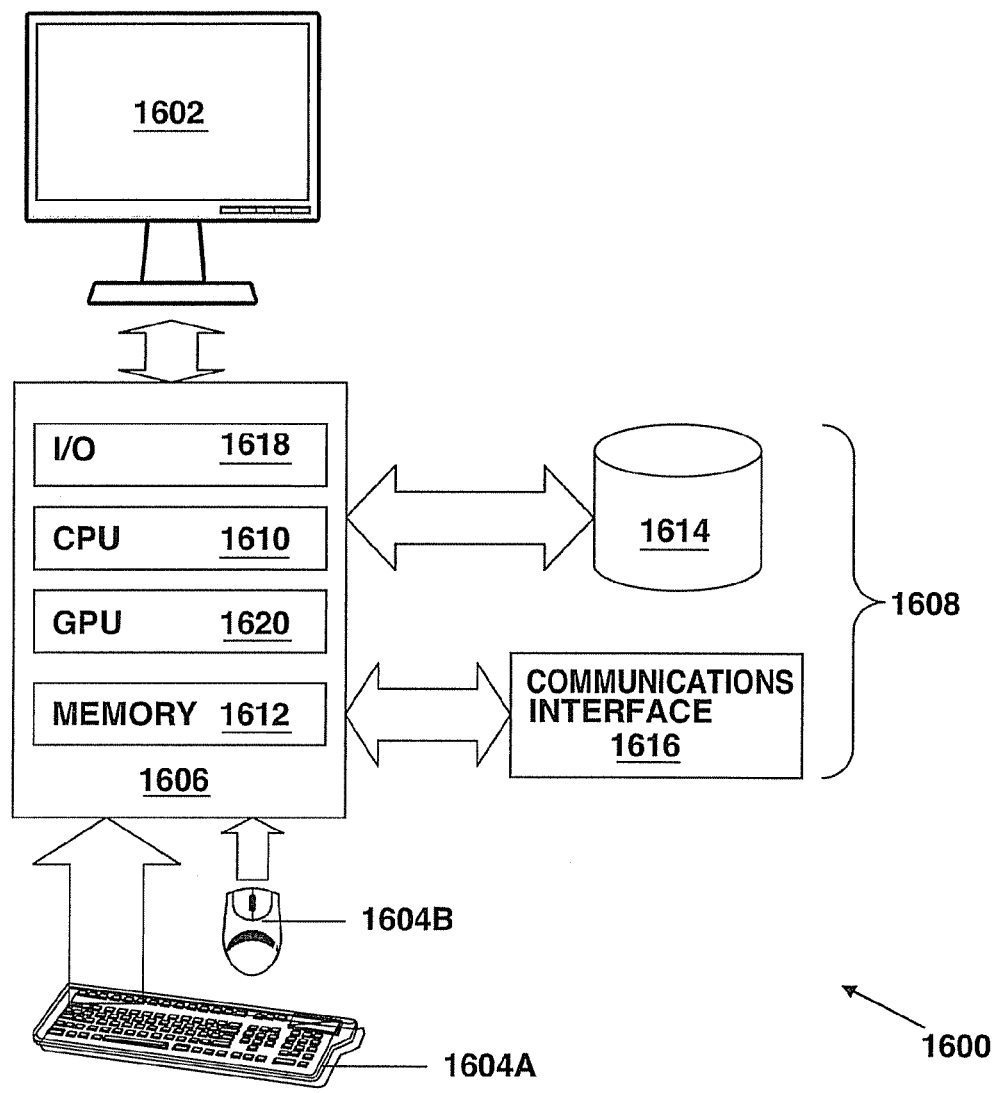
FIG. 16 is a block diagram showing an illustrative computer system in respect of which aspects of the present invention may be implemented.

The computer 1606 may contain one or more processors or microprocessors, such as a central processing unit (CPU) 1610. The CPU 1610 performs arithmetic calculations and control functions to execute software stored in an internal memory 1612, preferably random access memory (RAM) and/or read only memory (ROM), and possibly additional memory 1614. The additional memory 1614 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1614 may be physically internal to the computer 1606, or external as shown in FIG. 16.

The computer system 1600 may also include other similar means for allowing computer programs or other instructions to be loaded. Such means can include, for example, a communications interface 1616 which allows software and data to be transferred between the computer system 1600 and external systems and networks. Examples of communications interface 1616 can include a modem, a network interface such as an Ethernet card, a wireless communication interface, or a serial or parallel communications port. Software and data transferred via communications interface 1616 are in the form of signals which can be electronic, acoustic, electromagnetic, optical or other signals capable of being received by communications interface 1616. Multiple interfaces, of course, can be provided on a single computer system 1600.

Input and output to and from the computer 1606 is administered by the input/output (I/O) interface 1618. This I/O interface 1618 administers control of the display 1602, keyboard 1604, external devices 1608 and other such components of the computer system 1600. The computer 1606 also includes a graphical processing unit (GPU) 1620. The latter may also be used for computational purposes as an adjunct to, or instead of, the (CPU) 1610, for mathematical calculations.

Embodiments of aspects of the present invention may be implemented entirely in hardware, entirely in software, or by way of a combination of hardware and software. Certain aspects of the invention can take the form of a computer program product accessible from a computer usable or computer readable medium providing program code for use by or in connection with a computer or any instruction execution system. In such embodiments, the computer program product may reside on a computer usable or computer readable medium in a computer such as the computer 1606, or on a computer usable or computer readable medium external to the computer 1606, or on any combination thereof.

It is to be understood that the terms "computer usable medium" and "computer readable medium" are intended to encompass any apparatus that can contain, store, communicate, transport the program for use by or in connection with the instruction execution system, apparatus, or device. For example, and without limitation, the medium may be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and DVD read/write (DVD-R/W).

Figure 18:
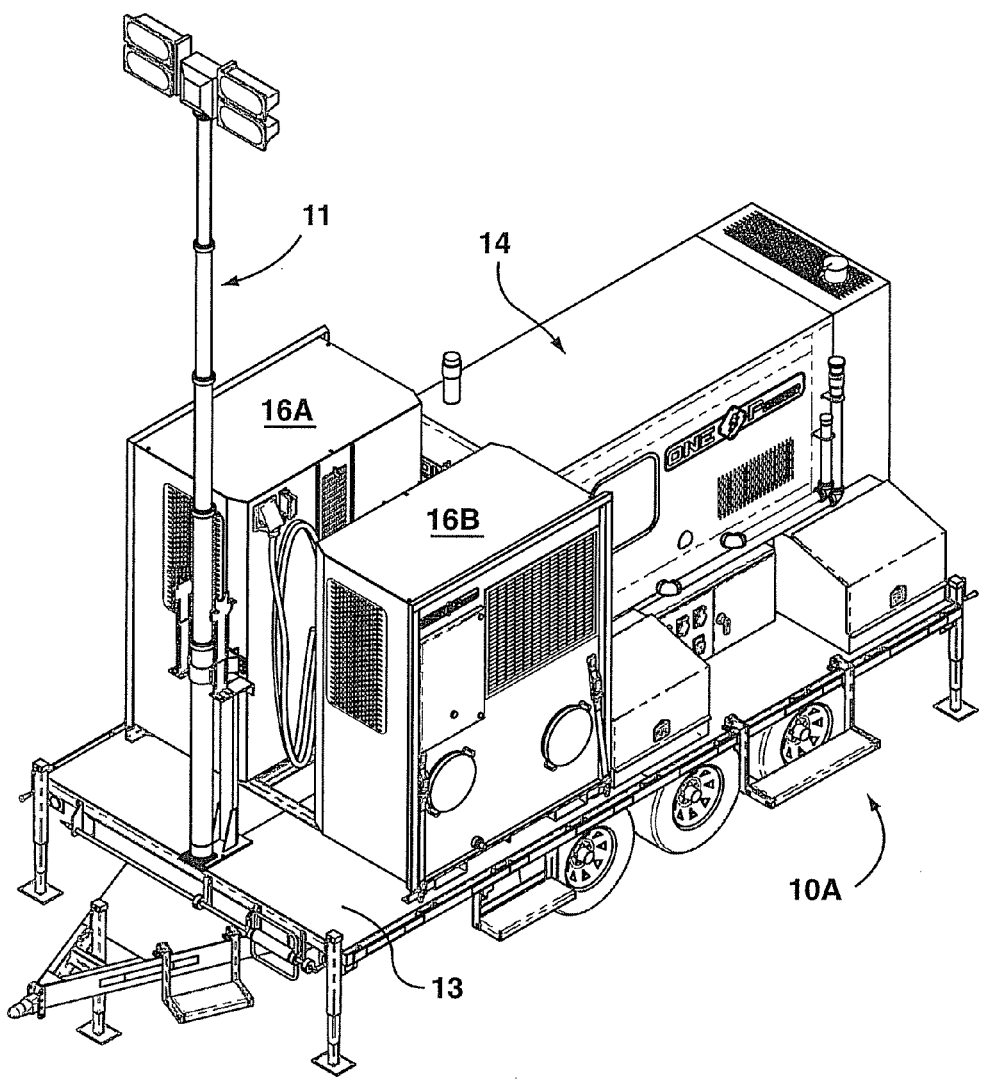
FIG. 18 is an isometric view of an alternate embodiment of an exemplary mobile transportable modular multi-appliance device according to another aspect of the present invention.

One or more currently preferred embodiments have been described by way of example. It will be apparent to persons skilled in the art that a number of variations and modifications can be made without departing from the scope of the invention as defined in the claims. For example, FIG. 18 illustrates an alternate embodiment of a scaled down transportable modular multi-appliance device generally indicated by reference 10A. The unit is mounted on a trailer 13 rather than within a container 12 and is accordingly mobile. Nevertheless, the unit utilizes a fixed primary power source 14 mounted to the trailer 13 and removable modules 16A and 16B which are fully interchangeable with the modules used in the container based unit.

The primary power source 14 of the FIG. 18 embodiment could be scaled down from the FIGS. 1A through 1F unit to suit a reduced number of modules. The smaller unit illustrated in FIG. 18 is more mobile than a container-based unit in that it can be pulled by a pick up truck with suitable towing capacity. As with a larger unit, the trailer could be a skid or sled type of platform not necessarily requiring wheels. The modules 16A and 16B may be located and secured to the trailer 13 using a standard interface shared with the container-based unit.

What is claimed is:

1. A transportable modular multi-appliance device, comprising:
a container having a plurality of enclosures;
a primary power source for producing AC power, the primary power source disposed inside the container;
a plurality of AC-powered functional modules external to the primary power source and external or internal to the container and having a function other than controlling electrical power, said AC-cowered functional modules having electrical coupling means for electrical coupling to the primary power source so as to receive the AC power from the primary power source, each AC-powered functional module being dimensionally configured to removably fit within the enclosures to facilitate exchangeability thereby facilitating reconfiguration of the device to suit different service requirements;
a plurality of sensors for monitoring the AC-powered functional modules; and
a controller, the controller coupled to the primary power source and to the sensors and configured to automatically control the primary power source and allocate the AC power supplied by the primary power source among the AC-powered functional modules in response to inputs from the plurality of sensors.

2. The transportable modular multi-appliance device of claim 1, further comprising a plurality of AC outlets electrically coupled to the primary power source so as to receive the AC power from the primary power source, the AC outlets being accessible from outside the container, and wherein the controller is configured to automatically control the primary power source and allocate the AC power supplied by the primary power source among the AC-powered functional modules and the AC outlets in response to inputs from the plurality of sensors.

3. The transportable modular multi-appliance device of claim 2, wherein the primary power source is an electricity generator.

4. The transportable modular multi-appliance device of claim 3, wherein the primary power source is a generator powered by a combustion engine, solar energy, wind energy or geothermal energy.

5. The transportable modular multi-appliance device of claim 1, wherein the plurality of AC-powered functional modules includes at least one secondary power source, each secondary power source operable to convert the AC power into a respective secondary form of power.

6. The transportable modular multi-appliance device of claim 5, wherein the secondary forms of power are selected from the group consisting of pneumatic power, AC electric power, DC electric power, hydraulic power and mechanical power.

7. The transportable modular multi-appliance device of claim 5, wherein the secondary power sources are selected from the group consisting of welding power supplies, plasma cutters, air compressors, hydraulic power units, and pressure washers.

8. The transportable modular multi-appliance device of claim 1, wherein the sensors include at least one diagnostic sensor positioned to monitor an operational parameter of at least one of the AC-powered functional modules, and wherein the controller is configured to cause the primary power source to cease supplying the AC power to a corresponding one of the AC-powered functional modules in response to an input from an associated diagnostic sensor indicating a fault in that AC-powered functional module.

9. The transportable modular multi-appliance device of claim 1, wherein said plurality of AC powered functional modules are removably mounted.

10. The transportable modular multi-appliance device of claim 1, further comprising at least one fire sensor positioned to detect a fire inside the container, and wherein the controller is configured to deactivate the primary power source in response to a signal from the at least one fire sensor indicating a fire.

11. The transportable modular multi-appliance device of claim 10, wherein the controller is further configured to provide an alarm signal in response to a signal from the at least one fire sensor indicating a fire.

12. The transportable modular multi-appliance device of claim 1, wherein the sensors include usage sensors for each of the AC-powered functional modules indicating whether the associated AC-powered functional module is in use, and wherein the controller is configured to cause the primary power source to cease supplying the AC power to a corresponding one of the AC-powered functional modules in response to an input from an associated one of the usage sensors indicating that the corresponding one of the AC-powered functional modules has been idle for a predetermined period of time.

13. The transportable modular multi-appliance device of claim 1, wherein the container is ISO 668 compliant.

14. The transportable modular multi-appliance device as claimed in claim 1 wherein said primary power source has a power input connector for receiving power from a power generator external to said container.

15. The transportable modular multi-appliance device as claimed in claim 1 wherein said controller prevents activation of a particular functional module if such activation would cause the total current flow from the primary power source to exceed a predetermined threshold.

16. The transportable modular multi-appliance device as claimed in claim 15 wherein said controller deactivates at least one functional module if the total current flow from the primary power source exceeds a predetermined threshold.

17. The transportable modular multi-appliance device as claimed in claim 16 wherein the controller deactivates the at least one functional module in a preset order.

18. A towable and transportable modular multi-appliance device comprising:
  a towable and transportable platform having a plurality of module interfaces;
  a primary power source for producing AC power, the primary source mounted to the towable platform;
  a plurality of AC-powered functional modules external to the primary power source and external or internal to the container and having a function other than controlling electrical power, said AC-powered functional modules having electrical coupling means for coupling to the primary power source so as to receive the AC power from the primary power source, each AC-powered functional module being dimensionally configured to be removably securable to the module interfaces to facilitate exchangeability thereby facilitating reconfiguration of the device to suit different service requirements;
  a plurality of sensors monitoring the AC-powered functional modules; and
  a controller, the controller coupled to the primary power source and to the sensors and configured to automatically control the primary power source and allocate the AC power supplied by the primary power source among the AC-powered functional modules in response to input from the plurality of sensors.

19. The towable and transportable modular multi-appliance device of claim 18 wherein said plurality of AC-powered functional modules are removably mounted.

20. The towable and transportable modular multi-appliance device of claim 18 wherein said primary power source has a power input connector for receiving power from a power generator external to said container.

* * * * *